United States Patent
Kristiansen et al.

(10) Patent No.: US 11,740,376 B2
(45) Date of Patent: Aug. 29, 2023

(54) REFLECTION SEISMOLOGY MULTIPLE IMAGING

(71) Applicant: Schlumberger Technology Corporation, Sugar Land, TX (US)

(72) Inventors: Pål Kristiansen, Asker (NO); David Nichols, Menlo Park, CA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 421 days.

(21) Appl. No.: 16/638,310

(22) PCT Filed: Aug. 16, 2018

(86) PCT No.: PCT/US2018/000242
§ 371 (c)(1),
(2) Date: Feb. 11, 2020

(87) PCT Pub. No.: WO2019/035967
PCT Pub. Date: Feb. 21, 2019

(65) Prior Publication Data
US 2020/0191985 A1  Jun. 18, 2020

Related U.S. Application Data

(60) Provisional application No. 62/546,487, filed on Aug. 16, 2017.

(51) Int. Cl.
*G01V 1/38* (2006.01)
*G01V 1/28* (2006.01)
*G01V 1/30* (2006.01)

(52) U.S. Cl.
CPC ............... *G01V 1/38* (2013.01); *G01V 1/282* (2013.01); *G01V 1/286* (2013.01); *G01V 1/305* (2013.01);
(Continued)

(58) Field of Classification Search
CPC ........ G01V 1/305; G01V 1/282; G01V 1/286; G01V 1/38; G01V 1/30; G01V 1/303;
(Continued)

(56) References Cited

U.S. PATENT DOCUMENTS 6,735,527 B1 * 5/2004 Levin ..................... G01V 1/36
702/14
8,699,298 B1 * 4/2014 Sheng .................... G01V 1/364
367/73

(Continued)

OTHER PUBLICATIONS

S. Yelisetti and et al, "Dual-vergence structure from multiple migration of widely spaced OBSs", Tectonophysics 718 (Apr. 2017) 45-60 (Year: 2017).*

(Continued)

*Primary Examiner* — Douglas Kay

(57) ABSTRACT

A method includes receiving seismic data for a geologic region of the Earth; building a velocity model of the geologic region of the Earth; selecting at least one mode of multiple and corresponding travel time data from a data storage where the travel time data correspond to at least one complex ray signature in the geologic region of the Earth and are based at least in part on the velocity model; performing migration on the seismic data using at least the selected travel time data to generate processed seismic data; and rendering an image of the geologic region of the Earth to a display where the image includes at least a multiple image.

17 Claims, 36 Drawing Sheets

(52) U.S. Cl.
CPC .. *G01V 2210/512* (2013.01); *G01V 2210/514* (2013.01); *G01V 2210/675* (2013.01)

(58) Field of Classification Search
CPC ...... G01V 1/28; G01V 1/50; G01V 2210/512; G01V 2210/514; G01V 2210/675; G01V 2210/51; G01V 2210/62; G01V 2210/74
See application file for complete search history.

(56) References Cited

U.S. PATENT DOCUMENTS

| | | | |
|---|---|---|---|
| 9,453,930 | B2 | 9/2016 | Whitmore, Jr. et al. |
| 10,138,727 | B2* | 11/2018 | Zeroug ................ E21B 47/005 |
| 2007/0271041 | A1* | 11/2007 | Peng ........................ G01V 1/28 702/14 |
| 2008/0019215 | A1* | 1/2008 | Robertsson .......... G01V 1/3843 367/19 |
| 2009/0285053 | A1* | 11/2009 | Kiyashchenko ....... G01V 1/303 367/73 |
| 2015/0219780 | A1* | 8/2015 | Zeroug ................. E21B 47/005 702/6 |
| 2016/0208583 | A1* | 7/2016 | Johnston ............. E21B 41/0092 |
| 2018/0059277 | A1* | 3/2018 | Bloor ..................... G01V 1/364 |
| 2019/0113639 | A1* | 4/2019 | Khadhraoui ............. G01V 1/50 |

OTHER PUBLICATIONS

S. Lu and et al, "Separated-wavefield imaging using primary and multiple energy", The leading edge Jul. 2015 (Year: 2015).*
Z. Jiang and et al, "Migration methods for imaging different-order multiples", Geophysical Prospecting, 2007, 55, 1-19 (Year: 2007).*
Fundamentals of Seismic Wave Propagation, by Chapman, Cambridge University Press (2004). For example, at p. 136 (5 pages).
International Preliminary reporton Patentability issued in the related PCT Application PCT/US2018/000242, dated Feb. 27, 2020 (7 pages).
Fehler et al., Wavefront Construction Kirchhoff Migration with Ray-Amplitude Corrections, EAGE 64th Conference & Exhibition—Florence, Italy, May 27-30, 2002 (5 pages).
Cavalca, M., and Lailly, P. [2005] Prismatic reflections for the delineation of salt bodies. 72nd Annual International Meeting, SEG, Expanded Abstracts.
Godfrey, R. J., Kristiansen, P., Armstrong, B., Cooper, M.,and Thorogood, E. [1998] Imaging the Foinaven ghost. 68thSEG Annual Meeting, 1333-1335.
Grion et al., Mirror Imaging of OBS data, First Break, vol. 25, Nov. 2007, p. 37-45.
A. J. Berkhout (1993) Migration of multiple reflections. SEG Technical Program Expanded Abstracts 1993: pp. 1022-1025.
Weglein, Multiples: Signal or noise?, Geophysics, vol. 81, No. 4 (Jul.-Aug. 2016); p. V283-V302.
Thomsen, "Weak elastic anisotropy", Geophysics, vol. 51, No. 10, pp. 1954-1966, Oct. 1986.
Jiang et al., Migration of multiples, The Leading Edge, Mar. 2005, pp. 315-318.
Berkhout, Utilization of multiple scattering: the next big step forward in seismic imaging, Geophysical Prospecting, 2017, 65, 106-145.
Cheng et al., Ray-based prestack depth migration for orthorhombic media, SEG 2012, Las Vegas, Annual Meeting, pp. 1-5.
Jones (2014) 3. Estimating subsurface parameter fields for seismic migration: Velocity model building. Encyclopedia of Exploration Geophysics: pp. U1-1-U1-24.
International Search Report and Written Opinion issued in the related PCT Application PCT/US2018/000242, dated Nov. 23, 2018 (10 pages).
Extended European Search Report of EU Patent Application No. 18846417.6 dated Apr. 13, 2021, 9 pages.
Yelisetti, S. et al., "Dual-vergence structure from multiple migration of widely spaced OBSs", Tectonophysics, 2017, 718, pp. 45-60.
Lu, S.. et al., "Separated-wavefield imaging using primary and multiple energy", The Leading Edge, 2015, 34(7), pp. 770-778.
Jiang, Z. et al., Migration methods for imaging different-order multiples, Geophysical Prospecting, 2007, 55, pp. 1-19.
Lu, S. et al., "3D High-Resolution Imaging Using Separated Wavefields Introduction", 75th EAGE Conference & Exhibition incorporationg SPE EUROPEC, 2013, 3 pages.
Rønholt, G. et al., "High-fidelity complete wavefield velocity model building and imaging in shallow water environments—A North Sea case study", First Break, 2014, 32(1), 5 pages.
Communication Pursuant to Article 94(3) EPC issued in European Patent Application No. 18846417.6 dated Jan. 5, 2023, 6 pages.

\* cited by examiner

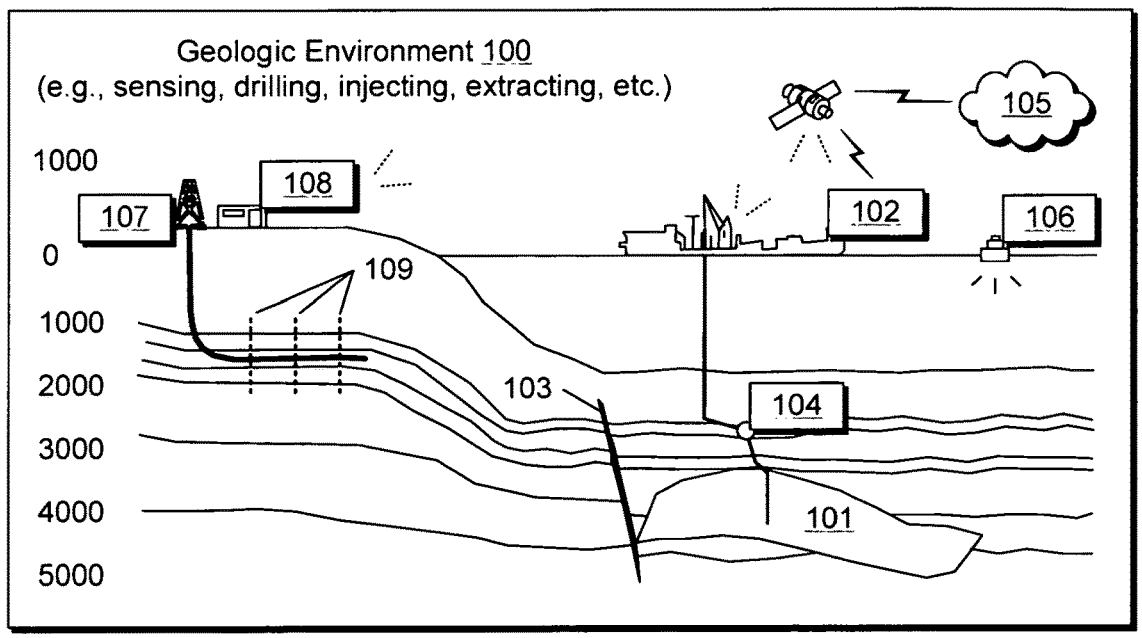
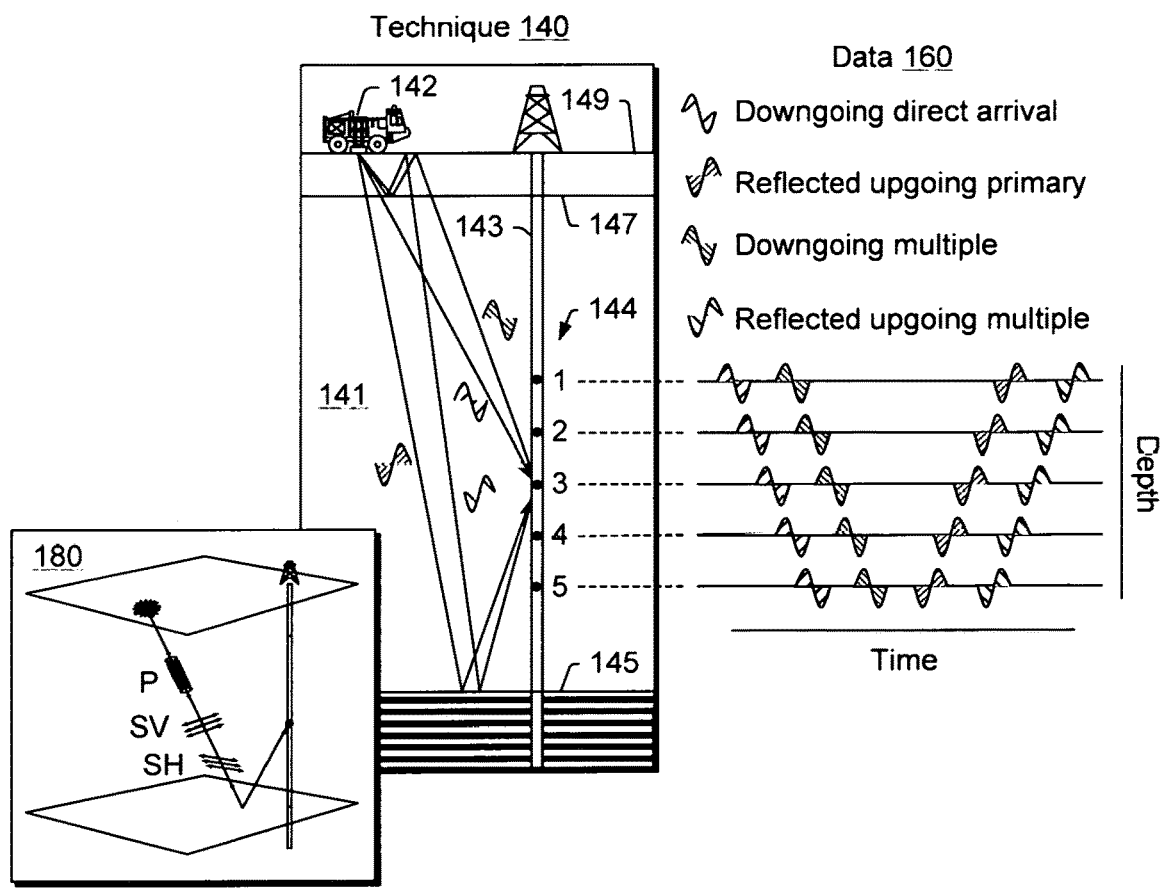
Fig. 1

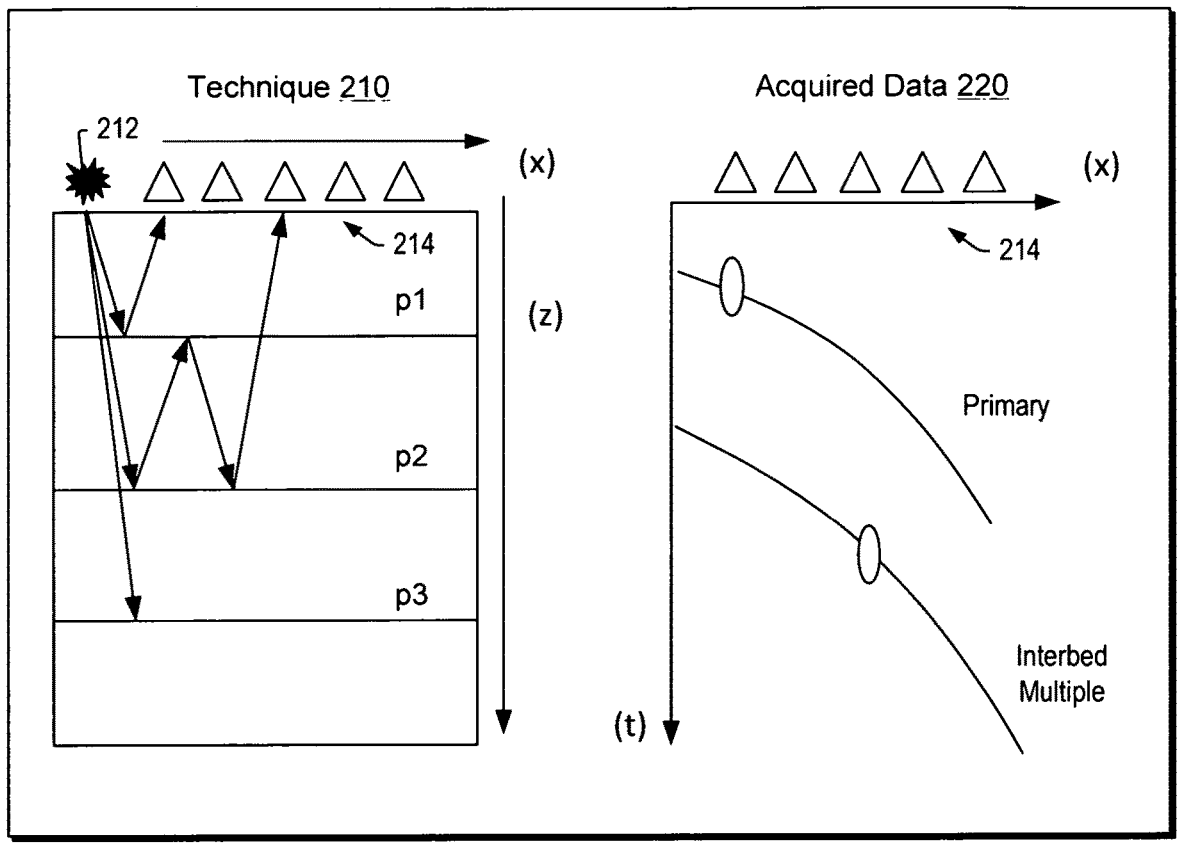
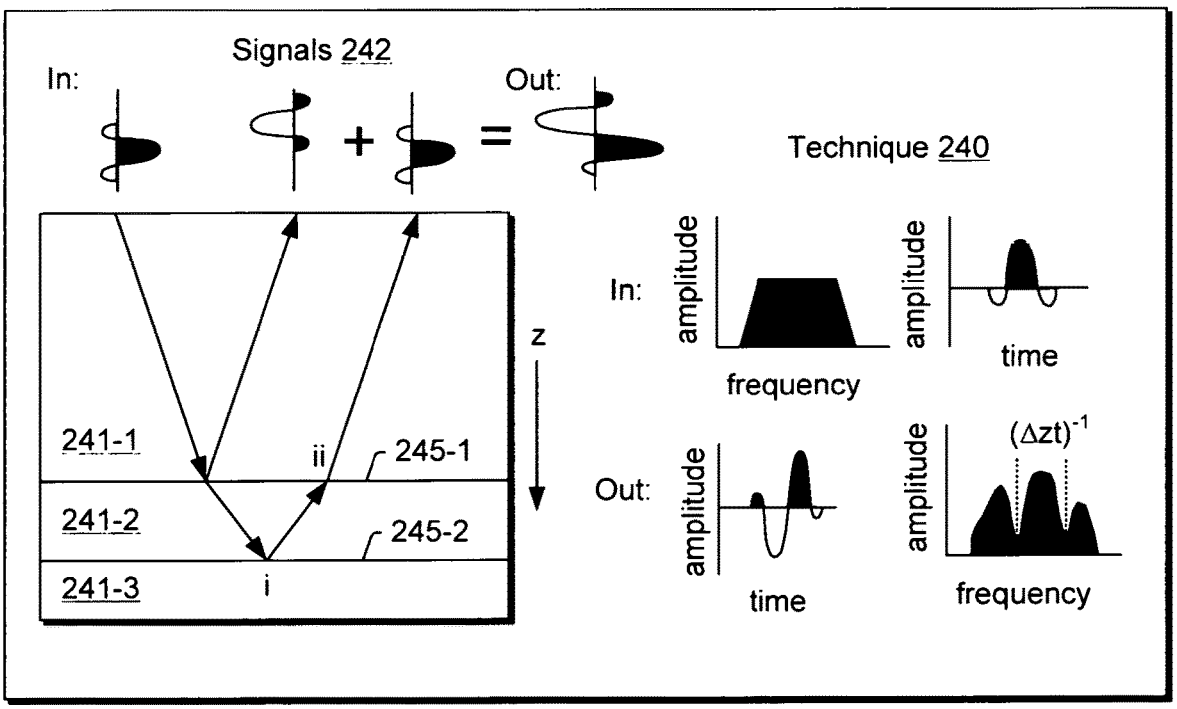
Fig. 2

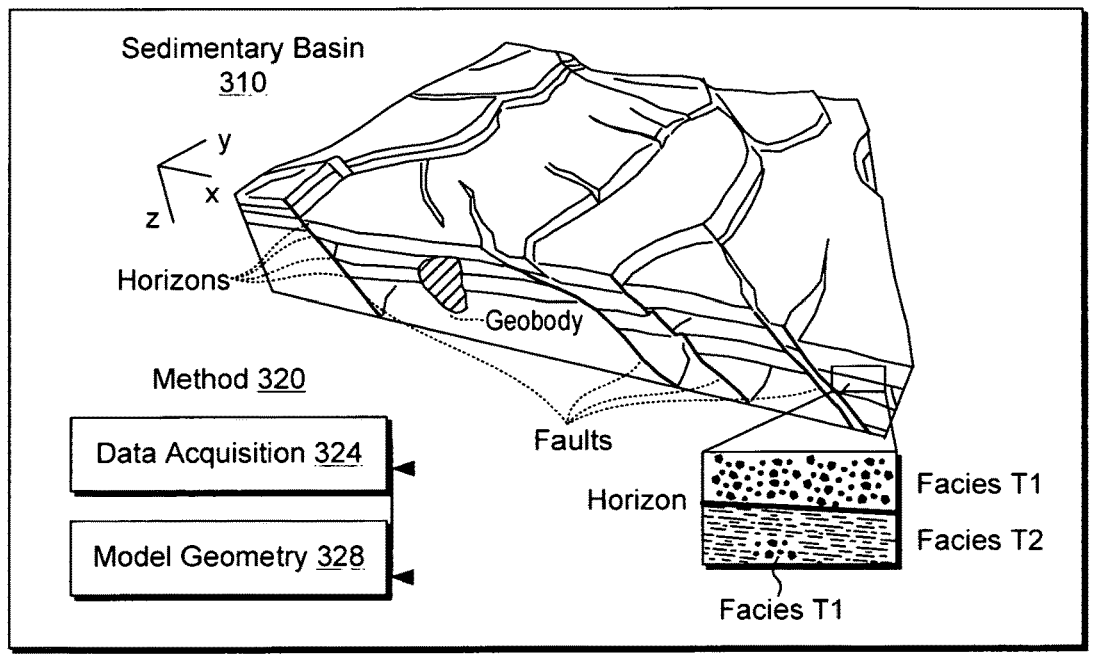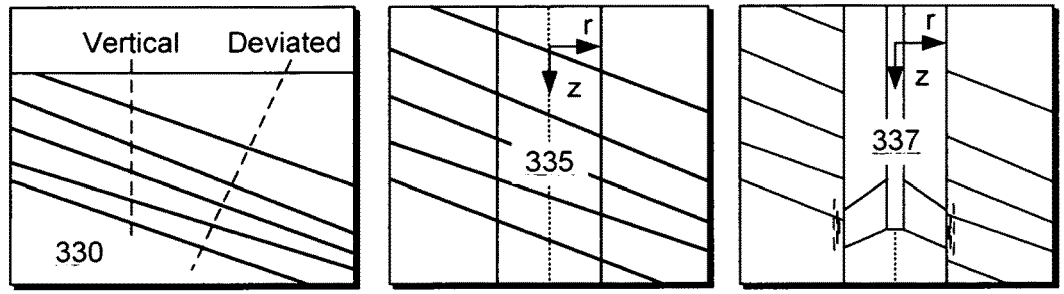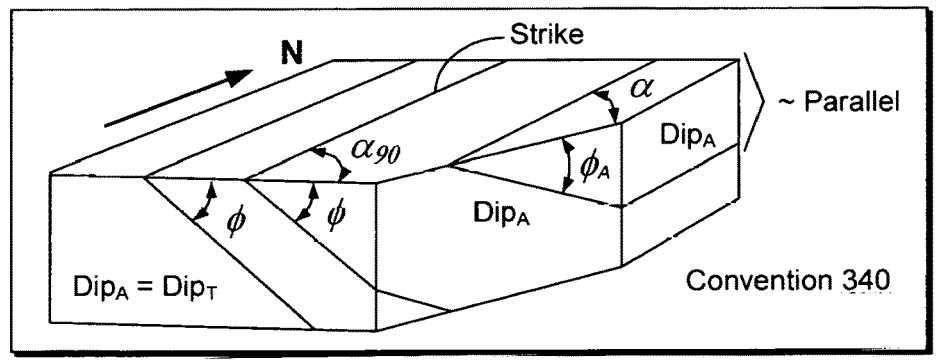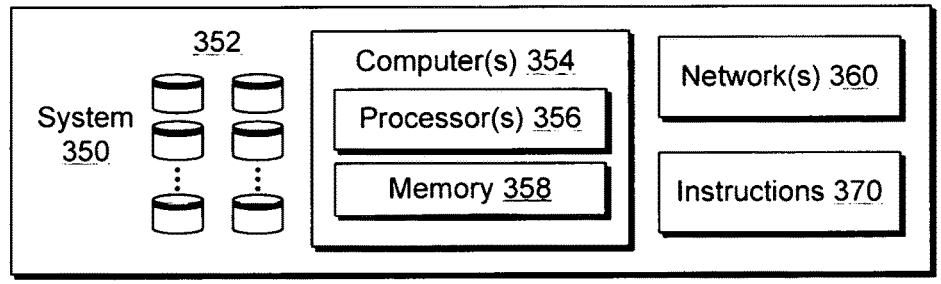
Fig. 3

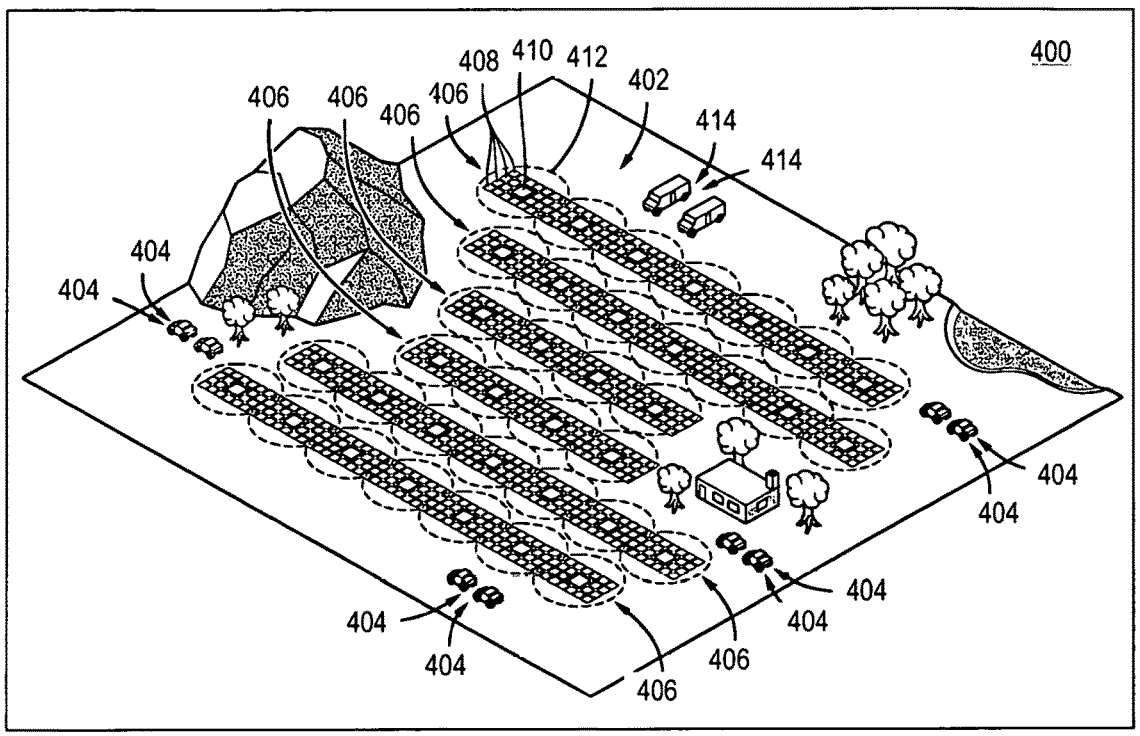
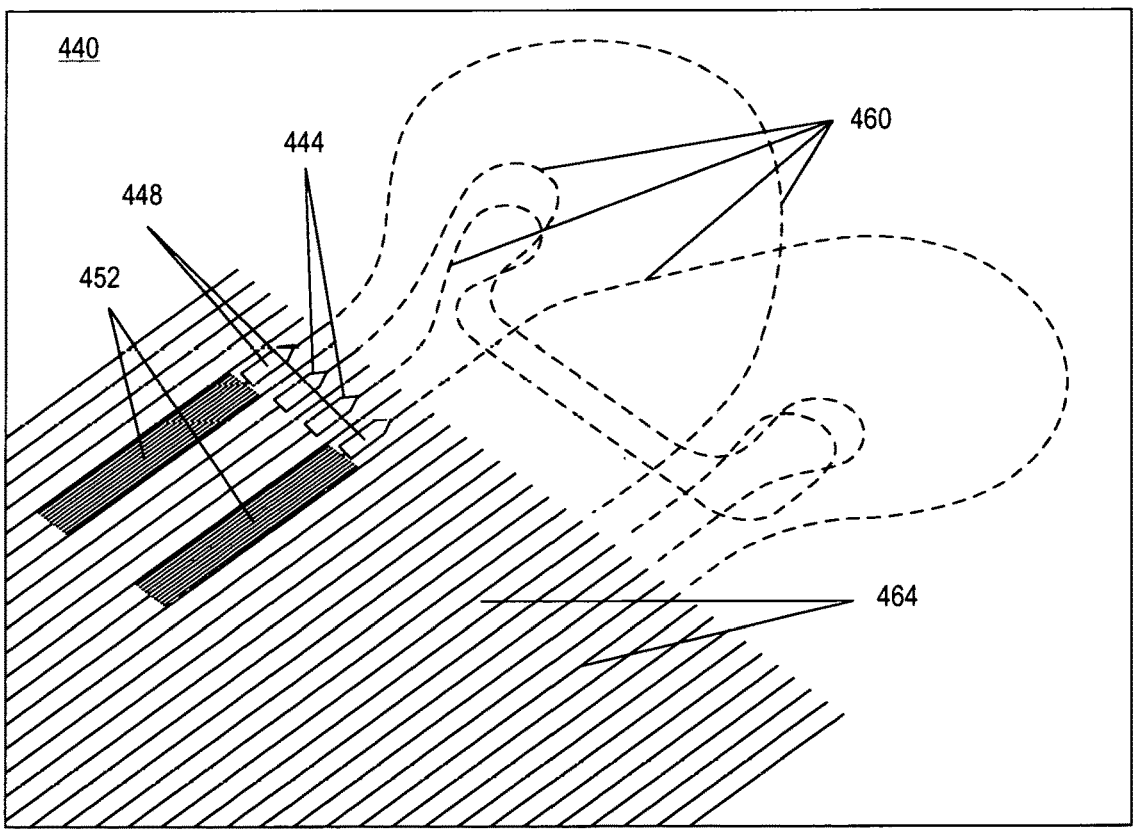
Fig. 4

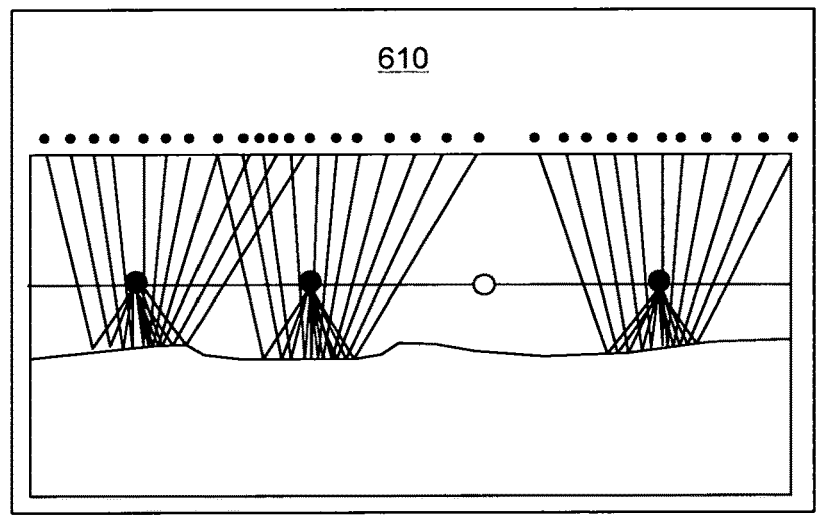
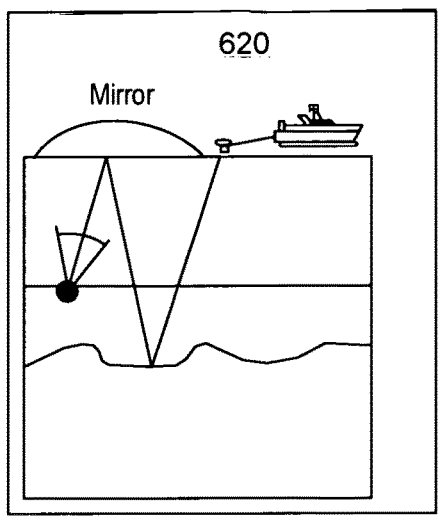
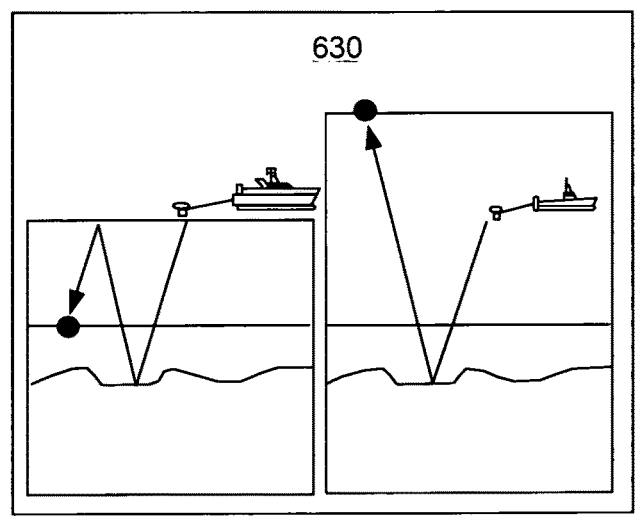
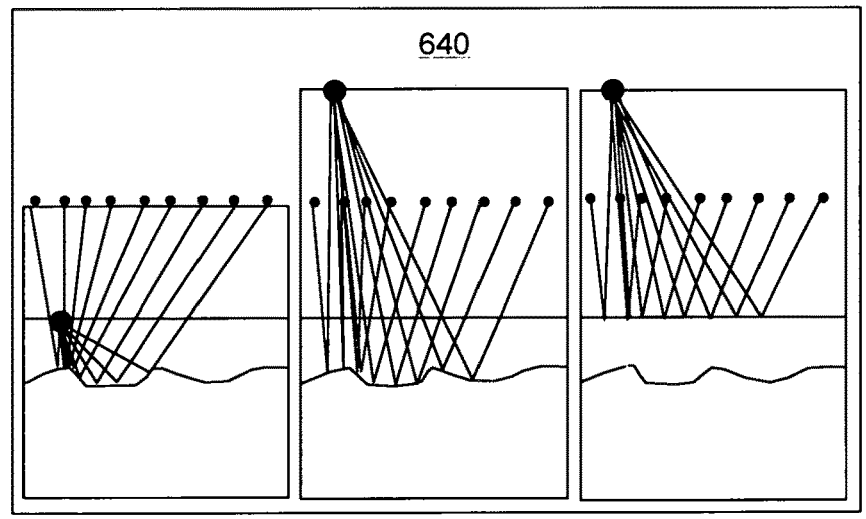
Fig. 6

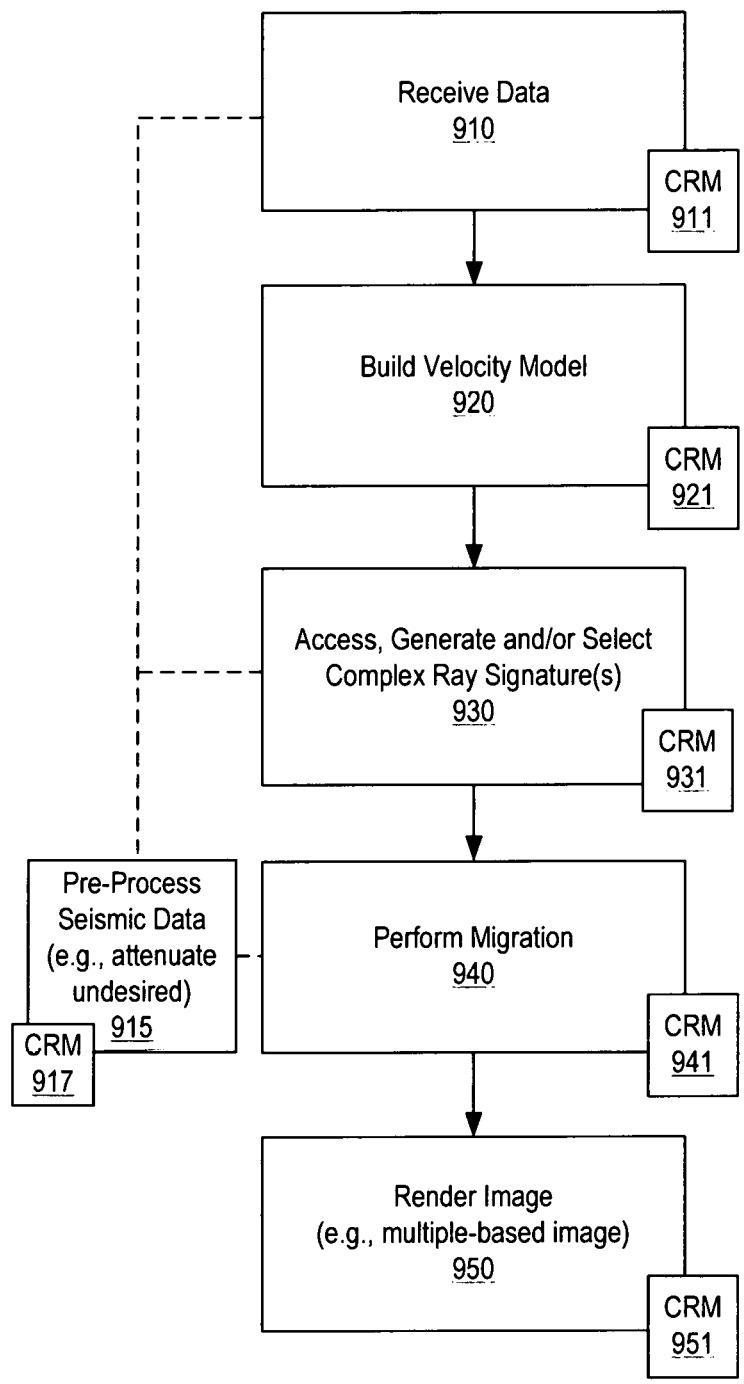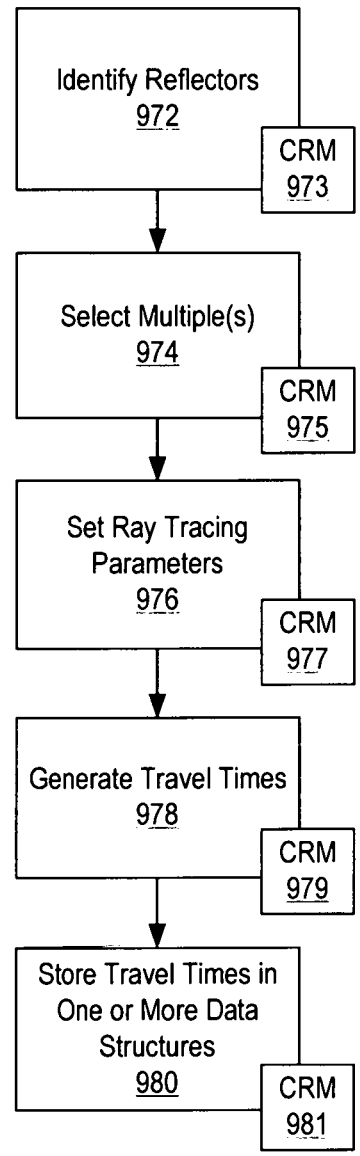
Fig. 9

GUI 1110

Ray Path Signature

| | Surface Name | Action To Take | Ray Type |
|---|---|---|---|
| 1 | BASE_A | ▷ Reflect | ▷ P |
| 2 | TOP_A | ▷ Reflect | ▷ P |

GUI 1130

| Surface Name of Water Bottom | Seabed_depth_stretched_with_1470 |
|---|---|
| Number of Bounces | Single Bounce (Water Bottom, Sea Surface) |
| | Single Bounce (Sea Surface) |
| | Double Bounce (Sea Surface, Water Bottom, Sea Surface) |
| | Single Bounce (Water Bottom, Sea Surface) |
| | Double Bounce (WB, SS, WB, SS) |
| Compute-Node Allocation | |

Fig. 11

Ray Signatures 1200
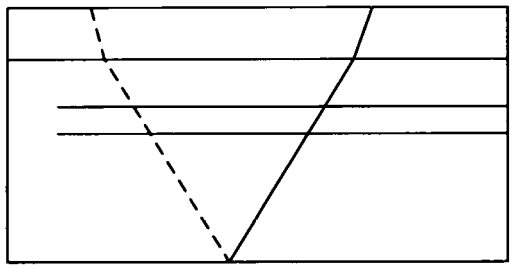
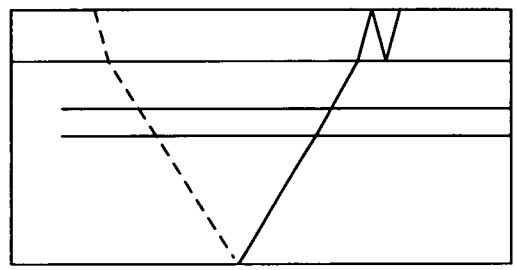
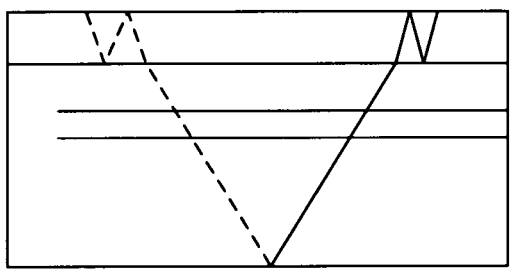
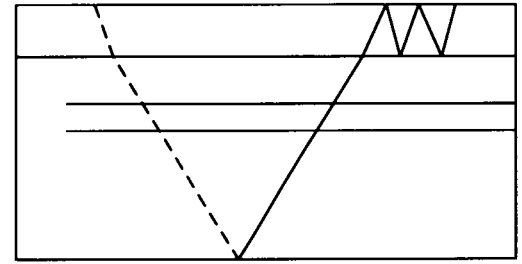
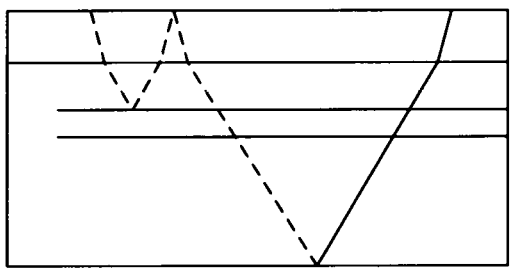
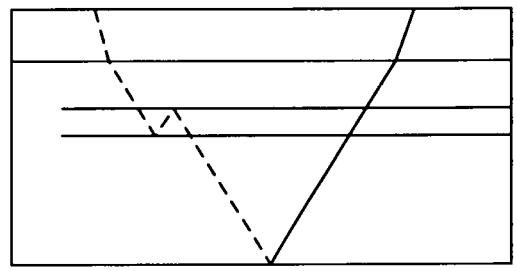
Fig. 12

GUI 1400
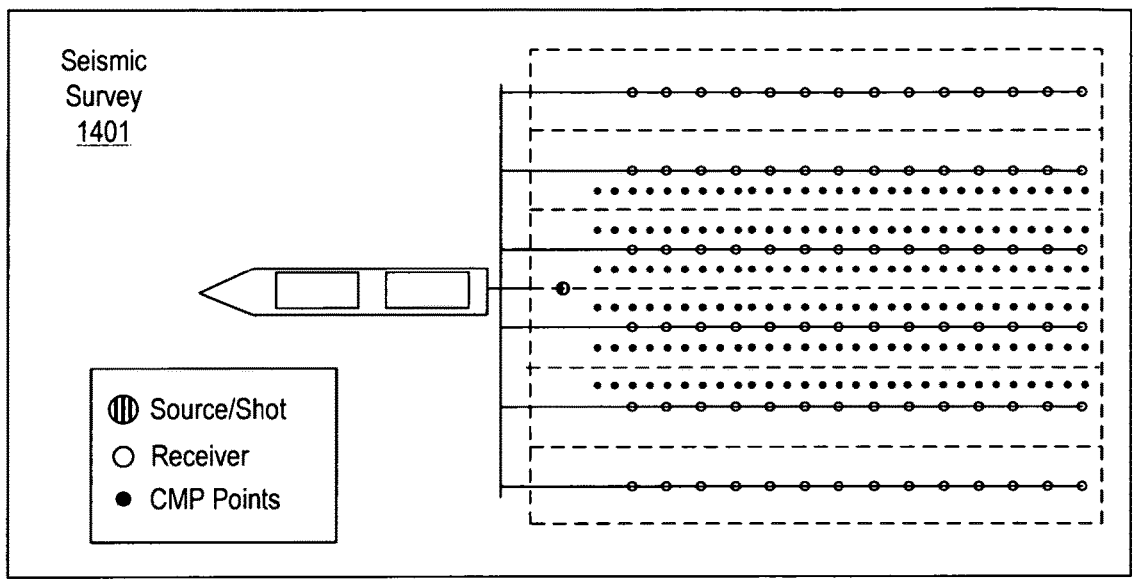
GUI 1410
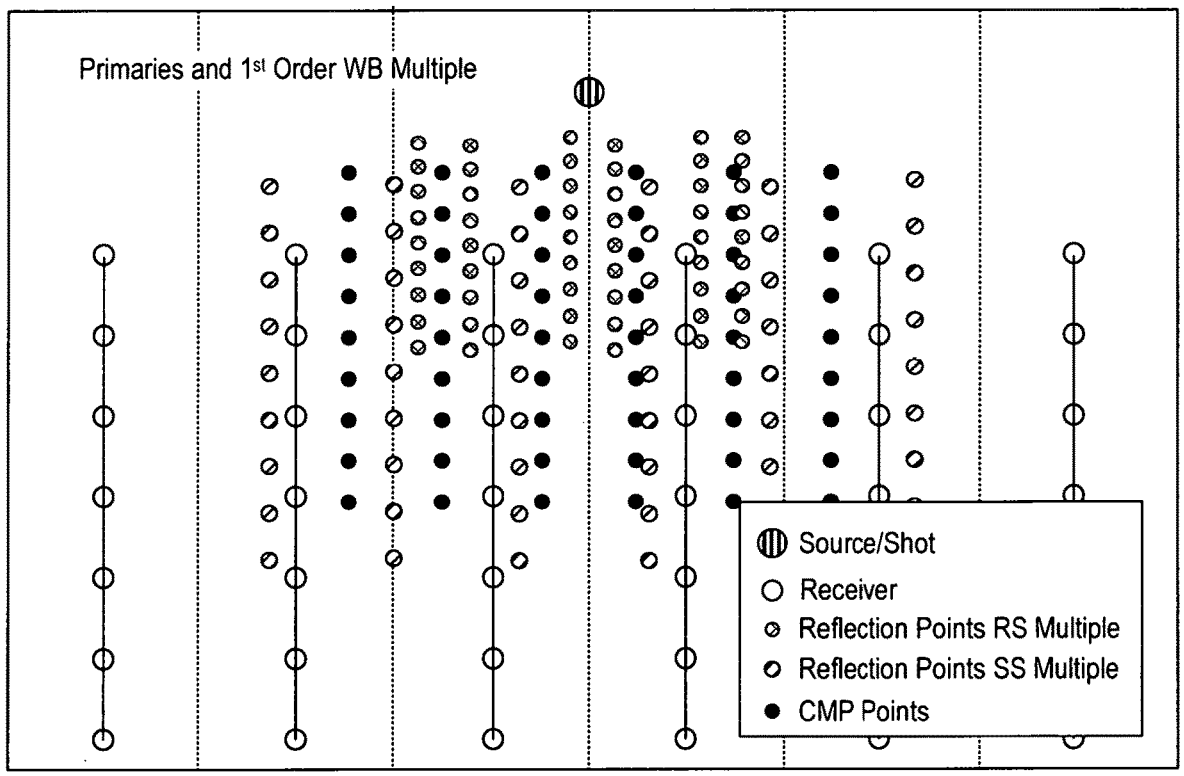
Fig. 14

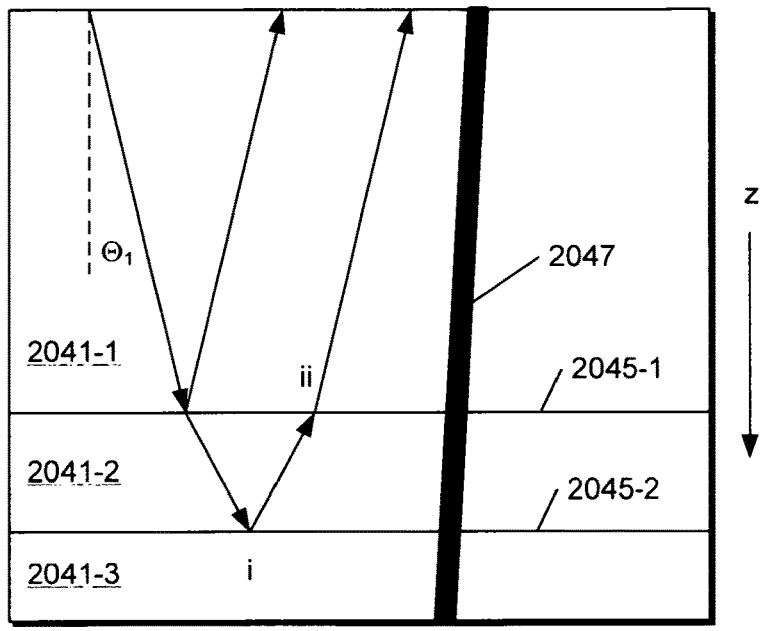
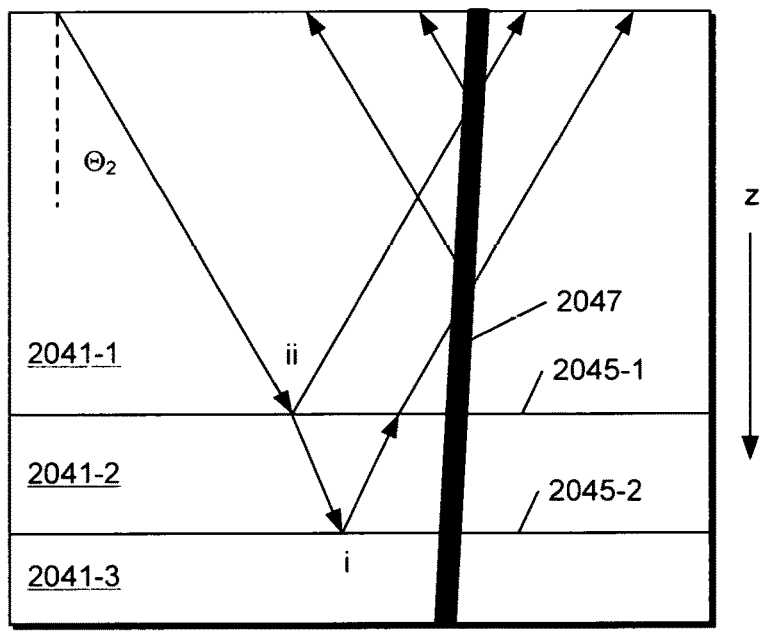
Fig. 20

Primary
2134
Multiple
2138
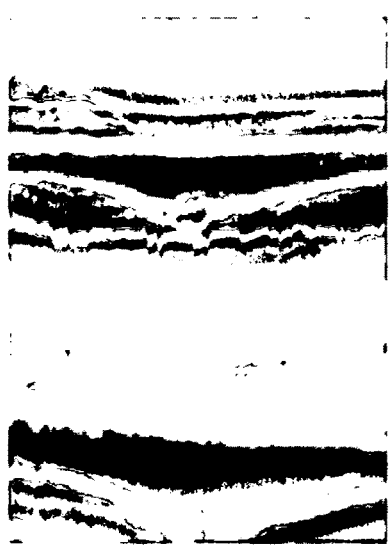
Primary
2154
Multiple
2158
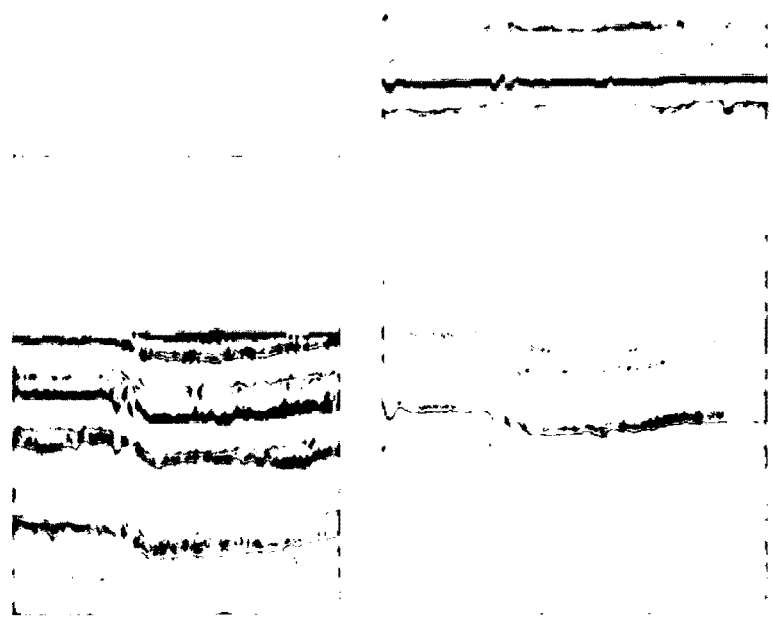
Fig. 21

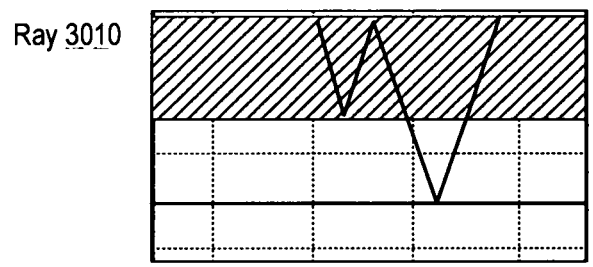
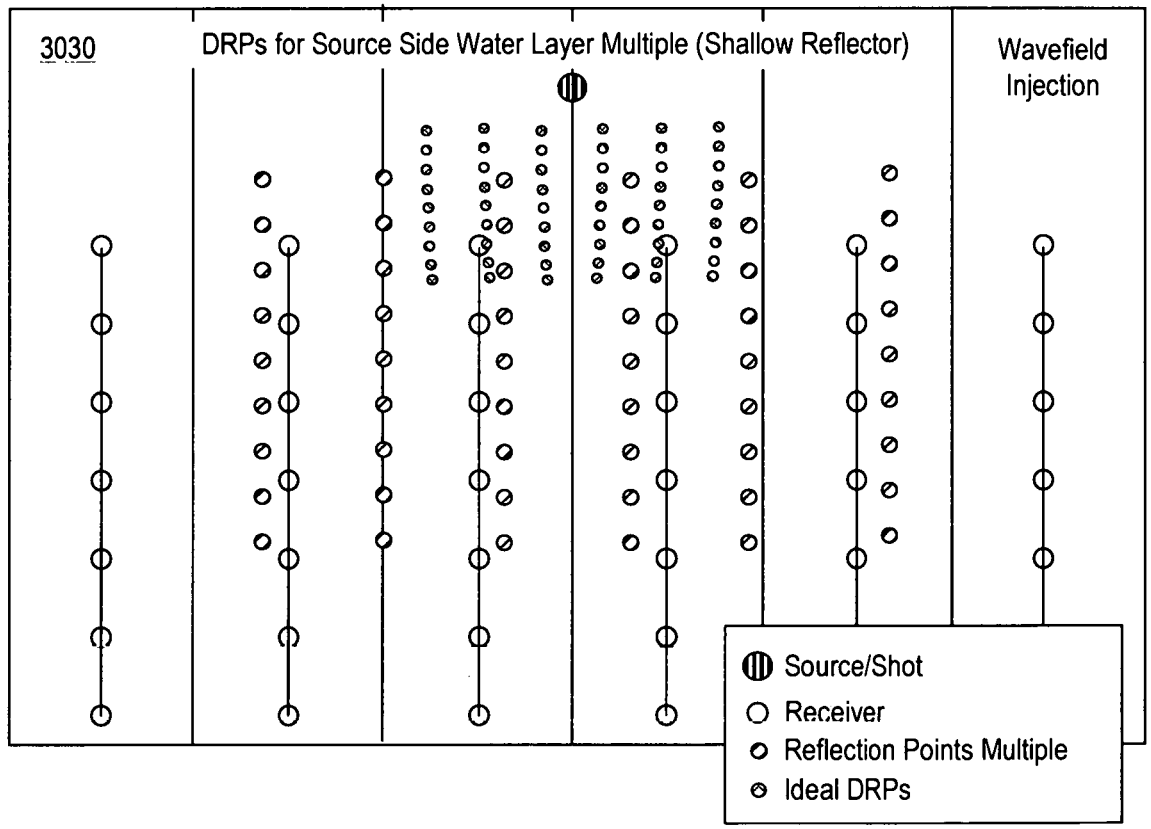
Fig. 30

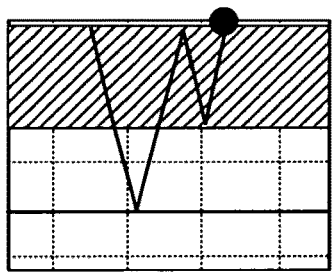
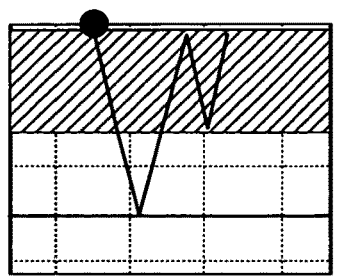
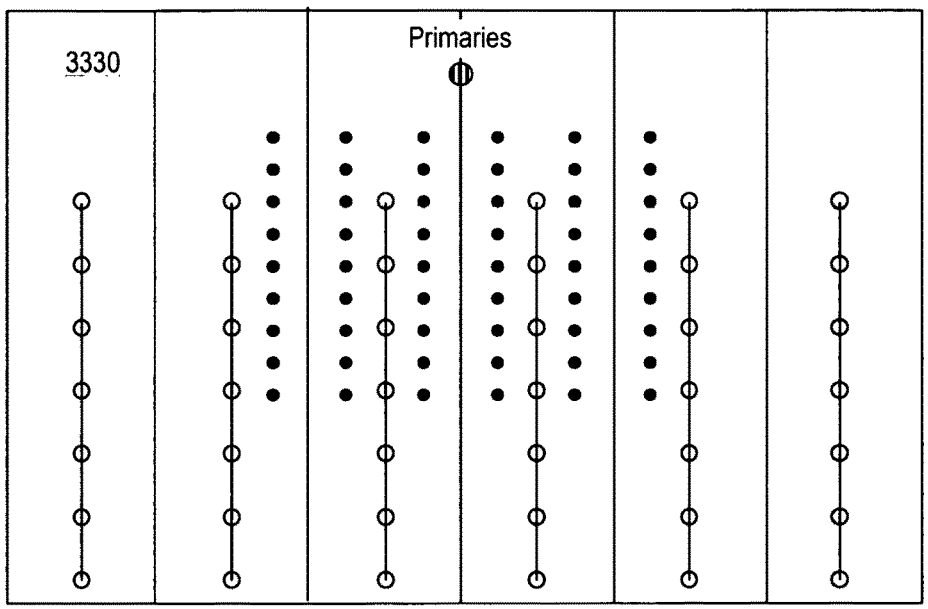
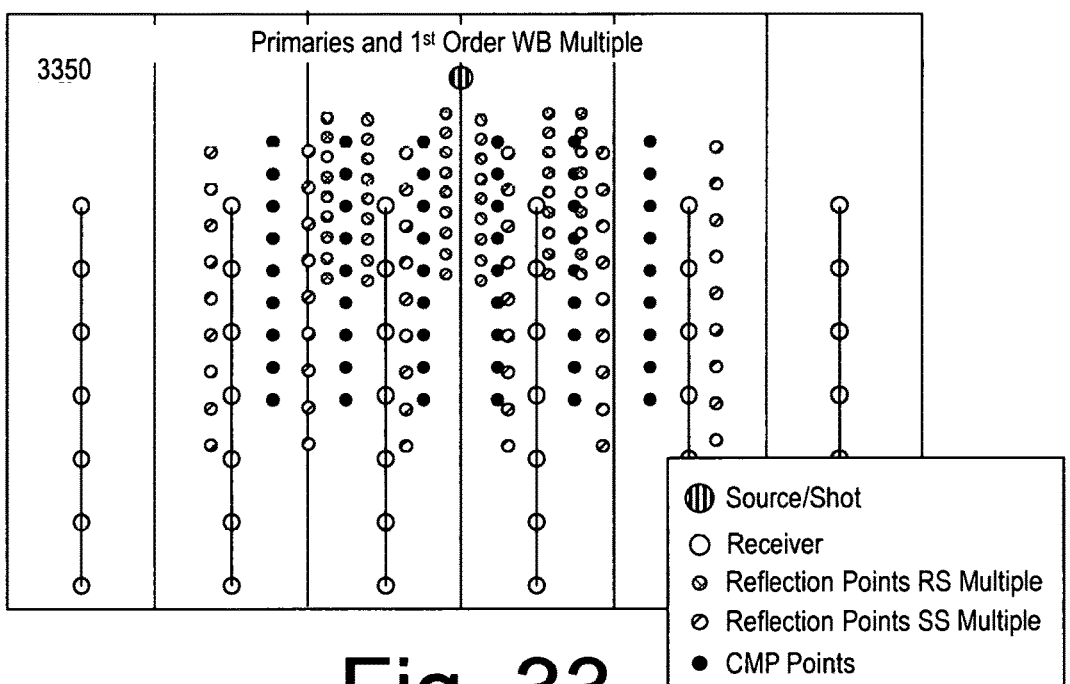
Fig. 33

REFLECTION SEISMOLOGY MULTIPLE IMAGING

RELATED APPLICATION

This application claims priority to and the benefit of a U.S. Provisional Application having Ser. No. 62/546,487, filed 16 Aug. 2017, which is incorporated by reference herein.

BACKGROUND

Reflection seismology finds use in geophysics, for example, to estimate properties of subsurface formations (e.g., to characterize a subterranean environment with one or more formations). As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Propagation of seismic energy, as in reflection seismology, can depend on one or more characteristics of a subsurface medium or media. Reflection seismology data can be used to understand or characterize one or more subsurface formations.

SUMMARY

A method can include receiving seismic data for a geologic region of the Earth; building a velocity model of the geologic region of the Earth; selecting at least one mode of multiple and corresponding travel time data from a data storage where the travel time data correspond to at least one complex ray signature in the geologic region of the Earth and are based at least in part on the velocity model; performing migration on the seismic data using at least the selected travel time data to generate processed seismic data; and rendering an image of the geologic region of the Earth to a display where the image includes at least a multiple image based at least in part on the processed seismic data. A system can include a processor; memory accessible by the processor; and processor-executable instructions stored in the memory that are executable to instruct the system to: receive seismic data for a geologic region of the Earth; build a velocity model of the geologic region of the Earth; select at least one mode of multiple and corresponding travel time data from a data storage where the travel time data correspond to at least one complex ray signature in the geologic region of the Earth and are based at least in part on the velocity model; perform migration on the seismic data using at least the selected travel time data to generate processed seismic data; and render an image of the geologic region of the Earth to a display where the image includes at least a multiple image based at least in part on the processed seismic data. One or more computer-readable storage media can include computer-executable instructions executable to instruct a computer to: receive seismic data for a geologic region of the Earth; build a velocity model of the geologic region of the Earth; select at least one mode of multiple and corresponding travel time data from a data storage where the travel time data correspond to at least one complex ray signature in the geologic region of the Earth and are based at least in part on the velocity model; perform migration on the seismic data using at least the selected travel time data to generate processed seismic data; and render an image of the geologic region of the Earth to a display where the image includes at least a multiple image based at least in part on the processed seismic data.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates an example of a geologic environment and an example of a technique;

FIG. 2 illustrates examples of signals, an example of a technique and examples of interbed multiple reflections (e.g., internal multiples);

FIG. 3 illustrates examples of an environment, an example of a method and an example of a convention;

FIG. 4 illustrates an example of a survey technique;

FIG. 6 illustrates examples of techniques;

FIG. 9 illustrates examples of methods;

FIG. 11 illustrates examples of graphical user interfaces (GUIs) as rendered to a display device;

FIG. 12 illustrates examples of ray signatures;

FIG. 14 illustrates examples of GUIs;

FIG. 20 illustrates examples of rays and layers with respect to survey angles;

FIG. 21 illustrates examples of images;

FIG. 30 illustrates examples of graphics associated with a method;

FIG. 33 illustrates examples of graphics associated with a method;

DETAILED DESCRIPTION

Figure 5:
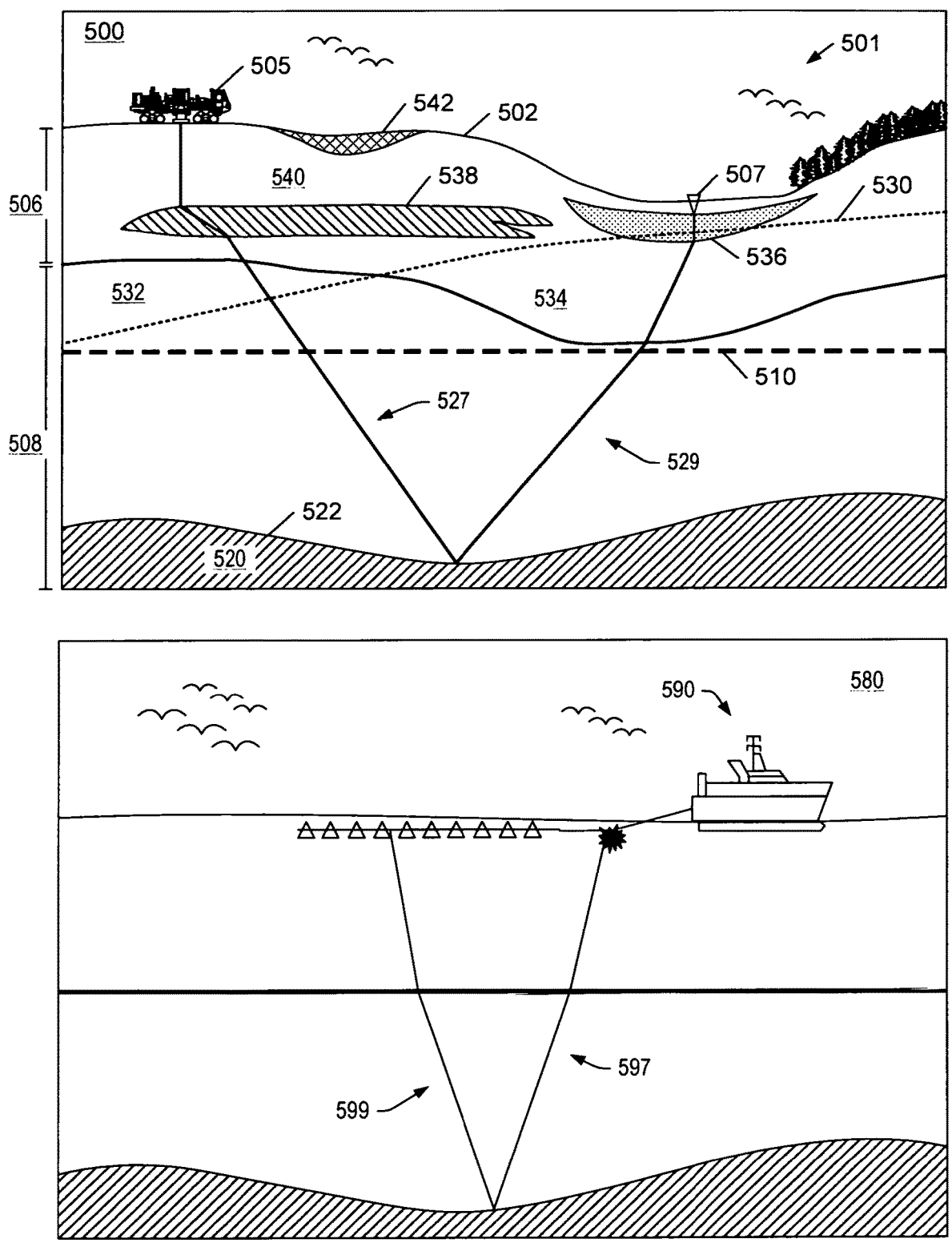
FIG. 5 illustrates an example of a survey technique in an example of a geologic environment.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than 1 Hz and/or optionally more than 100 Hz). Seismic data may be processed and interpreted, for example, to understand better composition, fluid content, extent and geometry of subsurface rocks.

Digital images of a subsurface region of the Earth can be generated using digital seismic data acquired using reflection seismology as part of a seismic survey. A digital image can show subterranean structure, for example, as related to one or more of exploration for petroleum, natural gas, and mineral deposits. As an example, reflection seismology can include determining time intervals that elapse between initiation of a seismic wave at a selected shot point (e.g., the location where an explosion generates seismic waves) and the arrival of reflected or refracted impulses at one or more seismic detectors (e.g., sensing of seismic energy at one or more seismic receivers). As an example, a seismic air gun can be used to initiate seismic waves. As an example, one or more electric vibrators or falling weights (e.g., thumpers) may be employed at one or more sites. Upon arrival at the detectors, the amplitude and timing of seismic energy waves can be recorded, for example, as a seismogram (e.g., a record of ground vibrations).

In various regions of the Earth, the material density (e.g., rock density) increases with depth. Seismic energy waves can be initiated at a shot point (or points) at or near the surface where a portion of the seismic energy, as waves, may reach one or more receiving points. Material properties and structural organization of materials (e.g., as objects, layers, etc.) can affect seismic energy waves in one or more manners. Received seismic energy waves can be utilized to determine one or more types of material properties and/or structural organization of one or more types of materials. As with sound traveling through air or water, seismic energy waves can be attenuated as they pass through subsurface materials, which may include air, water, hydrocarbons, rock, etc. Such attenuation can occur in a manner that is dependent on material properties of such materials.

Interpretation of the depths and media reached by seismic energy waves can depend on geometry of a seismic survey, for example, on the distance between shot points and receiving points, as well as densities of media. Results of a seismic survey may be in digital form (e.g., digital data) as stored in memory of a computing device where display circuitry (e.g., a graphics processor, a video processor, etc.) can render the digital data to a display in the form of a cross-sectional image of subsurface structures as if cut by a plane through the shot point, the detector, and a reference point such as the Earth's center. As an example, digital image processing can involve receiving seismic data as digital data, processing the seismic data via one or more techniques, and rendering processed seismic data to a display as an image of a region of the Earth that can show structural features of the Earth that otherwise are not visible from an observer standing on the surface of the Earth.

A seismic survey can be defined with respect to a region of the Earth and, for example, a manner of acquisition of seismic data. As an example, a survey may be two-dimensional, three-dimensional, four-dimensional, etc. Dimensions include one or more spatial dimensions and optionally one or more temporal dimensions (e.g., repeating a survey for a region at different points in time). As to a 2D survey, a grid may be considered dense if the line spacing (e.g., of receivers) is less than about 400 m. As to a 3D spatial survey, in comparison to a 2D spatial survey, it may help to elucidate true structural dip (e.g., a 2D survey may give apparent dip), it may provide more and better stratigraphic information, it may provide a map view of reservoir properties, it may provide a better areal mapping of fault patterns and connections and delineation of reservoir blocks, it may provide better lateral resolution (e.g., 2D may suffer from a cross-line smearing, or Fresnel zone, problem).

As to data sets, a 3D spatial seismic data set can be a cube or volume of data. As an example, a 2D spatial seismic data set can be a panel of data. To interpret 3D seismic data, a method can process the "interior" of the cube (e.g., seismic cube) using one or more processors of computing equipment. As an example, a 3D seismic data set can range in size from a few tens of megabytes to several gigabytes or more.

As to a 3D seismic cube, a point can have an (x, y, z) coordinate and a data value. A coordinate can be a distance from a particular corner of the cube. A 3D seismic data volume is like a room-temperature example (e.g., where temperature differs in a cube shaped room), however, rather than a height of a room, a height or vertical axis can be in terms of a two-way travel time, which may be a proxy for depth. In such an example, the 3D seismic cube is still a spatial cube because the data therein correspond to the same survey where, rather than depth, two-way travel time (TWT) is utilized, which, can be, in general, a proxy for depth. And, in contrast to room-temperature, data values can be seismic amplitudes (e.g., amplitudes of seismic energy waves). A 3D seismic data set can be, for example, a box full of electronically determined numbers where each number represents a measurement (e.g., amplitude of a seismic energy wave, etc.). In a 3D seismic data set, amplitudes may be rendered as data values in the form of one or more images for slices through the 3D seismic data set where, for example, in grayscale, dark and light image bands in the sections are related to rock boundaries.

Reflection seismology can be implemented as a technique that detects "edges" of materials in the Earth. An image generated utilizing reflection seismology can show such edges of materials, which can be equated to positions in the Earth such that one may know where an edge of a material is in the Earth. For example, where the edge corresponds to a hydrocarbon reservoir, a method can include drilling to the reservoir in a manner guided by the position of the edge. As an example, a drilling process can be manual, semi-automated or automated where positional information as to an edge of a material in the Earth can be utilized to guide drilling equipment that forms a bore in the Earth where the bore may be directed to the edge or to a region that is defined at least in part by the edge. Where reflection seismology is improved, such an "edge" may be detected more readily and/or with greater accuracy (e.g., resolution), which, in turn, can improve one or more field processes such as a drilling process.

FIG. 1 shows an example of a geologic environment 100 (e.g., an environment that includes a sedimentary basin, a reservoir 101, a fault 103, one or more fractures 109, etc.) and an example of an acquisition technique 140 to acquire seismic data (see, e.g., data 160). As an example, a system may process data acquired by the technique 140, for example, to allow for direct or indirect management of sensing, drilling, injecting, extracting, etc., with respect to the geologic environment 100. In turn, further information about the geologic environment 100 may become available as feedback (e.g., optionally as input to the system). As an example, an operation may pertain to a reservoir that exists in the geologic environment 100 such as, for example, the reservoir 101. As an example, a technique may provide information (e.g., as an output) that may specifies one or more location coordinate of a feature in a geologic environment, one or more characteristics of a feature in a geologic environment, etc.

As an example, the geologic environment 100 may be referred to as or include one or more formations. As an example, a formation may be a unit of lithostratigraphy, for example, a body of rock that is sufficiently distinctive and continuous that it can be mapped. As an example, in stratigraphy, a formation may be a body of strata of predominantly one type or combination of types, for example, where multiple formations form groups, and subdivisions of formations are members.

As an example, a sedimentary basin may be a depression in the crust of the Earth, for example, formed by plate tectonic activity in which sediments accumulate. Over a period of geologic time, continued deposition may cause further depression or subsidence. With respect to a petroleum systems analysis, if rich hydrocarbon source rocks occur in combination with appropriate depth and duration of burial, hydrocarbon generation may possibly occur within a basin. Exploration plays and prospects may be developed in basins or regions in which a complete petroleum system has some likelihood of existing. The geologic environment 100 of FIG. 1 may include one or more plays, prospects, etc.

As an example, a system may be implemented to process seismic data, optionally in combination with other data. Processing of data may include generating one or more seismic attributes, rendering information to a display or displays, etc. A process or workflow may include interpretation, which may be performed by an operator that examines renderings of information and that identifies structure or other features within such renderings. Interpretation may be or include analyses of data with a goal to generate one or more models and/or predictions (e.g., about properties and/or structures of a subsurface region).

As an example, a system may include features of a framework such as the PETREL® seismic-to-simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment, decision making, operational control, etc.).

As an example, a system may include add-ons or plug-ins that operate according to specifications of a framework environment. For example, a framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components (e.g., modules, blocks, etc.) may be implemented as add-ons (or plug-ins) that conform to and operate according to specifications of a framework environment (e.g., according to application programming interface (API) specifications, etc.).

As an example, seismic data may be processed using a framework such as the OMEGA® framework (Schlumberger Limited, Houston, Tex.). The OMEGA® framework provides features that can be implemented for processing of seismic data, for example, through prestack seismic interpretation and seismic inversion. A framework may be scalable such that it enables processing and imaging on a single workstation, on a massive compute cluster, etc. As an example, one or more techniques, technologies, etc. described herein may optionally be implemented in conjunction with a framework such as, for example, the OMEGA® framework.

A framework for processing data may include features for 2D line and 3D seismic surveys. Modules for processing seismic data may include features for prestack seismic interpretation (PSI), optionally pluggable into a framework such as the OCEAN® framework. A workflow may be specified to include processing via one or more frameworks, plug-ins, add-ons, etc. A workflow may include quantitative interpretation, which may include performing pre- and post-stack seismic data conditioning, inversion (e.g., seismic to properties and properties to synthetic seismic), wedge modeling for thin-bed analysis, amplitude versus offset (AVO) and amplitude versus angle (AVA) analysis, reconnaissance, etc. As an example, a workflow may aim to output rock properties based at least in part on processing of seismic data. As an example, various types of data may be processed to provide one or more models (e.g., earth models). For example, consider processing of one or more of seismic data, well data, electromagnetic and magnetic telluric data, reservoir data, etc.

In the example of FIG. 1, the geologic environment 100 includes an offshore portion and an on-shore portion. As an example, a geologic environment may be or include one or more of an offshore geologic environment, a seabed geologic environment, an ocean bed geologic environment, etc.

As an example, the geologic environment 100 may be outfitted with any of a variety of sensors, detectors, actuators, etc. For example, equipment 102 may include communication circuitry to receive and to transmit information with respect to one or more networks 105. Such information may include information associated with downhole equipment 104, which may be equipment to acquire information, to assist with resource recovery, etc. Other equipment 106 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 105 that may be configured for communications, noting that the satellite may additionally or alternatively include circuitry for imagery (e.g., spatial, spectral, temporal, radiometric, etc.).

FIG. 1 also shows the geologic environment 100 as optionally including equipment 107 and 108 associated with a well that includes a substantially horizontal portion that may intersect with one or more of the one or more fractures 109. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 107 and/or 108 may include components, a system, systems, etc. for fracturing, seismic sensing, analysis of seismic data, assessment of one or more fractures, etc.

As an example, a system may be used to perform one or more workflows. A workflow may be a process that includes a number of worksteps. A workstep may operate on data, for example, to create new data, to update existing data, etc. As an example, a system may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.). As an example, a workflow may include rendering information to a display (e.g., a display device). As an example, a workflow may include receiving instructions to interact with rendered information, for example, to process information and optionally render processed information. As an example, a workflow may include transmitting information that may control, adjust, initiate, etc. one or more operations of equipment associated with a geologic environment (e.g., in the environment, above the environment, etc.).

In FIG. 1, the technique 140 may be implemented with respect to a geologic environment 141. As shown, an energy source (e.g., a transmitter) 142 may emit energy where the energy travels as waves that interact with the geologic environment 141. As an example, the geologic environment 141 may include a bore 143 where one or more sensors (e.g., receivers) 144 may be positioned in the bore 143. As an example, energy emitted by the energy source 142 may interact with a layer (e.g., a structure, an interface, etc.) 145 in the geologic environment 141 such that a portion of the energy is reflected, which may then be sensed by one or more of the sensors 144. Such energy may be reflected as an upgoing primary wave (e.g., or "primary" reflected wave). As an example, a portion of emitted energy may be reflected by more than one structure in the geologic environment and referred to as a multiple reflected wave (e.g., or "multiple").

For example, the geologic environment 141 is shown as including a layer 147 that resides below a surface layer 149. Given such an environment and arrangement of the source 142 and the one or more sensors 144, energy may be sensed as being associated with particular types of waves.

As an example, a "multiple" may refer to multiply reflected seismic energy or, for example, an event in seismic data that has incurred more than one reflection in its travel path. As an example, depending on a time delay from a primary event with which a multiple may be associated, a multiple may be characterized as a short-path or a peg-leg, for example, which may imply that a multiple may interfere with a primary reflection, or long-path, for example, where a multiple may appear as a separate event. As an example, seismic data may include evidence of an interbed multiple from bed interfaces, evidence of a multiple from a water interface (e.g., an interface of a base of water and rock or sediment beneath it) or evidence of a multiple from an air-water interface, etc.

As shown in FIG. 1, the acquired data 160 can include data associated with downgoing direct arrival waves, reflected upgoing primary waves, downgoing multiple reflected waves and reflected upgoing multiple reflected waves. The acquired data 160 is also shown along a time axis and a depth axis. As indicated, in a manner dependent at least in part on characteristics of media in the geologic environment 141, waves travel at velocities over distances such that relationships may exist between time and space. Thus, time information, as associated with sensed energy, may allow for understanding spatial relations of layers, interfaces, structures, etc. in a geologic environment.

FIG. 1 also shows various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that may characterize anisotropy of media (e.g., seismic anisotropy), consider the Thomsen parameters $\epsilon$, $\delta$ and $\gamma$. As an example, the Thomsen parameters $\epsilon$ and $\gamma$ may be estimated from wave data while estimation of the Thomsen parameter $\delta$ may involve access to additional information. As to prior information, one or more sources may provide values for parameters such as one or more of the Thomsen parameters. For example, a source may be a database that includes values for various types of media. A source may be an article such as, for example, Thomsen, "Weak elastic anisotropy", Geophysics, Vol. 51, No. 10, pp. 1954-1966, October 1986, which provides a table of measured anisotropy in sedimentary rocks where such rocks include sandstones, shales, mudshales, silty limestones, clayshales, laminated siltstones, tuff, crystals (e.g., hexagonal, etc.), gypsum weathered materials, etc.

As an example, seismic data may be acquired for a region in the form of traces. In the example of FIG. 1, the technique 140 may include the source 142 for emitting energy where portions of such energy (e.g., directly and/or reflected) may be received via the one or more sensors 144. As an example, energy received may be discretized by an analog-to-digital converter that operates at a sampling rate. For example, acquisition equipment may convert energy signals sensed by a sensor to digital samples at a rate of one sample per approximately 4 ms. Given a speed of sound in a medium or media, a sample rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

FIG. 2 shows an example of a technique 210 and acquired data 220, an example of a technique 240 and signals 242. As mentioned, a survey can include utilizing a source or sources and receivers. In the example technique 210, a source 212 is illustrated along with a plurality of receivers 214 that are spaced along a direction defined as an inline direction x. Along the inline direction x, distances can be determined between the source 212 and each of the receivers 214.

A subsurface region being surveyed includes features such as horizons p1, p2 and p3 that can be interfaces where elastic properties can differ such that seismic energy is at least in part reflected. For example, a horizon can be an interface that might be represented by a seismic reflection, such as the contact between two bodies of rock having different seismic velocity, density, porosity, fluid content, etc. In the example of FIG. 2, the technique 210 is shown to generate seismic reflections, which can include singly reflected and multiply reflected seismic energy. The acquired data 220 illustrate energy received by the receivers 214 with respect to time, t, and their inline position along the x-axis. As shown, singly reflected energy can be defined as primary (or primaries) while multiply reflected energy can be defined as multiples such as interbed multiples (e.g., IM).

A primary can be defined as a seismic event whose energy has been reflected once; whereas, a multiple can be defined as an event whose energy has been reflected more than once. With respect to seismic interpretation, whether manual, semi-automatic or automatic, various techniques may aim to enhance primary reflections to facilitate interpretation of one or more subsurface interfaces. In other words, multiples can be viewed as extraneous signal or noise that can interfere with an interpretation process. As an example, one or more method can utilize multiples to provide useful signals. For example, consider a seismic survey designed to increase seismic signal coverage of a subsurface region of the Earth through use of multiples.

Where multiples are considered undesirable, a process that aims to attenuate the presence of multiples (e.g., the presence of information in seismic data that corresponds to multiple energy) may include an adaptive subtraction process. An adaptive subtraction process can include modeling of multiples to generate a model (e.g., a multiples model) followed by subtracting the model from the acquired data. A technique that can be used for attenuation of multiples may be the extended internal multiple prediction (XIMP™), which is a data-driven multiple-modeling approach for prediction of internal multiples from recorded events using wavefield extrapolation, for example, based on the Kirchhoff integral. As explained below, a method can include selecting one or more modes of multiples for attenuation in a manner that preserves at least one selected mode of multiple and/or attenuating one or more modes of primaries in a manner that preserves at least one selected mode of multiple (see, e.g., FIG. 9, pre-process block 915, etc.).

In FIG. 2, the technique 240 can include emitting energy with respect to time where the energy may be represented in a frequency domain, for example, as a band of frequencies. In such an example, the emitted energy may be a wavelet and, for example, referred to as a source wavelet which has a corresponding frequency spectrum (e.g., per a Fourier transform of the wavelet).

As an example, a geologic environment may include layers 241-1, 241-2 and 241-3 where an interface 245-1 exists between the layers 241-1 and 241-2 and where an interface 245-2 exists between the layers 241-2 and 241-3. As illustrated in FIG. 2, a wavelet may be first transmitted downward in the layer 241-1; be, in part, reflected upward by the interface 245-1 and transmitted upward in the layer 241-1; be, in part, transmitted through the interface 245-1 and transmitted downward in the layer 241-2; be, in part, reflected upward by the interface 245-2 (see, e.g., "i") and transmitted upward in the layer 241-2; and be, in part, transmitted through the interface 245-1 (see, e.g., "ii") and again transmitted in the layer 241-1. In such an example, signals (see, e.g., the signals 262) may be received as a result of wavelet reflection from the interface 245-1 and as a result of wavelet reflection from the interface 245-2. These signals may be shifted in time and in polarity such that addition of these signals results in a waveform that may be analyzed to derive some information as to one or more characteristics of the layer 241-2 (e.g., and/or one or more of the interfaces 245-1 and 245-2). For example, a Fourier transform of signals may provide information in a frequency domain that can be used to estimate a temporal thickness (e.g., $\Delta zt$) of the layer 241-2 (e.g., as related to acoustic impedance, reflectivity, etc.).

As explained, interbed multiple signals may be received by one or more receivers over a period of time in a manner that acts to "sum" their amplitudes with amplitudes of other signals. In such an example, the additional interbed signals may interfere with an analysis that aims to determine one or more characteristics of the layer 241-2 (e.g., and/or one or more of the interfaces 245-1 and 245-2). For example, interbed multiple signals may interfere with identification of a layer, an interface, interfaces, etc. (e.g., consider an analysis that determines temporal thickness of a layer, etc.). However, as mentioned, a method can include utilizing multiples in a manner or manners that aims to enhance a seismic survey.

FIG. 3 shows an example of a sedimentary basin 310 (e.g., a geologic environment), an example of a method 320 for model building (e.g., for a simulator, etc.), an example of a formation 330, an example of a borehole 335 in a formation, an example of a convention 340 and an example of a system 350.

As an example, data acquisition, reservoir simulation, petroleum systems modeling, etc. may be applied to characterize various types of subsurface environments, including environments such as those of FIG. 1.

In FIG. 3, the sedimentary basin 310, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 320 includes a data acquisition block 324 and a model geometry block 328. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

The aforementioned modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETRO-MOD® framework data analyzed using PETREL® framework capabilities), and coupling of workflows. As an example, the TECHLOG® framework may be implemented in a workflow, for example, using one or more features for petrophysics (core and log), geology, drilling, reservoir and production engineering, and geophysics.

As shown in FIG. 3, the formation 330 includes a horizontal surface and various subsurface layers. As an example, a borehole may be vertical. As another example, a borehole may be deviated. In the example of FIG. 3, the borehole 335 may be considered a vertical borehole, for example, where the z-axis extends downwardly normal to the horizontal surface of the formation 330. As an example, a tool 337 may be positioned in a borehole, for example, to acquire information. As mentioned, a borehole tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, data can include geochemical data. For example, consider data acquired using X-ray fluorescence (XRF) technology, Fourier transform infrared spectroscopy (FTIR) technology and/or wireline geochemical technology.

As an example, one or more probes may be deployed in a bore via a wireline or wirelines. As an example, a probe may emit energy and receive energy where such energy may be analyzed to help determine mineral composition of rock surrounding a bore. As an example, nuclear magnetic resonance may be implemented (e.g., via a wireline, downhole NMR probe, etc.), for example, to acquire data as to nuclear magnetic properties of elements in a formation (e.g., hydrogen, carbon, phosphorous, etc.).

As an example, lithology scanning technology may be employed to acquire and analyze data. For example, consider the LITHO SCANNER™ technology marketed by Schlumberger Limited (Houston, Tex.). As an example, a LITHO SCANNER™ tool may be a gamma ray spectroscopy tool.

As an example, a borehole may be vertical, deviated and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the aforementioned TECHLOG® framework (Schlumberger Limited, Houston, Tex.).

As to the convention 340 for dip, as shown, the three dimensional orientation of a plane can be defined by its dip and strike, which can be considered to be types of orientation information (e.g., structural orientation information). Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 340 of FIG. 3, various angles φ indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 3 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 340 of FIG. 3). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 340 of FIG. 3). Apparent dip may be the dip of a plane as measured in any other direction except in the direction of true dip (see, e.g., $\phi_A$ as $Dip_A$ for angle $\alpha$); however, it is possible that the apparent dip is equal to the true dip (see, e.g., $\phi$ as $Dip_A=Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 340 of FIG. 3, the dip of a plane as seen in a cross-section perpendicular to the strike is true dip (see, e.g., the surface with $\phi$ as $Dip_A=Dip_T$ for angle $\alpha_{90}$ with respect to the strike). As indicated, dip observed in a cross-section in any other direction is apparent dip (see, e.g., surfaces labeled $Dip_A$). Further, as shown in the convention 340 of FIG. 3, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation and borehole azimuth) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 340 may be used with respect to an analysis, an interpretation, an attribute, etc. (e.g., consider a PETREL® seismic-to-simulation framework workflow, etc.). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 3, the system 350 includes one or more information storage devices 352, one or more computers 354, one or more networks 360 and one or more sets of instructions 370. As to the one or more computers 354, each computer may include one or more processors (e.g., or processing cores) 356 and memory 358 for storing instructions, for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 352.

As an example, the one or more sets of instructions 370 may include instructions stored in memory and accessible to one or more of the one or more processors 356 in a manner that allows for execution thereof by such of one or more processors 356 to instruct the system 350 to perform various actions. As an example, the system 350 may be configured such that the one or more sets of instructions 370 provide for establishing the framework or a portion thereof. As an example, one or more methods, techniques, etc. may be performed using one or more sets of instructions, which may be, for example, one or more of the one or more sets of instructions 370 of FIG. 3.

As mentioned, seismic data may be acquired and analyzed to understand better subsurface structure of a geologic environment. Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than 1 Hz and/or optionally more than 100 Hz). Seismic data may be processed and interpreted, for example, to understand better composition, fluid content, extent and geometry of subsurface rocks.

FIG. 4 shows an example of a simplified schematic view of a land seismic data acquisition system 400 and an example of a simplified schematic view of a marine seismic data acquisition system 440.

As shown with respect to the system 400, an area 402 to be surveyed may or may not have physical impediments to direct wireless communication between a recording station 414 (which may be a recording truck) and a vibrator 404. A plurality of vibrators 404 may be employed, as well as a plurality of sensor unit grids 406, each of which may have a plurality of sensor units 408.

As illustrated in FIG. 4 with respect to the system 400, approximately 24 to about 28 sensor units 408 may be placed in a vicinity (a region) around a base station 410. The number of sensor units 408 associated with each base station 410 may vary from survey to survey. Circles 412 indicate an approximate range of reception for each base station 410.

In the system 400 of FIG. 4, the plurality of sensor units 408 may be employed in acquiring and/or monitoring land-seismic sensor data for the area 402 and transmitting the data to the one or more base stations 410. Communications between the vibrators 404, the base stations 410, the recording station 414, and the seismic sensors 408 may be wireless (at least in part via air for a land-based system; or optionally at least in part via water for a sea-based system).

In the system 440 of FIG. 4, one or more source vessels 440 may be utilized with one or more streamer vessels 448 or a vessel or vessels may tow both a source or sources and a streamer or streamers 452. In the example of FIG. 4, the vessels 444 and 448 (e.g., or just the vessels 448 if they include sources) may follow predefined routes (e.g., paths) for an acquisition geometry that includes inline and crossline dimensions. As shown, routes 460 can be for maneuvering the vessels to positions 464 as part of the survey. As an example, a marine seismic survey may call for acquiring seismic data during a turn (e.g., during one or more of the routes 460).

The example systems 400 and 440 of FIG. 4 demonstrate how surveys may be performed according to an acquisition geometry that includes dimensions such as inline and crossline dimensions, which may be defined as x and y dimensions in a plane or surface where another dimension, z, is a depth dimension. As explained, time can be a proxy for depth, depending on various factors, which can include knowing how many reflections may have occurred as a single reflection may mean that depth of a reflector can be approximated using one-half of a two-way travel time, some indication of the speed of sound in the medium and positions of the receiver and source (e.g., corresponding to the two-way travel time).

Two-way travel time can be defined as the elapsed time for a seismic wave to travel from its source to a given reflector and return to a receiver (e.g., at a surface, etc.). As an example, a minimum two-way travel time can be defined to be that of a normal-incidence wave with zero offset.

As an example, a seismic survey can include points referred to as common midpoints (CMPs). In multichannel seismic acquisition, a CMP is a point that is halfway between a source and a receiver that is shared by a plurality of source-receiver pairs. Such redundancy among source-receiver pairs can enhance quality of seismic data, for example, via stacking of the seismic data. A CMP can be vertically above a common depth point (CDP), or common reflection point (CRP).

As an example, a seismic survey can include points referred to as downward reflection points (DRPs). A DRP is a point where seismic energy is reflected downwardly. For example, where multiple interfaces exists, seismic energy can reflect upwardly from one interface, reach a shallower interface and then reflect downwardly from the shallower interface. Referring to FIG. 2, the technique 210 is illustrated with p2 being deeper than p1 such that a DRP exists along p1.

As an example, a seismic survey may be an amplitude variation with offset (AVO) survey. Such a survey can record variation in seismic reflection amplitude with change in distance between position of a source and position of a receiver, which may indicate differences in lithology and fluid content in rocks above and below a reflector.

AVO analysis can allow for determination of one or more characteristics of a subterranean environment (e.g., thickness, porosity, density, velocity, lithology and fluid content of rocks, etc.). As an example, gas-filled sandstone might show increasing amplitude with offset; whereas, a coal might show decreasing amplitude with offset. AVO analysis can be suitable for young, poorly consolidated rocks, such as those in the Gulf of Mexico.

As an example, a method may be applied to seismic data to understand better how structural dip may vary with respect to offset and/or angle as may be associated with emitter-detector (e.g., source-receiver) arrangements of a survey, for example, to estimate how suitable individual offset/angle gathers are for AVO imaging. A gather may be a collection of seismic traces that share an acquisition parameter, such as a common midpoint, with other collections of seismic traces. For example, consider an AVO survey that includes a plurality of emitter-detector arrangements (e.g., source-receiver pairs) with corresponding angles defined with respect to a common midpoint (CMP). Given a CMP, acquired survey data may be considered to cover a common subsurface region (e.g., a region that includes the midpoint)

As an example, a method can include taking into account one or more considerations of offset and/or reflection point(s) for primaries and for multiples where, for example, one or more considerations may differ for a primary or primaries compared to a multiple or multiples. As mentioned, factors such as angles can differ for multiples as well as reflection point(s), as a multiple is associated with more than one reflection point. Such factors can be utilized to improve imaging, for example, by filling in a primary coverage gap, more closely approaching an object (e.g., a geobody), more closely approach an obstruction, etc.

As to a formation that is anisotropic, use of multiples may provide information that can be utilized to determine or otherwise characterize anisotropy. For example, anisotropy may be better characterized where information is acquired at one or more particular angles. In such an example, an angle of a multiple may be associated with energy passing through a layer of material in a manner that can elucidate type of anisotropy or, for example, having seismic data for more angles that provided by primaries alone can help to elucidate anisotropy. Anisotropy can be a variation of a property of a material with the direction in which it is measured. In rocks, variation in seismic velocity measured parallel and perpendicular to bedding surfaces can be indicative of anisotropy. However, in a seismic survey, angles directly parallel and directly perpendicular may not be readily available. Where primaries alone are utilized, an angle or range of angles may be limited; whereas, use of one or more multiples can enhance angle coverage. Further, certain types of multiples may be associated with a layer of material for which anisotropy is to be better understood. As an example, one or more multiples may be selected that are for seismic energy that passes multiple times through a layer, whether one a receiver side, a source side or a receiver side and a source side. As an example, a layer of material can include one or more platy minerals such as micas and clays that tend to align parallel to depositional bedding as sediments are compacted; noting that anisotropy tends to exist in various shales.

FIG. 5 shows an example of a land system 500 and an example of a marine system 580. The land system 500 is shown in a geologic environment 501 that includes a surface 502, a source 505 at the surface 502, a near-surface zone 506, a receiver 507, a bedrock zone 508 and a datum 510 where the near-surface zone 506 (e.g., near-surface region) may be defined at least in part by the datum 510, which may be a depth or layer or surface at which data above are handled differently than data below. For example, a method can include processing seismic data that aims to "place" the source 505 and the receiver 507 on a datum plane defined by the datum 510 by adjusting (e.g., "correcting") travel times for propagation through the near-surface region (e.g., a shallower subsurface region).

In the example system 500 of FIG. 5, the geologic environment 501 can include various features such as, for example, a layer 520 that defines an interface 522 that can be a reflector, a water table 530, a leached zone 532, a glacial scour 534, a buried river channel 536, a region of material 538 (e.g., ice, evaporates, volcanics, etc.), a high velocity zone 540, and a region of material 542 (e.g., Eolian or peat deposits, etc.).

In FIG. 5, the land system 500 is shown with respect to downgoing rays 527 (e.g., downgoing seismic energy) and upgoing rays 529 (e.g., upgoing seismic energy). As illustrated the rays 527 and 529 pass through various types of materials and/or reflect off of various types of materials.

Various types of seismic surveys can contend with surface unevenness and/or near-surface heterogeneity. For example, a shallow subsurface can include large and abrupt vertical and horizontal variations that may be, for example, caused by differences in lithology, compaction cementation, weather, etc. Such variations can generate delays or advances in arrival times of seismic waves passing through them relative to waves that do not. By accounting for such time differences, a seismic image may be of enhanced resolution with a reduction in false structural anomalies at depth, a reduction in mis-ties between intersecting lines, a reduction in artificial events created from noise, etc.

As an example, a method can include adjusting for such time differences by applying a static, or constant, time shift to a seismic trace where, for example, applying a static aims to place a source and receiver at a constant datum plane below a near-surface zone. As an example, an amount by which a trace is adjusted can depend on one or more factors (e.g., thickness, velocity of near-surface anomalies, etc.).

In FIG. 5, the datum 510 is shown, for example, as a plane, below which strata may be of particular interest in a seismic imaging workflow. In a three-dimensional model of a geologic environment, a near surface region may be defined, for example, at least in part with respect to a datum. As an example, a velocity model may be a multidimensional model that models at least a portion of a geologic environment.

In the example of FIG. 5, the source 505 can be a seismic energy source such as a vibrator. As an example, a vibrator may be a mechanical source that delivers vibratory seismic energy to the Earth for acquisition of seismic data. As an example, a vibrator may be mounted on a vehicle (e.g., a truck, etc.). As an example, a seismic source or seismic energy source may be one or more types of devices that can generate seismic energy (e.g., an air gun, an explosive charge, a vibrator, etc.).

Vibratory seismic data can be seismic data whose energy source is a vibrator that may use a vibrating plate to generate waves of seismic energy. As an example, the frequency and the duration of emitted energy can be controllable, for example, frequency and/or duration may be varied according to one or more factors (e.g., terrain, type of seismic data desired, etc.).

As an example, a vibrator may emit a linear sweep of a duration that is of the order of seconds (e.g., at least seven seconds, etc.), for example, beginning with high frequencies and decreasing with time (downsweeping) or going from low to high frequency (upsweeping). As an example, frequency may be changed (e.g., varied) in a nonlinear manner (e.g., certain frequencies are emitted longer than others, etc.). In various vibrator scenarios, resulting source wavelet can be one that is not impulsive. As an example, parameters of a vibrator sweep can include start frequency, stop frequency, sweep rate and sweep length.

As an example, a vibrator may be employed in land acquisition surveys for areas where explosive sources may be contraindicated (e.g., via regulations, etc.). As an example, more than one vibrator can be used simultaneously (e.g., in an effort to improve data quality, etc.).

As an example, a receiver may be a may be a UniQ™ sensor unit (Schlumberger Limited, Houston, Tex.). As an example, a sensor unit can include a geophone, which may be configured to detect motion in a single direction. As an example, a geophone may be configured to detect motion in a vertical direction. As an example, three mutually orthogonal geophones may be used in combination to collect so-called 3C seismic data. As an example, a sensor unit that can acquire 3C seismic data may allow for determination of type of wave and its direction of propagation. As an example, a sensor assembly or sensor unit may include circuitry that can output samples at intervals of 1 ms, 2 ms, 4 ms, etc. As an example, an assembly or sensor unit can include an analog to digital converter (ADC) such as, for example, a 24-bit sigma-delta ADC (e.g., as part of a geophone or operatively coupled to one or more geophones). As an example, a sensor assembly or sensor unit can include synchronization circuitry such as, for example, GPS synchronization circuitry with an accuracy of about plus or minus 12.5 microseconds. As an example, an assembly or sensor unit can include circuitry for sensing of real-time and optionally continuous tilt, temperature, humidity, leakage, etc. As an example, an assembly or sensor unit can include calibration circuitry, which may be self-calibration circuitry.

Referring again to the geologic environment 501, multiples can be generated via various interfaces where such multiples may be of different types, orders, modes, etc. The geologic environment 501 illustrates how an environment may differ with respect to depth as well as some issues that may arise with respect to imaging of shallower depths.

In FIG. 5, the system 580 includes equipment 590, which can be a vessel that tows one or more sources and one or more streamers (e.g., with receivers). In the system 580, a source of the equipment 590 can emit energy at a location and a receiver of the equipment 590 can receive energy at a location. The emitted energy can be at least in part along a path of the downgoing energy 597 and the received energy can be at least in part along a path of the upgoing energy 599.

In the examples of FIG. 5, the paths are illustrated as single reflection paths for sake of simplicity. In the environments illustrated, additional interactions, reflections can be expected. For example, ghosts may be present. A ghost can be defined as a short-path multiple, or a spurious reflection that occurs when seismic energy initially reverberates upward from a shallow subsurface and then is reflected downward, such as at the base of weathering or between sources and receivers and the sea surface. As an example, the equipment 590 can include a streamer that is configured to position receivers a distance below an air-water interface such that ghosts can be generated where upgoing energy impacts the air-water interface and then reflects downward to the receivers. In such an example, a process may be applied that aims to "deghost" seismic data. Deghosting can be applied to marine seismic survey data where such a process aims to attenuate signals that are downgoing from an air-water interface (i.e., sea surface interface).

Some examples of techniques that can process seismic data include migration and migration inversion, which may be implemented for purposes such as structural determination and subsequent amplitude analysis. In seismic exploration, signal can be defined as a part of a recorded seismic record (e.g., events) that is decipherable and useful for determining subsurface information (e.g., relevant to the location and production of hydrocarbons, etc.). Migration and migration inversion are techniques that can be used to extract subsurface information from seismic reflection data.

As an example, a migration technique can include predicting a coincident source and receiver at depth at a time equal to zero; an approach that may be extended for heterogeneous media and to accommodate two-way propagation in a local sense at points from the source to a target reflector and back from the reflector to the receiver and in a global sense, separately for each of the two legs from the source to the reflector and from the reflector to the receiver. Such an approach for two-way wave propagation migration may provide for quantitative and definitive definition of the roles of primaries and multiples in migration where, for example, migration of primaries can provide subsurface structure and amplitude information.

Various techniques that can be used to predict a wavefield inside a volume from (measured) values of a field on a surface surrounding the volume involve Green's theorem. Green's theorem may be implemented, for example, as part of a process for a finite volume model prediction of the so-called "source and receiver experiment" for two-way waves at depth. As an example, Green's theorem can predict a wavefield at an arbitrary depth z between a shallower depth "a" and a deeper depth "b".

Various aspects of imaging are described in Weglein, Multiples: Signal or noise?, Geophysics, Vol. 81, No. 4 (July-August 2016); P. V283-V302, which is incorporated by reference herein. Weglein further provides an overview of Green's theorem in Appendix B, which is incorporated by reference herein, along with other appendixes of Weglein.

FIG. 6 shows various illustrations 610, 620, 630 and 640 associated with mirror imaging of seismic data, which can be ocean bottom station (OBS) node data. Various aspects of imaging that involves mirror techniques (e.g., mirror migration, etc.) may be utilized. As an example, a method can include migration of ocean bottom node (OBN) data that is achieved by using particular multiples (downgoing receiver ghosts), which may be referred to as mirror migration because the sea surface takes the role as a mirror which reflects the image of subsurface structure. In such an approach, imaging of downgoing wavefield (downgoing waves that contain no primaries) could provide better and extended illumination of subsurface reflectors than imaging of primaries.

As to the illustration 610, poor illumination of sparse OBS is shown; noting that gaps in shallow reflectors coverage exist, which can be a problem that is exasperated if one or more OBS nodes fail. In the illustration 610, shots are shown with receivers dead and alive.

As to the illustration 620, the sea surface acts as a mirror for primary reflections where a downgoing receiver ghost is an upgoing primary reflected downward at the sea surface.

As to the illustration 630, it shows that imaging a ghost can be equivalent to imaging primaries recorded on a sea surface twice as high.

As to the illustration 640, it includes panels (a), (b) and (c) where Illumination of the upgoing wave (a) is narrower than that of the downgoing waves (b). In particular, the seabed cannot be imaged with the upgoing waves but it can be imaged with the downgoing waves (c). Another factor contributing to an improved image from the ghosts is velocity anomalies and scattering just under the seabed. As shown, the receiver in (b) is in effect further away from the seabed anomalies than the receiver in (a). A third factor is that the ghosts (b) are travelling in effect closer to vertical than the primaries (a).

As an example, poor illumination and sensitivity to velocity anomalies can be problems that negatively affect imaging of data from ocean bottom stations (OBS) and cables (OBC). As an example, a method can be implemented to produce better images from at least in part downgoing ghost reflections when compared to images produced from upgoing primary reflections alone. In such an example, there can be improved image generation due to improved illumination and reduced exposure to shallow inhomogeneous anomalies under the seabed.

As explained herein, as an example, a method may simplify a workflow for mirror migration with Kirchhoff depth migration. In such an example, complex ray signatures may be utilized that correspond to multiples.

Do to the nature of multiples, as recorded in seismic data, they include information about reflectivity of a subsurface as may be expected to be found in primaries, as recorded in seismic data. For example, an image reconstructed from multiples (e.g., as recorded in seismic data) may be expected to look quite similar to an image reconstructed from primaries (e.g., as recorded in seismic data). However, various ray-based depth imaging techniques tend to be directed to primaries such that they are not suitable for use to image multiples (e.g., multiple-based image generation).

As to various ray-based depth imaging techniques, such techniques can include Kirchhoff migration or Kirchhoff depth migration. As an example, a technique known as 3D Kirchhoff prestack depth migration (PSDM) may be utilized for depth imaging. As an example, consider a Kirchhoff PSDM approach that images arrivals propagating at relatively high angles of approximately 90° and beyond as turning waves; noting that image quality may be improved by an ability to honor vertical transverse isotropy (VTI) and/or tilted transverse isotropy (TTI). VTI is a type of isotropy that has a vertical axis of rotational symmetry. In layered rocks, properties can be relatively uniform horizontally within a layer, but vary vertically and from layer to layer. As an example, a Kirchhoff PSDM approach may be extended to allow direct ray-tracing through explicit surfaces in a velocity model, which may help generate more accurate travel times, resulting in better positioning and image fidelity.

Kirchhoff migration utilizes an integral form (Kirchhoff equation) of the wave equation. The Kirchhoff equation can be understood according to the principle that a wavefield at a given point in space and time can be considered as the superposition of waves propagating from adjacent points and earlier times. Specifically, the Kirchhoff equation is an integral form of the wave equation in which the wave function at a point can be represented as a sum (e.g., integral) of contributions from a surface enclosing the given point. Kirchhoffs integral theorem can use Green's identities to derive a solution to a homogeneous wave equation at an arbitrary point P in terms of the values of the solution of the wave equation and its first-order derivative at points on an arbitrary surface that encloses P.

Seismic migration can involve backpropagation (or continuation) of a seismic wavefield from a region where it was measured (e.g., Earth's surface, along a borehole, etc.) into a region to be imaged. In Kirchhoff migration, this may be accomplished by using the Kirchhoff integral representation of a field at a given point, for example, as a (weighted) superposition of waves propagating from adjacent points and times. Continuation of a wavefield can involve use of a background model of seismic velocity, which may be, for example, a model of constant and/or relatively smoothly varying velocity. Because of the integral form of Kirchhoff migration, its implementation can, at times, reduce to stacking data along curves that trace the arrival time of energy scattered by image points in a geologic environment.

As an example, a Kirchhoff migration workflow may include receiving prestack seismic data to be imaged by integrating the data over surfaces that are determined by the Green functions between source/receiver locations at the surface and the image point at depth. Referring again to the example geologic environment 501 of FIG. 5, various features can increase complexity, which may impact Kirchhoff migration. For example, where a seismic survey aims to image structures buried under complex overburden, complexity of an associated velocity model can cause multi-pathing in propagating wavefields, which, in turn, may result in integration surfaces being multivalued. Numerical estimation of such multivalued surfaces and numerical integration of the data over them can be likewise complex (e.g., more complex than for structurally simpler geologic environments).

As an example, a method can provide for selectively imaging different types and/or orders of multiples by introducing complex ray signatures in Kirchhoff depth migration travel time calculations. Such complex ray signatures may aim to account for structural complexity in a geologic environment. As an example, a ray signature method may be used to image one or more types of mixed P- and S-wave events as recorded in seismic data where, for example, mode conversion may take place at a reflection point and optionally elsewhere.

As an example, a method can include accessing and/or generating complex ray signatures to calculate travel times that correspond to, for example, a certain order and/or type of multiple and/or a certain sequence of mode conversions. In such an example, the method can include using those travel times in conjunction with Kirchhoff depth migration of corresponding multiple or mixed modes energy. For example, a method can enable utilization of one or more Kirchhoff depth migration techniques where complex ray signatures are accessed and/or generated. As an example, a method can allow for imaging of recorded multiple energy (e.g., as in seismic data) and, for example, allow for illuminating a wider area than primaries with smaller incident angles. As an example, a method can account for the presence of one or more obstructions where, for example, multiples can provide information in a manner that is spatially more accurate than for primaries in one or more regions adjacent to one or more obstructions.

As an example, a method can be utilized where a given order and type of multiples can be completely separated and/or can be utilized in a manner applicable to Kirchhoff imaging of partly separated multiples.

In various Kirchhoff depth migration techniques, to image primaries, source and receiver travel time tables are used in the migration where such tables include information that is generated based on a single ray signature. For example, when source and receivers are at the same datum, the same travel time table can be used for source and receivers side, invoking reciprocity.

Figure 7:
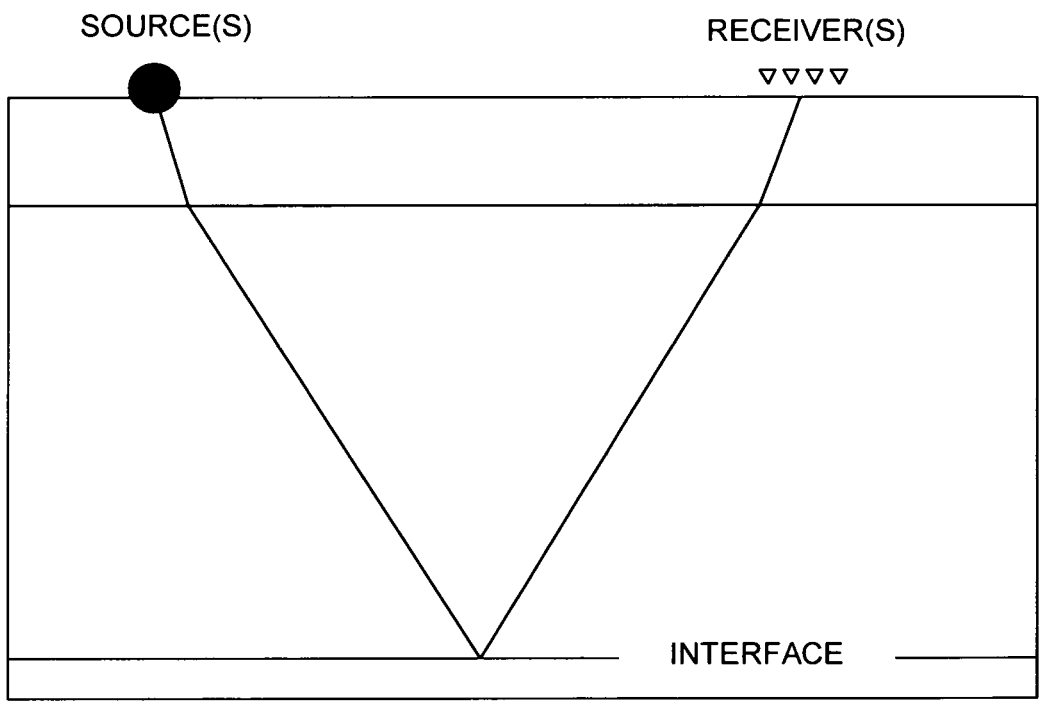
FIG. 7 illustrates an example of a ray signature.

FIG. 7 shows an example of a primary ray signature 710 which includes a source point and a receiver(s) point(s) as well as an interface (e.g., a reflector) in a geologic environment. As shown, the primary ray signature 710 includes a downgoing portion from the source to the interface at a reflection point where the primary ray signature 710 then includes an upgoing portion to the receiver(s).

Figure 8:
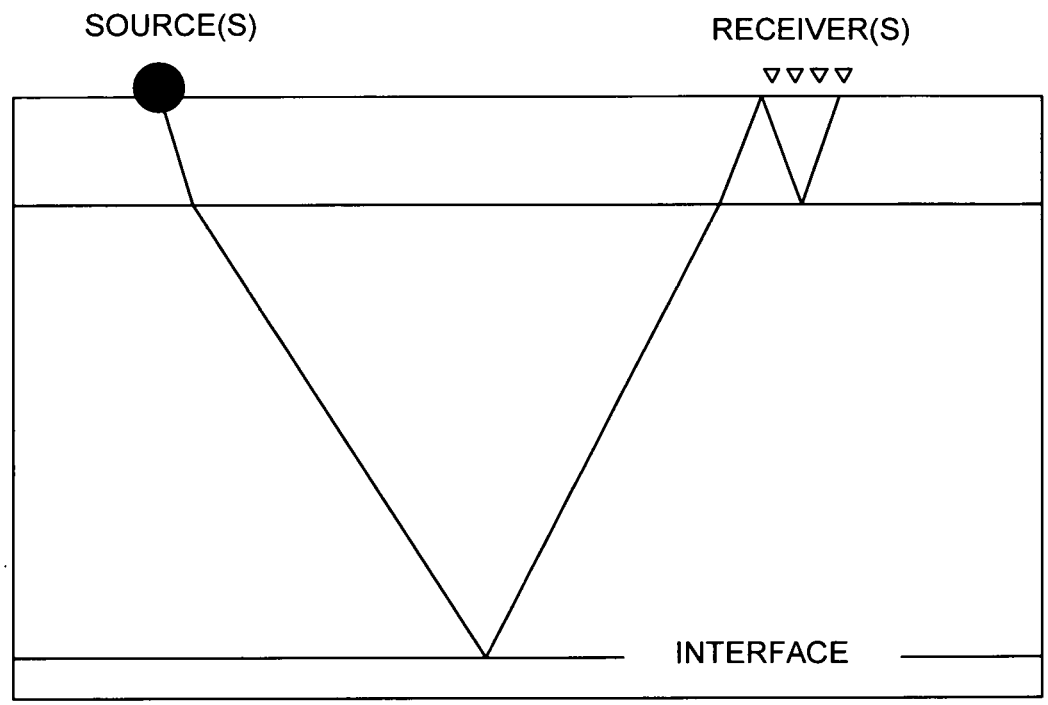
FIG. 8 illustrates an example of a ray signature.

FIG. 8 shows an example of a more complex ray signature 810 when compared to the primary ray signature 710 of FIG. 7 where the complex ray signature 810 includes a source point and a receiver (e.g., or receivers) point (e.g., or points) as well as an interface (e.g., a reflector) in a geologic environment where a reflection point exists on the interface that can be characterized as an upgoing reflection point (URP).

As an example, a complex ray signature can be used either on a source side, a receiver side or both to simulate ray-propagation of one or more multiples or, for example, one or more mixed mode converted waves. In the example signature 810 of FIG. 8, a receiver side water bottom multiple is illustrated where the receiver side travel times are generated using a ray signature with additional bounces at water bottom and free surface, while the source side travel times correspond to an ordinary single ray signature. While free-surface and water bottom are mentioned, the approach as illustrated in FIG. 8 may be applied to one or more other types and/or orders of multiples.

As an example, a method can include looking specifically at imaging one or more of different orders of multiples using an appropriate signature on input data where the multiple is either completely separated, partially separated or unseparated. As an example, a signature may be unique for an order and type of multiple. As an example, a method can include utilizing one or more Kirchhoff migrations where, for example, each Kirchhoff migration may include one or more than one complex signature. As an example, as to a multiple, an order can be a first order, a second order, a third order or a higher than third order.

As an example, a general ray type description may include different ray types for the different parts of a ray trace and thereby aim to appropriately image one or more mixed mode data set, for example, either completely separated, partially separated or unseparated.

As an example, certain orders of multiples may include their travel time calculated using a modified source/receiver position in modified model (for example mirror migration of OBC/OBN data); noting that true positions can be utilized in a real model.

As an example, a method can include utilizing complex ray signatures for imaging wider than the midpoint box and between streamers in a shallow region, for example, filling in gaps between adjacent sail lines in the shallow region.

As an example, a method can include imaging wider outside the node area for OBN surveys than the downgoing data alone.

As an example, a method can include imaging with smaller minimum incident angles particularly for outer streamers for improved shallow imaging including improved imaging for geohazard analysis.

As an example, a method can include imaging with smaller minimum incident angle for shallow reservoir imaging and AVO analysis of shallow reservoirs.

As an example, through imaging different orders and types of multiples, a method can image wider with smaller minimum incident angle and meet various desired imaging parameters, goals, etc.

As an example, a method may be implemented using a framework, such as, for example, the OMEGA™ framework. As an example, a method may be implemented using ISOMETRIX™ technology, which is a marine isometric seismic technology that provides single-sensor true 3D broadband measurements for full-bandwidth imaging of fine-scale structures in the subsurface in various directions (e.g., vertically, along the streamer, and crossline between the streamers), for detailed imaging from seabed to reservoir.

As an example, a method may be utilized in conjunction with the ISOMETRIX™ technology to improve shallow imaging, for example, as to geohazard analysis and better "site survey", etc. As an example, a complex ray signature approach may be combined with the ISOMETRIX™ technology to improve shallow imaging of a geologic environment, improve imaging of shallow reservoirs including AVO analysis of shallow reservoirs, etc.

As an example, a method may be utilized to provide for smaller incident angles from wide tows and/or wider imaging from OBN surveys.

As an example, a method may be utilized additionally and/or alternatively with one or more reverse time migration (RTM) techniques. Reverse-time migration is an ultrahigh-end prestack two-way wave-equation migration for accurate imaging in and below areas with structural and velocity complexities, such as sedimentary areas with steep salt inclusions. RTM may be utilized for generating images, for refining structural boundaries during velocity model building, etc. RTM may be computationally expensive and/or time consuming for high frequencies and may, for example, exhibit considerable crosstalk that may be difficult to suppress. In such examples, a complex ray signature approach may be implemented. Such an approach may be implemented as a preliminary imaging approach upon which one or more regions may be identified for further processing, optionally via RTM and/or one or more other techniques. In such an example, a complex ray signature approach may provide an image relatively quickly where the image may be assessed to determine what type of processing may follow for generating a more refined image, if such refinement is desired. As an example, results from a complex ray signature approach may be utilized to set-up and/or otherwise perform one or more imaging techniques. As an example, a method can include addressing crosstalk via selecting one or more multiples. In such a method, imaging can be improved by suppressing at least a portion of crosstalk.

As an example, a complex ray signature approach may be implemented where a "wider" solution is desired, which may be in accord with expansiveness of multiples as recorded in seismic data.

As an example, a complex ray approach may be implemented for imaging one or more shallow reservoirs, performing a shallow region hazard analysis, achieving wider tows with lower minimum incident angle, performing an AVO analysis for shallow reservoirs, wider imaging of OBN surveys, etc.

FIG. 9 shows an example of a method 900 and an example of a method 970. As shown, the method 900 includes a reception block 910 for receiving seismic data for a geologic region of the Earth; a build block 920 for building a velocity model of the geologic region of the Earth; an access, generate and/or selection block 930 for accessing, generating and/or selecting travel time data for at least one mode of multiple (e.g., from a data storage that includes travel time data corresponding to one or more complex ray signatures for one or more modes of multiples in the geologic region of the Earth where the travel time data are based at least in part on the velocity model); a performance block 940 for performing migration on the seismic data using at least the travel time data to generate processed seismic data; and a render block 950 to render an image of the geologic region of the Earth to a display where the image includes at least a multiple image based at least in part on the processed seismic data. As an example, a mode can refer to a type and/or an order of a multiple. As an example, a mode can refer to a characteristic or characteristics of a multiple. As an example, a mode can correspond to an angle, a distance, a depth, etc., associated with a multiple. For example, a mode can be a narrow angle, a wide angle, etc., as to a multiple. As an example, a method can include selecting travel time data where the travel time data is selected from travel time data for a plurality of complex ray signatures for a plurality of modes of multiples in a geologic region of the Earth based at least in part on a velocity model of the geologic region of the Earth.

As an example, the method 900 can include receiving seismic data for a geologic region of the Earth per the block 910; building a velocity model of the geologic region of the Earth per the block 920; selecting at least one mode of multiple and corresponding travel time data from a data storage where the travel time data correspond to at least one complex ray signature in the geologic region of the Earth and are based at least in part on the velocity model per the block 930; performing migration on the seismic data using at least the selected travel time data to generate processed seismic data per the block 940; and rendering an image of the geologic region of the Earth to a display where the image includes at least a multiple image based at least in part on the processed seismic data per the block 950. FIG. 9 also shows a pre-process block 915, which can be optional, for pre-processing the seismic data for purposes of attenuating undesired information such as one or more modes of primaries and/or one or more modes of multiples, which do not correspond to at least one mode of multiple selected for purposes of image generation. As shown, such pre-processing may be informed by the block 930 and can generate pre-processed seismic data for purposes of performing the migration per the block 940.

FIG. 9 also shows various computer-readable medium (CRM) blocks 911, 917, 921, 931, 941 and 951, which can include computer-executable instructions (e.g., processor-executable instructions) that can instruct a system to perform one or more of the actions associated with the method 900. For example, consider the system 350 of FIG. 3 where one or more of the CRM blocks can be included as the instructions 370 or as at least a portion of the instructions 370.

As to the method 970, it includes an identification block 972 for identifying reflectors as in the velocity of the region of Earth, a selection block 974 for selecting one or more multiples for purposes of travel time generation, a set block 976 for setting ray tracing parameters associated with the reflectors, a generation block 978 for generating travel times using the set ray tracing parameters and the velocity model and a storage block 980 for storing generated travel times in one or more data structures in one or more storage devices.

FIG. 9 also shows various computer-readable medium (CRM) blocks 973, 975, 977, 979 and 981, which can include computer-executable instructions (e.g., processor-executable instructions) that can instruct a system to perform one or more of the actions associated with the method 970. For example, consider the system 350 of FIG. 3 where one or more of the CRM blocks can be included as the instructions 370 or as at least a portion of the instructions 370.

As to the reflectors of the method 970, these can include associated parameters that indicate whether a ray is to be transmitted, to be reflected, etc. For example, consider a receiver side multiple where a subsurface reflector is to transmit upgoing seismic energy as reflected by a deeper reflector and to reflect downgoing seismic energy as reflected from a shallower reflector. A set of parameters can be assigned values for a particular type of multiple where the set of parameters are utilized by a ray tracing application executing using one or more processors to generate travel times for multiply reflected rays in the geologic environment represented by the velocity model. A computation framework can include one or more processors and can be operatively coupled to one or more data storages (e.g., data storage devices, etc.) where travel times can be stored as one or more data structures. As an example, a migration can include accessing one or more data structures and travel time data therein.

As an example, a computational system can include a plurality of processors (e.g., cores, etc.) that can be configured to process image data in parallel. For example, consider a scenario where three types of multiples are selected and where three parallel processes are executed to generate three separate images, each based at least in part on a corresponding one of the three types of multiples. In such an example, the system can be operatively coupled to a display such that the three separate images may be rendered to the display whereby various features of a subsurface region can be identified and understood better through inspection or analysis of one or more of the images. As an example, a computational system can provide for automated or semi-automated image analysis that can detect one or more structural features and/or that can determine one or more characteristics of one or more structural features based at least in part on one or more images rendered to a display where such images include selective multiple image information. As mentioned, selective multiple image information may aid in discerning an object or objects, discerning a layer or layers, discerning anisotropy of material, etc.

As an example, for at least performing migration as part of a digital image process, a computational system may include a number of processors (e.g., cores) in excess of ten or in excess of 100 or in excess of 1000 or more. As an example, a method can include performing migration in parallel for different selected multiples as part of digital image processing.

As an example, a ray-based approach may be implemented using a technique as described in *Fundamentals of Seismic Wave Propagation,* by Chapman, Cambridge University Press (2004). For example, at p. 136, Chapman describes a ray-based scenario for three ray paths between a source and a receiver with respect to homogeneous and heterogeneous media. In homogeneous media, acoustic and elastic waves propagate (approximately) without dispersion with a velocity independent of frequency. At interfaces between homogeneous media, plane waves can be considered to satisfy Snell's law. In inhomogeneous media, higher frequencies can behave similarly when the wavelength of the seismic energy is short compared with the scale of heterogeneities in media/medium. An approach based on rays can be expressed as a series in amplitude coefficients $v^{(m)}$ and $P^{(m)}$, that can be independent of frequency, $\omega$, and a phase factor that is linearly dependent on the frequency, $\omega$, and the travel time, T, which may be taken as independent of frequency, $\omega$. At sufficiently high frequencies, a solution can be non-dispersive, however, the series in inverse powers of $-i\omega$ allows for pulse distortion at low frequencies. As set forth in Chapman, a function (e.g., $v(\omega, x_R)$) can be set forth in terms of more than one function, $T(x_R, path_n)$ and $v^{(m)}(x_R, path_n)$, it is possible to determine the functions uniquely through the frequency dependence.

As mentioned, for primaries, a Kirchhoff approach to migration may include building a table of travel times by tracing rays for primaries. As to multiples, the method 900 includes travel times as travel time data for multiples as associated with complex ray signatures. In such an example, the complex ray signatures may correspond to different types and/or orders (e.g., different modes) of multiples.

As an example, a method can include addressing different multiples modes associated with a geologic environment. Such a method can include separating out different multiples (e.g., type, order, etc.) to be imaged separately and then migration of such separated different multiples with travel time tables created via complex ray tracing tuned to each of the different multiples. For example, given a type and an order of a multiple, a corresponding complex ray signature may be accessed and/or generated for purposes of travel time calculation. As an example, a table can be a data structure stored to memory (e.g., a memory device), which may be accessible by one or more processors, etc.

As an example, a method can include generating one or more data structures associated with multiples where the multiples can include different type and/or order of multiples.

As an example, a method can include decomposing different orders of multiples as part of an imaging process.

As an example, a method can include receiving data (e.g., seismic and/or other data) and building a velocity model for a geologic environment and utilizing the velocity model to sort out different orders and/or types of multiples that can exist in the geologic environment when subjected to seismic energy.

As an example, a method can include, given seismic data, identifying order and/or type of multiples of a geologic environment and using a built velocity model to image at least a portion of the geologic environment.

As an example, depth migration can assume that the arbitrary velocity structure of a geologic environment is known and that it can be utilized to compute the appropriate diffraction shape for a velocity model. In such an example, data can then be migrated according to diffraction shape and output defined with a depth axis (e.g., though results may be stretched back to time to enable comparison with time migrations).

As mentioned, Kirchhoff migration can be applied prestack. For Kirchhoff migration, parameters may include trace spacing, summation aperture and dip limit. As to trace spacing, this can be a common midpoint (CMP) spacing for zero-offset or stacked seismic data. As to aperture, in theory diffractions extend to infinite time and distance; however, in practice useable amplitude tends to be less than infinite so an aperture is chosen over which to make a summation. As to dip limit, an appropriate impulse response up to about 90° can be given by a semi-circle, however a migration can be limited to shallower dip angles, which may be used to speed computation time and filter dipping noise.

Figure 10:
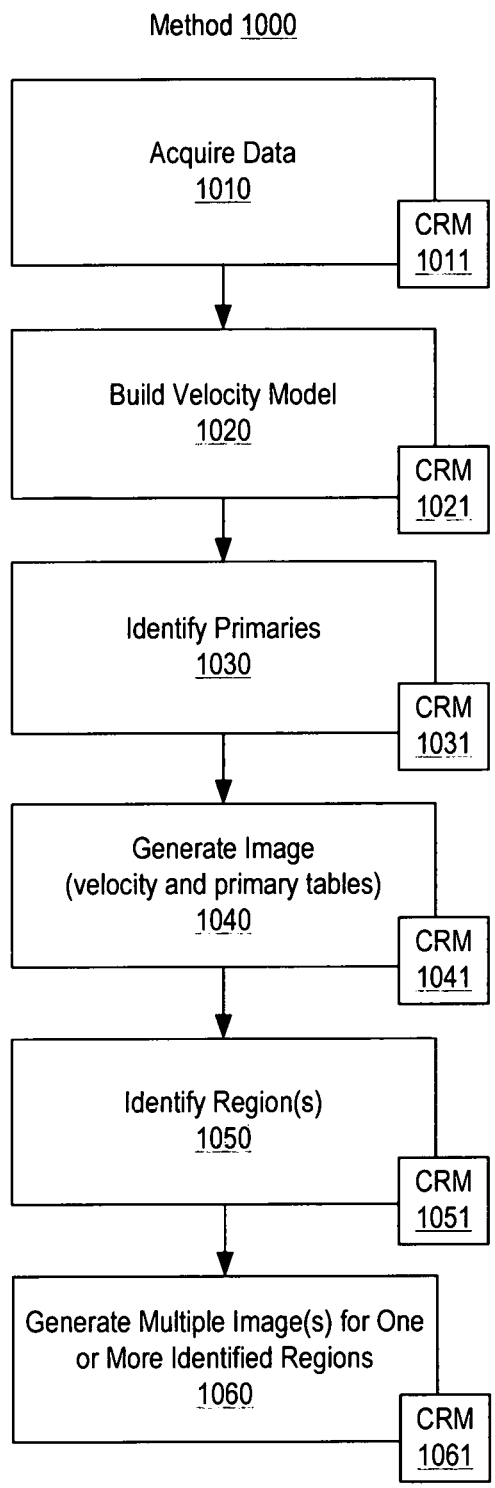
FIG. 10 illustrates an example of a method.

FIG. 10 shows an example of a method 1000 that includes an acquisition block 1010 for acquiring data (e.g., receiving seismic data and optionally other data); a build block 1020 for building a velocity model; an identification block 1030 for identifying primaries; a generation block 1040 for generating an image (e.g., based on the velocity model and primary tables for travel times); an identification block 1050 for identifying one or more regions in the image; and a generation block for generating one or more multiple-based images for one or more of the identified regions, for example, using one or more of the actions of the method 900 of FIG. 9, which can include accessing and/or generating one or more complex ray signatures (e.g., for one or more multiples).

FIG. 10 also shows various computer-readable medium (CRM) blocks 1011, 1021, 1031, 1041, 1051 and 1061, which can include computer-executable instructions (e.g., processor-executable instructions) that can instruct a system to perform one or more of the actions associated with the method 1000.

As an example, a method can include receiving data, building a velocity model, identifying primaries (e.g., optionally utilizing multiple attenuation), generating an image based on velocity model and tables (e.g., primary ray traces), identifying regions that lack illumination and/or shallow region(s), and performing actions to generate a multiple-based image for one or more of the regions. Such a method can include, for example, accessing and/or generating one or more complex ray signatures and utilizing such one or more complex ray signatures in one or more digital image processes that can generate processed digital image data that can be rendered to a display as an image that shows subsurface structure of the Earth. Such an image can be a seismic image.

As an example, a complex ray signature may be defined by a number of reflections (e.g., "bounces"). As an example, a complex ray signature may correspond to a two or more reflection multiple. As an example, a complex ray signature may correspond to a three or more reflection multiple. As an example, a complex ray signature may correspond to a non-free surface multiple (e.g., an air-water interface multiple such as a ghost).

As mentioned, multiples recorded in seismic data include information about reflectivity of a subsurface region as included in primaries. However, various ray-based depth imaging methods are not configured to image multiples. Various techniques such as in the method 900 of FIG. 9 can be implemented for ray-based depth imaging to image multiples. As an example, a method can selectively image different types and order(s) of multiples by introducing one or more complex ray signatures in a Kirchhoff depth migration travel time calculation. Such a method may, for example, be used to image one or more types of mixed P- and S-wave event (e.g., where mode conversion may take place at one or more points other than the reflection point, etc.).

As an example, a method can include tracing rays for multiples to determine travel times to build a table of travel times. Such a table can be stored to a memory device of a computing system and can be accessible (e.g., searchable, etc.), for example, as part of Kirchhoff migration process, for purposes of generating a multiple-based image. As an example, a method can involve imaging based on characteristic or characteristics of a multiple or multiples. For example, an image may be generated based on a particular type of multiple, particular types of multiples, etc. As an example, a mode of multiple may be separated out for imaging separately. As an example, a method can include migrating different modes with travel times provided by one or more tables that include travel times corresponding to each of the different modes. Such an approach may be performed in a decomposed manner where an image may be generated for a particular mode of multiple and/or a selected number of particular modes multiples.

As an example, a method can include receiving seismic data for a subsurface geologic region of the Earth and building a velocity model of the subsurface geologic region of the Earth that can be utilized to separate out different multiples (e.g., per type, order, etc.). In such a method, the built velocity model can be utilized with complex ray tracing for purposes of generating an image that is based one on one or more separated out different multiples.

As an example, a data structure can be generated for a subsurface geologic region based on a velocity model of the subsurface geologic region where the data structure includes travel times for different multiples (e.g., type, order, etc.) that are based on complex ray tracing. One or more images can be generated utilizing such a data structure, such a velocity model and at least a portion of seismic survey data. Such a method can include Kirchhoff depth migration that accesses the data structure. In such an example, an image may aim to "fill-in" a portion of the subsurface geologic region where primaries alone may be deemed to be lacking. For example, consider a scenario where use of primaries alone results in an identifiable coverage gap for the seismic survey where multiples may be process to enhance imaging, for example, by filling in at least a portion of the identifiable coverage gap. In such an example, a workflow can include analyzing a model of a subsurface region to identify a mode of multiple that can provide information for one or more coverage gaps of a seismic survey as may exist where imaging is based on primaries and not primaries and multiples. For example, one or more portions of an image may be enhanced by selectively identifying one or more modes of multiples that may fill-in one or more coverage gaps.

As an example, a method can involve processing seismic data as to primaries and/or multiples where such processing can involve pre-processing (e.g., processing prior to migration as shown in the block 915 of the method 900 of FIG. 9). As an example, a method can include pre-processing of seismic data using a simulation of primaries to generate simulated primary data that can be utilized to attenuate primaries in the seismic data. Such an approach can provide for pre-processed seismic data with attenuated primaries signal and preserved multiples signal that can be then processed using travel time data for one or more modes of multiples to generate an image that is at least in part a multiple-based image. For example, consider the method 1000 of FIG. 10 as including pre-processing of seismic data that attenuates primaries as part of the generation block 1060; noting that the method 1000 may include pre-processing as to attenuation of multiples signal as to the generation block 1040. As an example, the method 900 of FIG. 9 can include pre-processing to preserve multiples in the seismic data (e.g., and attenuate primaries) where such pre-processing can be performed prior to migration of the performance block 940. As an example, the method 1000 of FIG. 10 can include generating a primary-based image using pre-processing that attenuates multiples and generating a multiples-based image using pre-processing that attenuates primaries. With respect to the method 1000 of FIG. 10, such an approach may occur sequentially such that one or more deficient regions may be identified per the identification block 1050 to aid in selecting one or more modes of multiples for pre-processing to preserve such one or more modes of multiples as to the generating block 1060, which may help to enhance image quality in one or more of the one or more deficient regions.

Referring to FIG. 2, acquired data 220 are shown to include primary data and interbed multiple data corresponding to the technique 210. As an example, the primaries in the technique 210 may be simulated given known and/or approximated layers, depths, etc., and, for example, a velocity model. As an example, the simulated primaries can be utilized in a process that can act to attenuate (e.g., filter out, etc.) primaries in the acquired data 220 to generate pre-processed data, which can include preserved interbed multiple data.

As an example, a pre-processing method can include selecting one or more mode of multiples where it is desirable to retain signals in seismic data for the selected one or more mode of multiples. As an example, a method can include preferentially pre-processing to retain signals in the seismic data for one or more selected modes of multiples. As an example, a method can include pre-processing that acts to preserve one or more modes of multiples in seismic data, which can be, for example, one or more selected modes of multiples.

As an example, a method can include selecting one or more modes of multiples for pre-processing to preserve the selected one or more modes of multiples and can include selecting one or more of those modes of multiples for purposes of migration for generating an image or images utilizing corresponding travel time data for the selected one or more of those modes of multiples. For example, various modes of multiples may be pre-processed prior to migration to generate seismic data with preserved multiple signals for those modes of multiples and then one or more modes of multiples may be particularly selected for purposes of migration and image rendering.

As an example, a method can involve predicting multiples and using adaptive subtraction to attenuate multiples and preserve primaries. As an example, a method can make a model of multiples, to predict multiples and then use adaptive subtraction to attenuate multiples. Such a method may, for example, provide for an assessment as to a primary-based image or images. As to attenuation of primaries, a method can model primaries and then apply adaptive subtraction to attenuate the primaries in seismic data, which can preserve multiples in the seismic data. As an example, a method for pre-processing seismic data to preserve multiples can include predicting primaries via a model or models rather than predicting multiples via a model or models. In such an example, primaries may be attenuated using a model where some primary signal may remain, however, without substantial detriment as to multiples signal. An approach that aims to "extract" multiples using a multiples model may possibly be detrimental to some portion of multiples signal in seismic data. As such, as an example, a primary model-based approach can be implemented to enhance seismic data in a manner that preserves multiples signal for purposes of further processing for generating one or more multiple-based images.

As an example, a method can include applying one or more multiples attenuation techniques on original seismic data to preserve primaries and generating an image representative of coverage and quality by primaries and then pre-processing the original seismic data again, however, to attenuate primaries for purposes of preferentially preserving one or more modes of multiples in the seismic data. The seismic data with preserved multiples information can then be further processed in a workflow that includes migration using multiple(s) travel time data to generate a multiple-based image or images. As an example, a method can include combining one or more multiple-based images with one or more primary-based images to render an enhanced image of a subterranean region of the Earth. Such an enhanced image may be of higher quality as coverage (e.g., or one or more other aspects) may be enhanced through selective use of multiples.

As an example, a method can include pre-processing seismic data prior to performing migration such that performing migration migrates pre-processed seismic data, where the pre-processing attenuates one or more primaries, attenuates one or more modes of multiples or attenuates one or more primaries and attenuates one or more modes of multiples where, for example, the one or more modes of multiples do not correspond to at least one mode of multiple and corresponding travel time data as selected for purposes of performing migration and generating an image that is at least in part based on multiples.

As an example, a method can include attenuating one or more modes of multiples that are undesired. Such an approach can include modeling of such one or more undesired modes of multiples (e.g., using a multiple model for one or more undesired modes of multiples) and using a technique such as adaptive subtraction to attenuate such undesired modes of multiples in seismic data. Such an approach can be utilized, for example, in combination with one or more techniques that attenuate one or more modes of primaries, which may be similarly undesired for purposes of image generation. As an example, pre-processing may be performed iteratively, for example, as to one or more modes of primaries and/or one or more modes of multiples to generate seismic data that preserves at least one selected mode of multiple for purposes of image generation. As an example, pre-processing can aim to preserve at least one mode of multiple that is selected for purposes of image generation, which includes migration using travel time data for the at least one mode of multiple.

As an example, a method can include selecting a mode of multiple that is for a receiver side, a source side or a receiver side and a source side. In such an example, coverage may be enhanced for purposes of image generation when compared to coverage of primaries alone. As an example, image data can be generated for one or more selected modes of multiples that can be combined with primary image data to generate an improved image of a subsurface region of the Earth. As an example, a survey may be designed where multiples and associated coverage are taken into account prior to performing the survey. In such an example, specialized processing of acquired seismic survey data may be performed that aims to generate one or more multiple-based images (e.g., one or more images that are based at least in part on travel time data of one or more modes of multiples for purposes of migration).

FIG. 11 shows examples of graphical user interfaces (GUIs) 1110 and 1130. Such GUIs may be part of a framework that include instructions executable by a computing device or system that is operatively coupled to a display (see, e.g., the system 350 of FIG. 3, etc.). As an example, a human input device (HID) may be operatively coupled to such a computing device or system to receive input such as one or more field inputs as in the GUIs 1110 or 1130.

As an example, the GUI 1110 can include fields as to ray path signature generation. For example, surfaces 1 and 2 are illustrated together with actions ("Reflect") and type of ray (e.g., P-wave). As to the GUI 1130, it includes fields as to surface name, number of bounces (e.g., reflections), compute-node allocation, etc. As shown, surfaces, bounce, etc. can be included in the GUI 1130.

Such GUIs may be part of a setup process of a framework where a user can choose from a list of standard bounces corresponding to certain common multiples or where a user may define through reflections (e.g., and mode conversions). In the example of FIG. 11, the GUI 1110 illustrates an intrabed multiple between BASE_A and TOP_A. As shown in FIG. 11, the GUI 1110 includes dropdown graphics that can cause a menu or menus to be rendered to a display such that a surface name, an action to take and a ray type can be selected.

As an example, the GUI 1110 and/or the GUI 1130 may be utilized in a method such as the method 970 of FIG. 9. For example, the "Surface Name" can be utilized for identification of reflectors and the "Action to Take" can be utilized for setting one or more parameters (e.g., reflect, transmit, etc.). As mentioned, a method can include setting one or more parameters as to reflection and/or transmission depending on direction of seismic energy, which may be represented as a ray (e.g., upgoing or downgoing) and/or as to how may bounces (see, e.g., the GUI 1130, which includes "bounce" information).

FIG. 12 shows examples of ray signatures 1200 which include some examples of complex ray signatures. Such examples include first and second order multiples.

Figure 13:
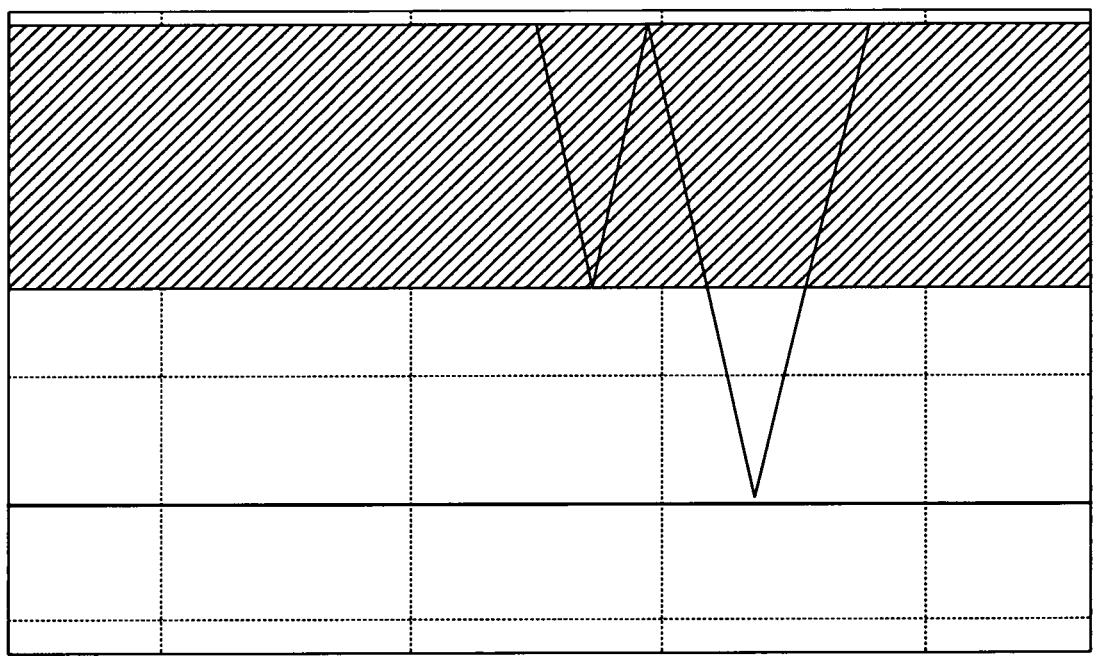
FIG. 13 illustrates an example of a ray signature.

FIG. 13 shows an example of a ray signature 1300 as to a multiple model that includes a shallow reflection with source or receiver side water layer multiple.

FIG. 14 shows an example of a GUI 1400 and a GUI 1410 as associated with a seismic survey 1401 where a vertical lined circle is a shot, open circles are receivers, filled circles are CMP points, circles with angled line fill are reflection points for source side multiple, and circles with hatched lines are reflection points for receiver side multiples. In the examples of FIGS. 14, 15, 16 and 17, reflections include sea bed reflections (see also examples given as to water depth or water bottom (WB) as a sea bed and reflector depth as to a sub-sea bed reflector as in FIG. 19).

Figure 15:
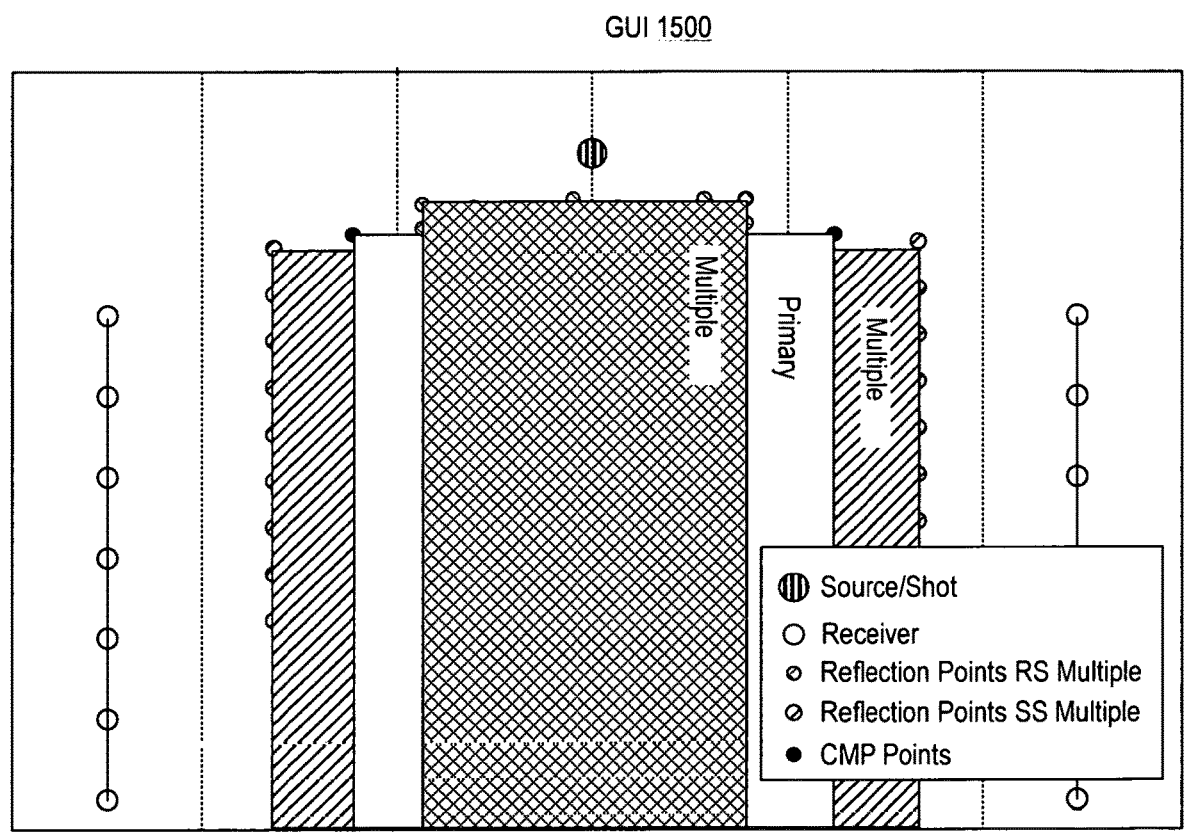
FIG. 15 illustrates an example of a GUI.

FIG. 15 shows an example of a GUI 1500 associated with a survey where primary and multiple coverages are illustrated. In FIG. 15, a vertical lined circle is a shot, open circles are receivers, filled circles are CMP points, circles with angled line fill are reflection points for source side multiple, and circles with hatched lines are reflection points for receiver side multiples. As shown, source side multiple images wider than primaries. Further, the receiver side multiples can fill in information within the coverage of the primaries. For example, receiver side multiples images can be closer to the source than primaries.

Figure 16:
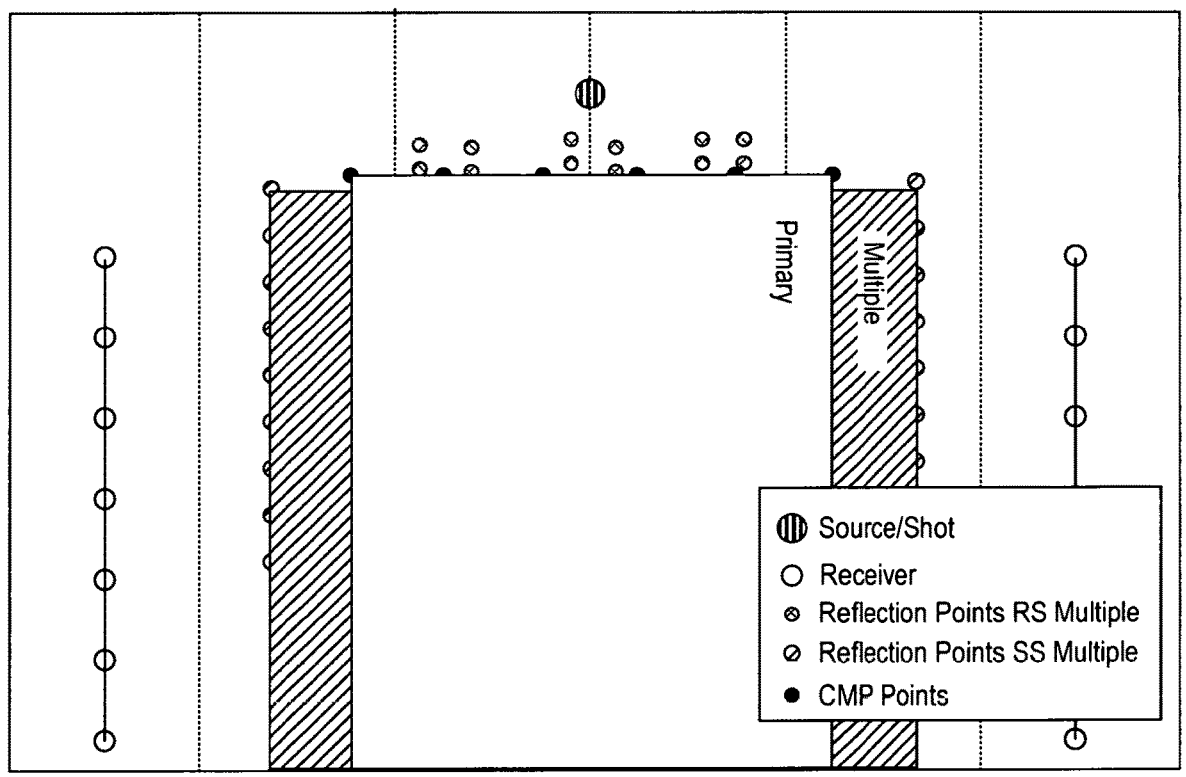
FIG. 16 illustrates an example of a GUI.

FIG. 16 shows an example of a GUI 1600 associated with a survey where a box is an area imaged by source side multiples and another box is an area imaged by primaries. In FIG. 16, a vertical lined circle is a shot, open circles are receivers, filled circles are CMP points, circles with angled line fill are reflection points for source side multiple, and circles with hatched lines are reflection points for receiver side multiples.

Figure 17:
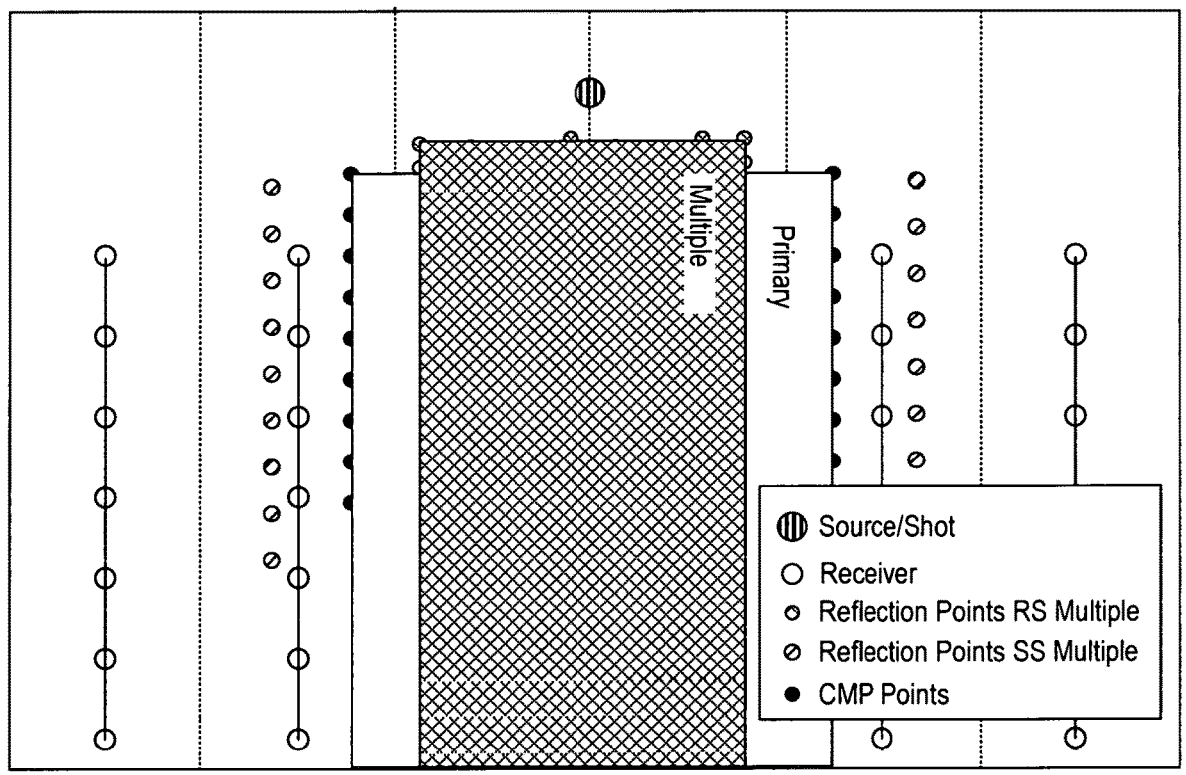
FIG. 17 illustrates an example of a GUI.

FIG. 17 shows an example of a GUI 1700 where a box is an area imaged by receiver side multiples and where another box is an area imaged by primaries. In FIG. 17, a vertical lined circle is a shot, open circles are receivers, filled circles are CMP points, circles with angled line fill are reflection points for source side multiple, and circles with hatched lines are reflection points for receiver side multiples.

Figure 18:
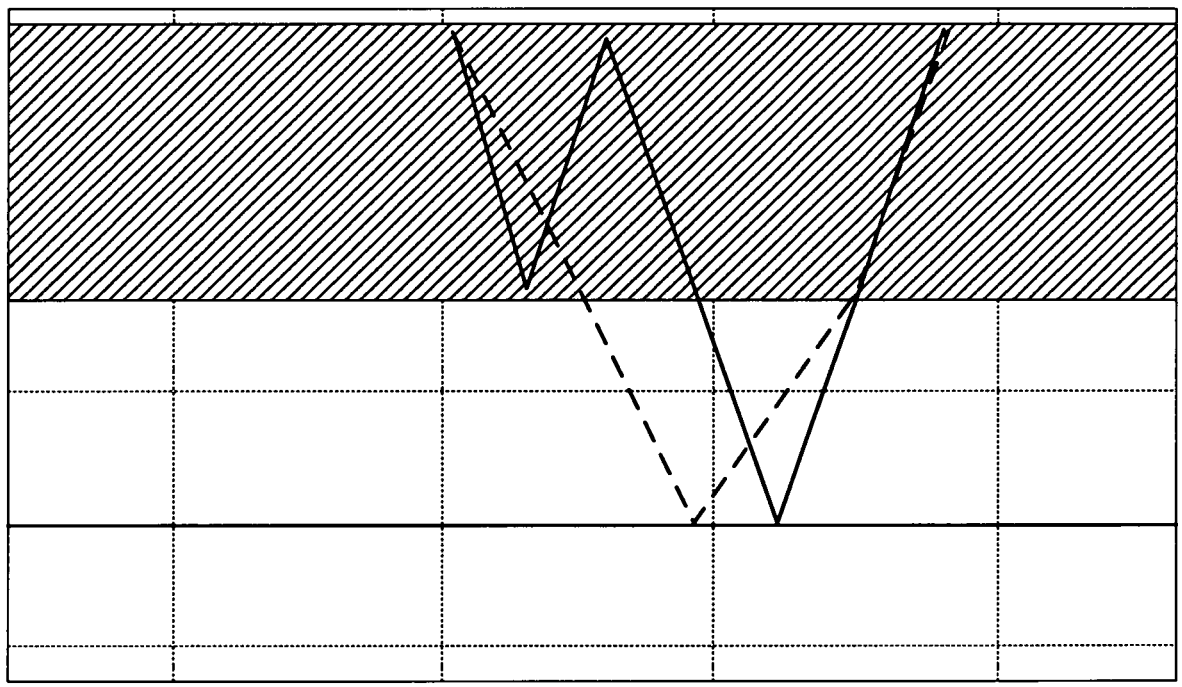
FIG. 18 illustrates an example of a GUI.

FIG. 18 shows an example of a GUI 1800 that illustrates rays in a geologic environment. The GUI 1800 shows reflection angle for primaries and multiples off a shallow horizon as a function of offset. As can be seen in FIG. 18, angles can depend on reflection where angles for primaries and multiples can differ. As an example, a method can include selecting one or more multiples for imaging based at least in part on angle. As an example, such a method may take into account one or more obstructions, poorly illuminated regions, regions lacking coverage due at least in part to angle, etc.

Figure 19:
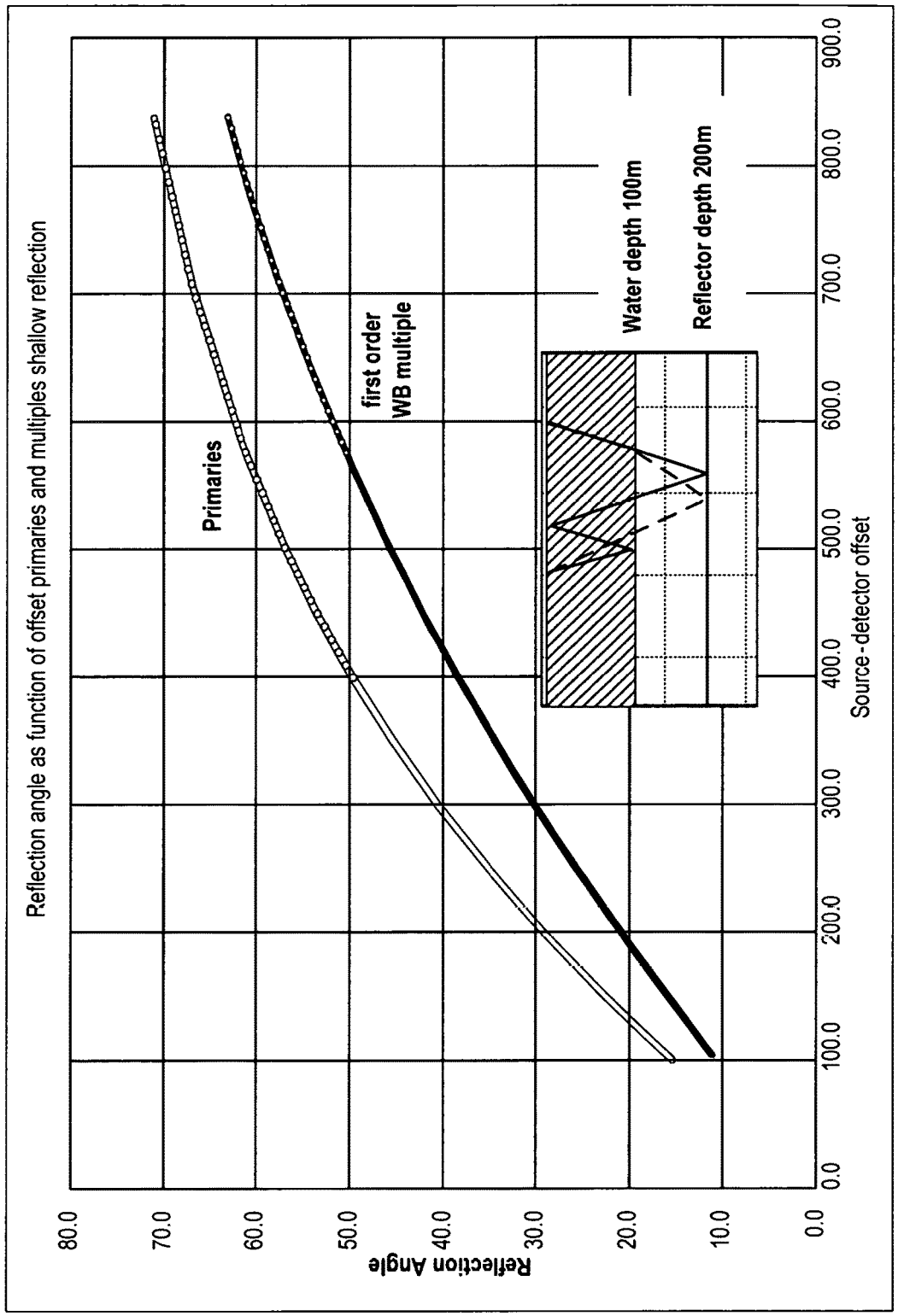
FIG. 19 illustrates an example of a plot.

FIG. 19 shows an example of a plot 1900 that illustrates reflection angle for primaries and multiples off shallow horizon as a function of offset. In the plot 1900, the upper curve is for the primary and the lower curve is for the first order free surface water layer multiple.

FIG. 20 shows examples 2002 and 2004 of survey angles $\Theta 1$ and $\Theta 2$ in a geologic environment that includes layers 2041-1, 2041-2 and 2041-3 where an interface 2045-1 exists between the layers 2041-1 and 2041-2, where an interface 2045-2 exists between the layers 2041-2 and 2041-3 and where a relatively vertical feature 2047 extends through the layers 2041-1, 2041-2 and 2041-3.

As shown in the examples 2002 and 2004, the angle $\Theta 1$ is less than the angle $\Theta 2$. As angle increases, path length of a wave traveling in a subsurface region from an emitter to a detector increases, which can lead to attenuation of higher frequencies and increased interactions with features such as the feature 2047. Thus, arrangements of emitters and detectors can, for a particular subsurface region, have an effect on acquired seismic survey data that covers that subsurface region. As indicated in FIG. 20, reflections can depend on angle where the presence of multiple reflections can depend on angle.

FIG. 21 shows examples of images 2134, 2138, 2154 and 2158 where the images 2134 and 2154 are primary based images and where the images 2138 and 2158 are multiples based images. Further, the images 2134 and 2138 correspond to a broader angle band stack than the images 2154 and 2158. As shown, multiples can provide for images. Information in multiple-based images can enhance images that are from primaries alone. As an example, a method can include improving a digital image processing method by selective use of one or more modes of multiples (e.g., type, order, side, etc.). A method can involve digital image processing where digital image data are processed to generate an improved view of a subsurface region where the improved view includes multiple information for one or more selected multiples. As an example, an improvement can be achieved via increased coverage, whether spatially and/or angularly.

Figure 22:
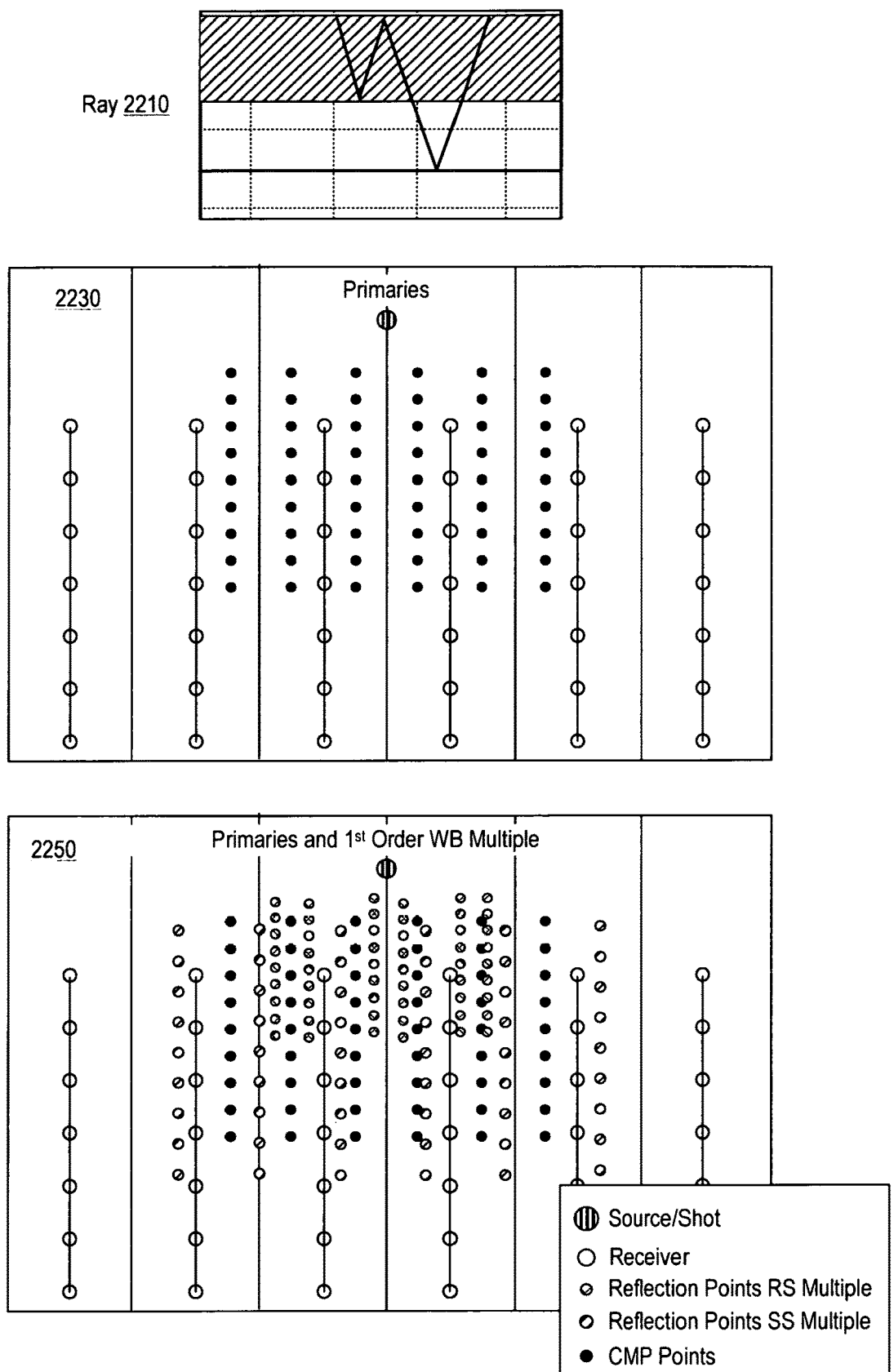
FIG. 22 illustrates examples of graphics associated with a method.

FIG. 22 shows graphics 2210, 2230 and 2250, which can be graphics rendered by a computing device operatively coupled to a display. For example, the graphics 2210, 2230 and/or 2250 can be part of a graphical user interface (GUI rendered to a display.

As explained, multiples contain information about the subsurface where such information can be akin to information contained in primaries. As an example, multiples and information extracted therefrom can be used in imaging of a subsurface region of the Earth. For a given seismic survey acquisition geometry, for example a towed streamer survey acquisition geometry, multiples can provide coverage which can complement the coverage from primaries. As an example, multiples can improve coverage as multiples tend to have wider crossline coverage and additional coverage between the CMP lines from primaries. Also, multiples tend to have smaller incident angle than primaries and generally a wider range of useful angles for imaging, model building and AVO analysis. A method that includes utilization of primaries and multiples in a digital image process can increase the fold.

FIG. 22 shows examples of the reflection points for primaries and 1st order water bottom free-surface multiples for a shallow layer. The multiple reflection points (see legend in FIG. 22 for source side "SS" multiples and receiver side "RS" multiples) complement the primary reflection points, which are illustrated as small black circles labeled CMP points. The view of the streamers in the graphic 2250 along with the points for RS and SS multiples demonstrates that imaging can be enhanced, in particular, improvements to image quality can be achieved by utilizing multiples to increase coverage. The additional fold, coverage and wider range of useful angle are applicable to various types and orders of multiples.

Figure 23:
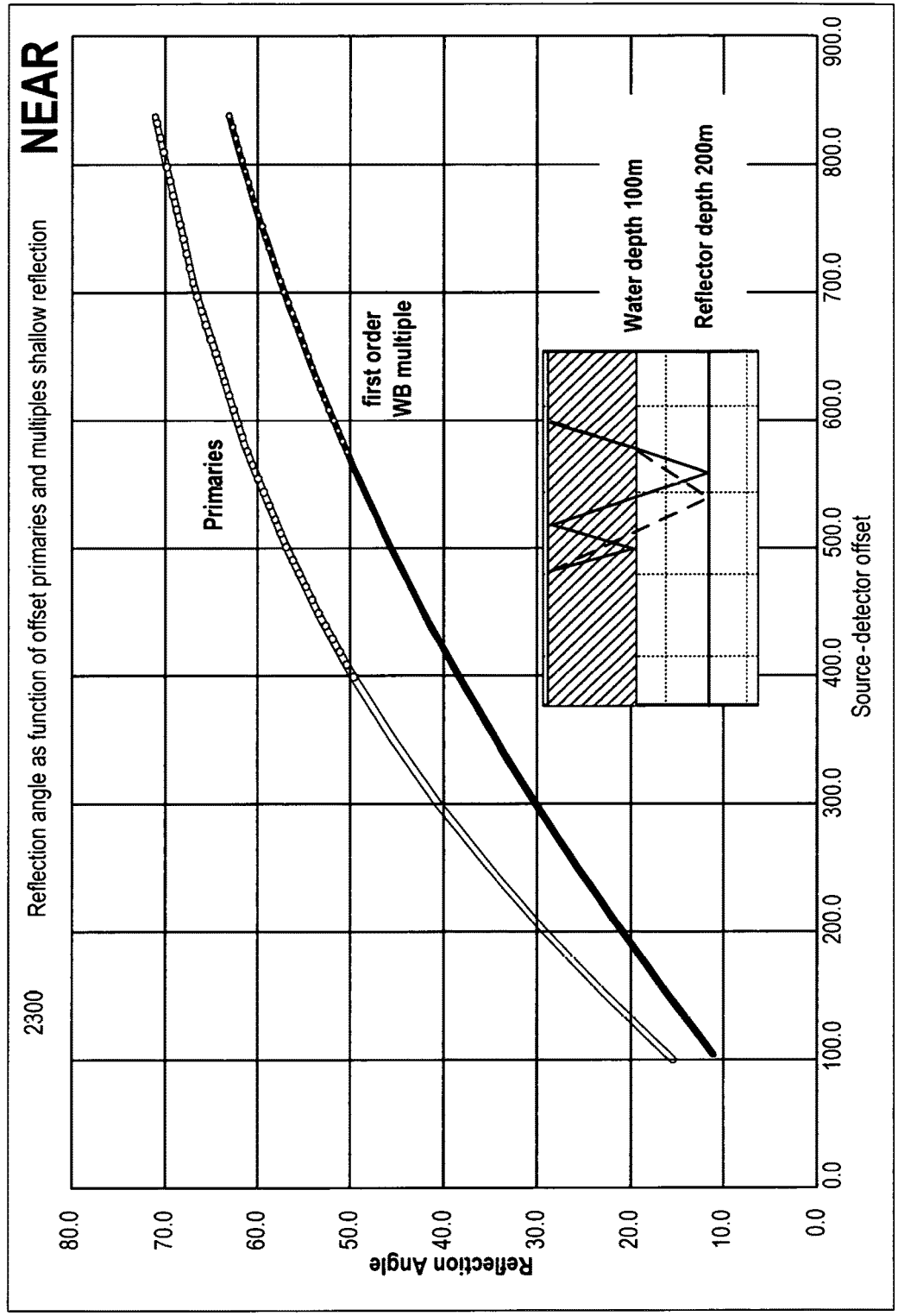
FIG. 23 illustrates an example plot of reflection angle versus offset for primaries and multiples.
Figure 24:
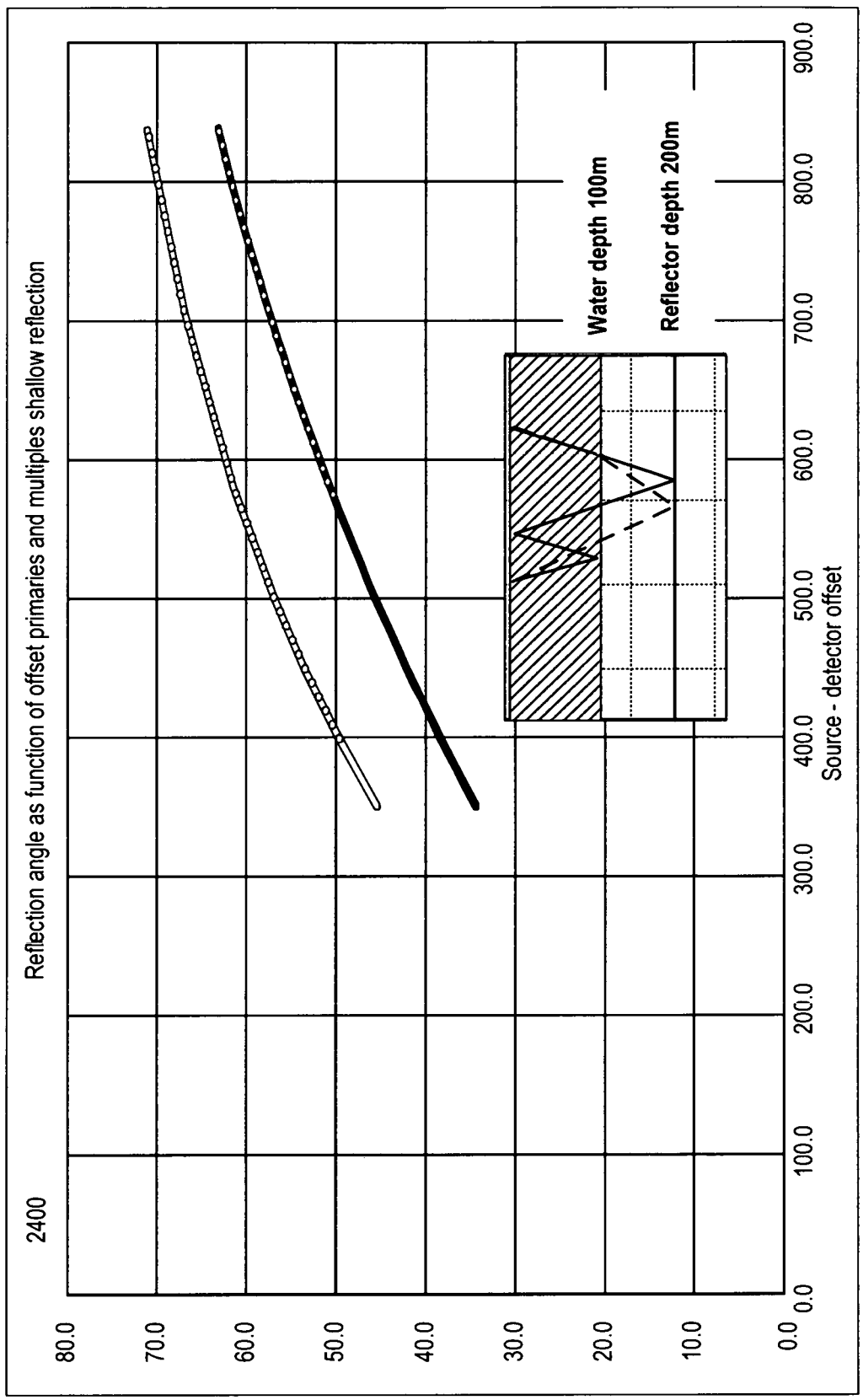
FIG. 24 illustrates an example plot of reflection angle versus offset for primaries and multiples.
Figure 25:
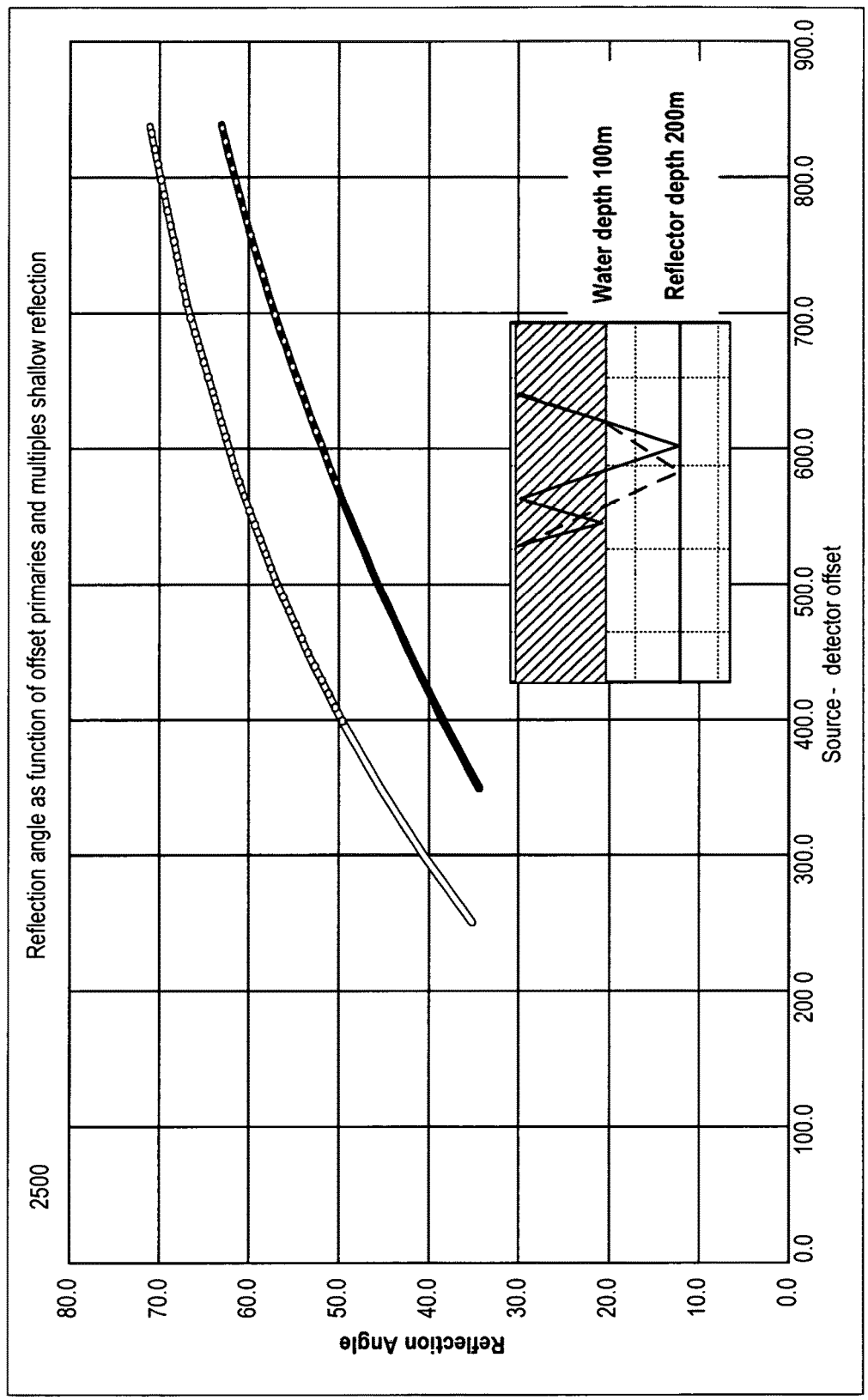
FIG. 25 illustrates an example plot of reflection angle versus offset for primaries and multiples.

FIGS. 23, 24 and 25 show a series of example plots 2300, 2400 and 2500 of reflection angle versus source-receiver offset (as measured by distance). As shown, the reflection angle ranges from about 10 to about 70 where the reflection angle maximum is higher for the primaries than for the multiples and where the reflection angle minimum is lower for the multiples than for the primaries. In the examples of FIGS. 23, 24 and 25, a water depth is given as 100 meters and a reflection depth of a subterranean reflector is given as 200 meters. The plots 2300, 2400 and 2500 show how reflection angle is a function of offset for primaries and multiples.

With reference to the plots 2300 and 2400, as an example, there can be a wider range of incident angle for multiples versus primaries. For example, consider a near cable with 100 m to the closest receiver (see the plot 2300) and an outer cable with 350 m to the closest receiver (see the plot 2400). In such an example, the wider range of angles is particularly clear on the outer cable. Assuming that angles up to 50 degree are useful, the point above this angle is dotted in the plots 2300 and 2400. In the plot 2400, open circles in the primaries are shown for offsets greater than approximately 400 and angles greater than approximately 50 degrees and open circles in the first order WB multiples are shown for offsets greater than approximately 550 and angles greater than approximately 40 degrees.

As an example, a method can include introducing multiples as part of a seismic survey design. For example, a path of a vessel that tows streamers may be determined based on how primaries and how multiples can be processed to generate an image of the subsurface. As mentioned, utilization of multiples can increase coverage. As an example, coverage can be planned, and hence equipment and path(s) of one or more vessels, when designing a seismic survey. As an example, a seismic survey may be optimized in a process that considers utilization of multiples. For example, consider a process that aims to optimize a seismic survey with respect to weather (e.g., sea conditions, etc.), with respect to vessel fuel (e.g., fuel capacity, vessel speed, etc.), with respect to intended resolution of an image or images generated via acquired digital seismic data from receivers of streamers that are towed by a vessel or vessels. In such an example, multiples can be considered to optimally design a seismic survey. Multiples may be introduced in terms of coverage with respect to streamer separation distance and/or streamer length, which are parameters that can be utilized to determine a path of a vessel or vessels, whether a zig-zag path, a circular path, a path that includes acquisition during turns between straight paths, etc.

As an example, a design can consider a certain range of incident angles desired for imaging, which can be achieved with longer offsets when imaging multiples than primaries. For a towed streamer seismic survey, as an example, wider tows or less overlap between sail lines can be used when multiples are included in the imaging plan. Such a survey can, for example, conserve fuel and/or allow for a larger area to be covered.

FIG. 25 shows the plot 2500 for a cable with a minimum offset for primaries of 250 m and a cable with minimum offset of 350 m for multiples. As can be seen in the plot 2500, the incident angle ranges are comparable.

As an example, multiple information can be utilized to improve imagine with respect to one or more obstructions. For example, a method can include imaging multiples to improve the imaging in one or more areas with one or more obstructions as a source side multiple can be used to image closer to one or more of the obstructions. In the case of a seismic survey that involves undershooting with a second vessel, both source and receiver side multiples can be used to improve the imaging.

Figure 26:
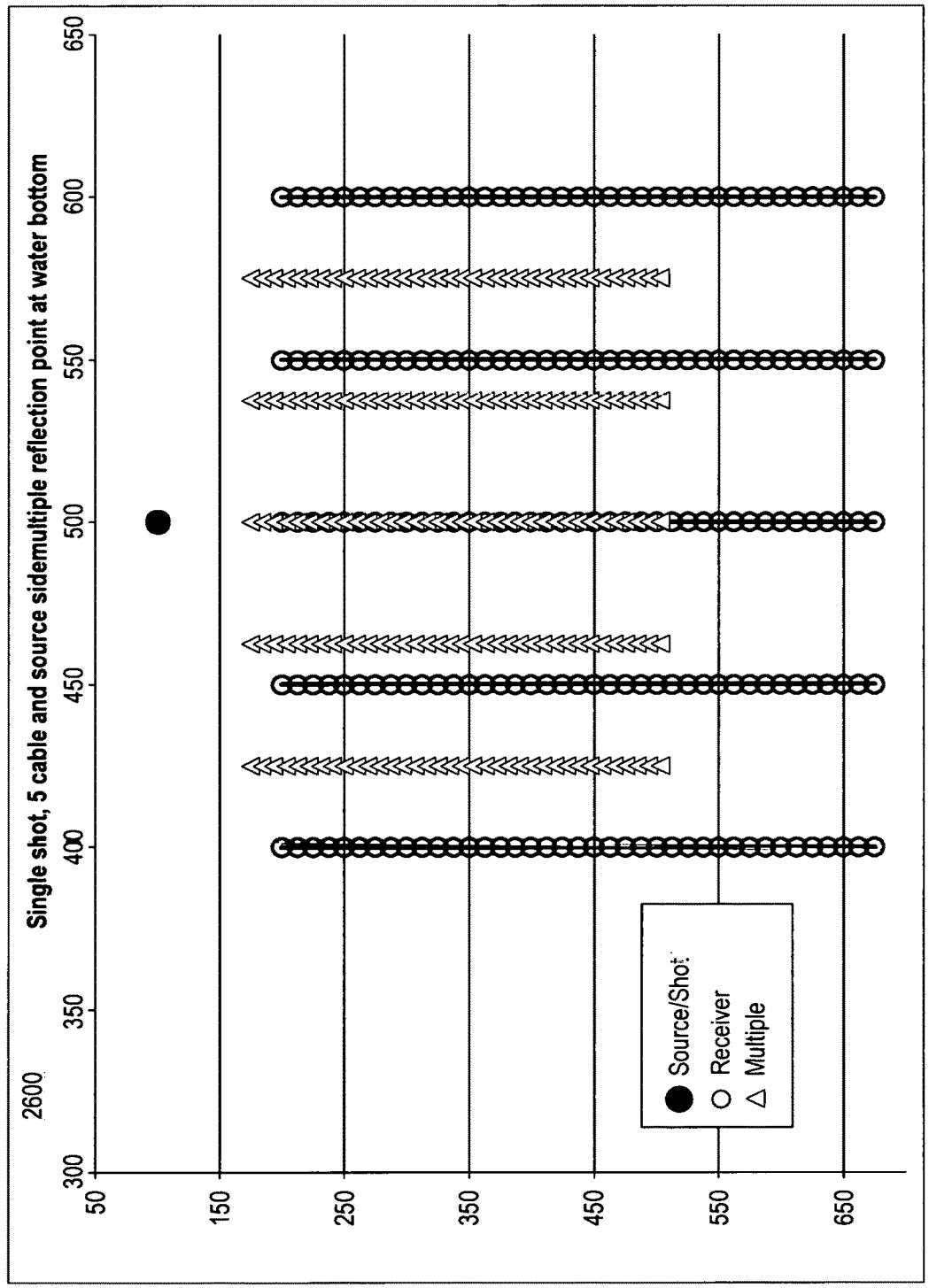
FIG. 26 illustrates an example of a graphic associated with a method.
Figure 27:
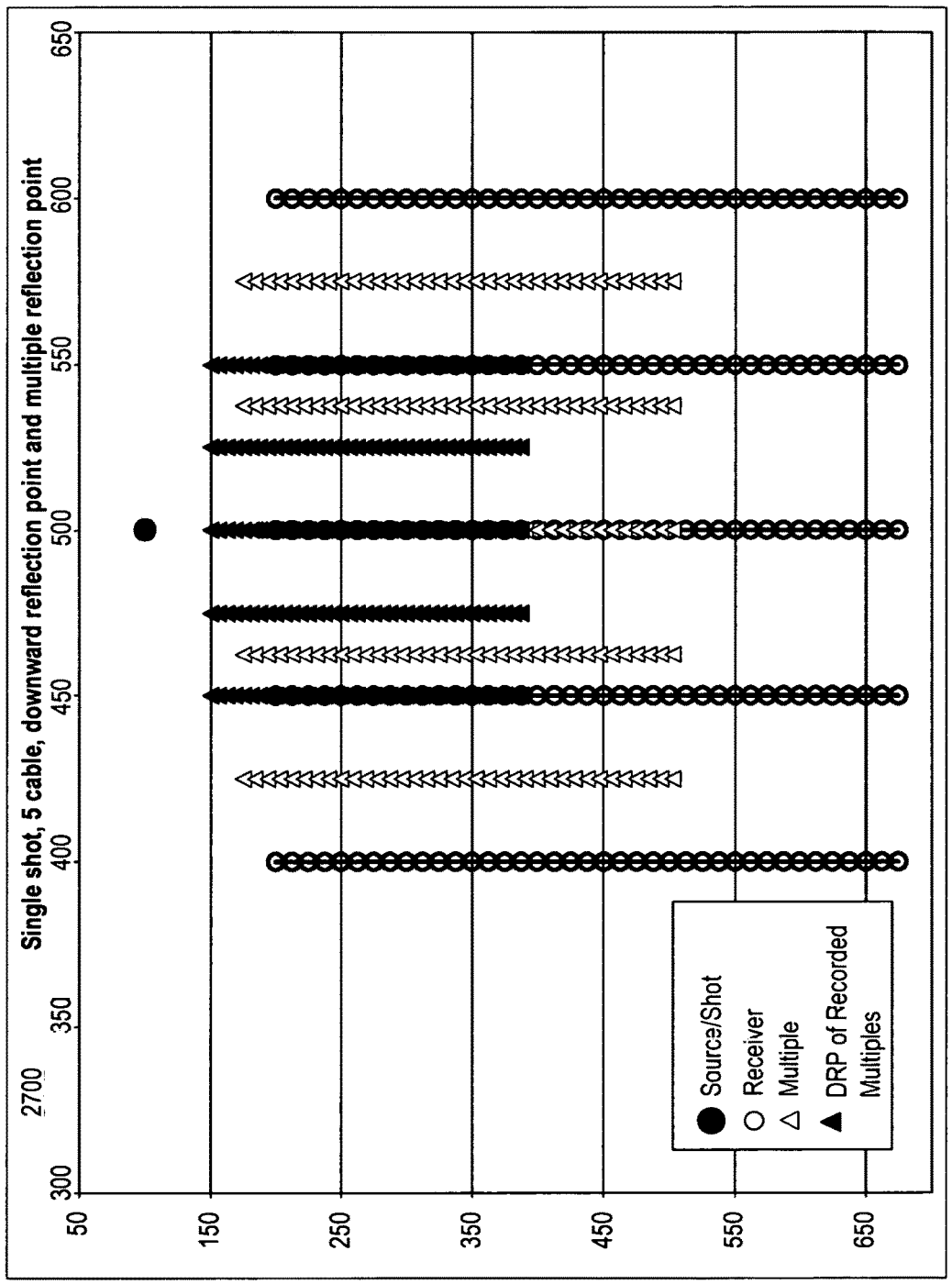
FIG. 27 illustrates an example of a graphic associated with a method.

As an example, a method can include using Kirchhoff processing with ray signatures for imaging multiples. In such an example, when using Kirchhoff with ray signatures, the separated multiple data can be imaged based on ray-tracing in a primary depth model; noting that other techniques that inject the recorded wavefield as a secondary source can be limited by the recorded wavefield FIGS. 26 and 27 show example graphics 2600 and 2700 of seismic survey acquisition geometries with respect to a source and receivers as operatively coupled to streamers (e.g., or integral to streamers, etc.). As shown in the graphics 2600 and 2700, the source side 1st order water layer multiple with reflection from the seabed can be utilized to demonstrate how imaging can be improved. The downward reflection points corresponding to the recorded multiple are shown in the graphic 2700 via filled triangles, which include those that are not recorded (see overlap and lack of overlap).

Figure 28:
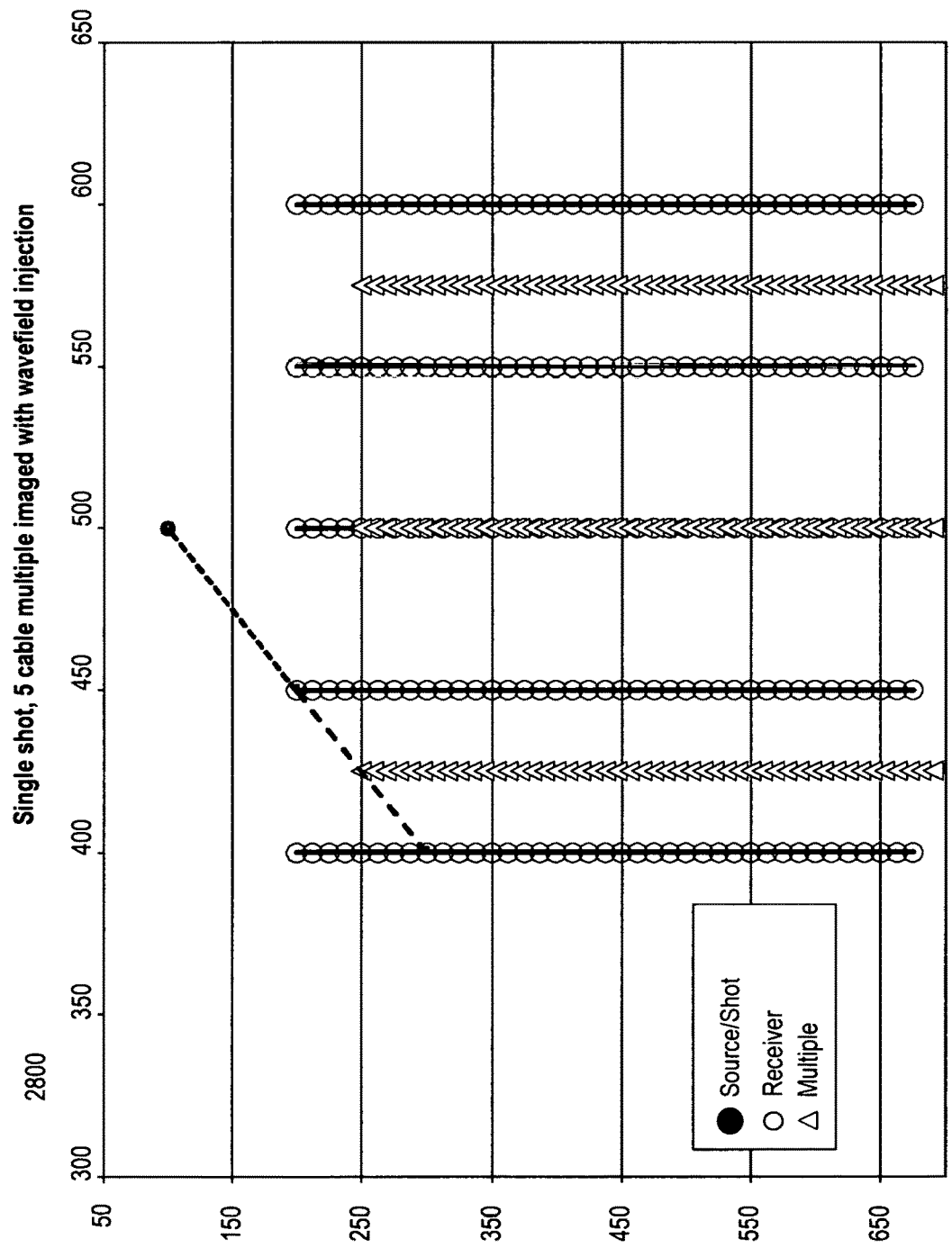
FIG. 28 illustrates an example of a graphic associated with a method.
Figure 29:
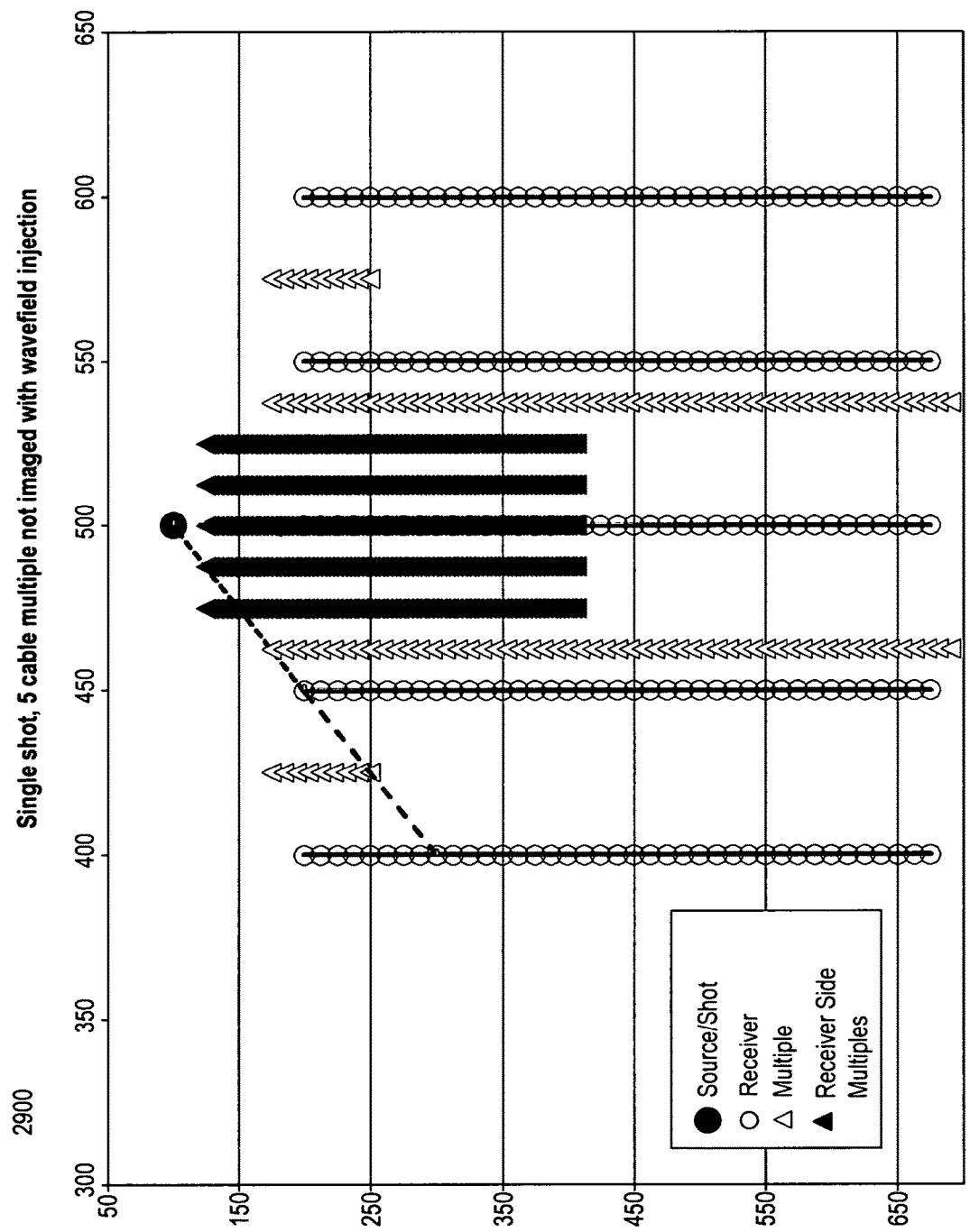
FIG. 29 illustrates an example of a graphic associated with a method.

FIGS. 28 and 29 show example graphics 2800 and 2900 of seismic survey acquisition geometries with respect to a source and receivers as operatively coupled to streamers (e.g., or integral to streamers, etc.). As shown, the multiple reflections (open triangles) which are directly imaged by the wavefield injection method illustrated in the graphic 2800 of FIG. 28. The graphic 2900 of FIG. 29 shows which multiple reflects and those that are not directly imaged by the wavefield injection method where filled triangle represent receiver side multiples. Note the multiples that are below and above the angled line in the graphics 2800 and 2900.

FIG. 30 shows example graphics 3010 and 3030 as another illustration of ideal downward reflection points (iDRPs) for wavefield injection. FIG. 30 pertains to a shallow reflector and 1st water bottom free-surface multiple. Ideal downward reflection points (iDRPs, represented by small hatched circles) are shown to be close to two of the six streamers (shown as columns via lines with open circles). Proximity to a streamer that includes receivers means that signal can be acquired by one or more of the receivers, which can be converted to digital data as digital seismic data, which can be stored using computerized equipment of a vessel and/or transmitted to one or more other storages, computers, etc. utilizing one or more types of communication equipment.

As an example, a method can include imaging multiple different types of orders and/or multiple different types of separated multiples. For example, using wavefield injection to image separated multiples means that the multiple is to be recorded, which in surface seismic means that a method is to address free-surface multiples. Using a Kirchhoff approach with ray signatures, a method can image one or more of different types of orders and/or one or more of different types of multiples, which can include free-surface and/or non-free-surface multiples.

Figure 31:
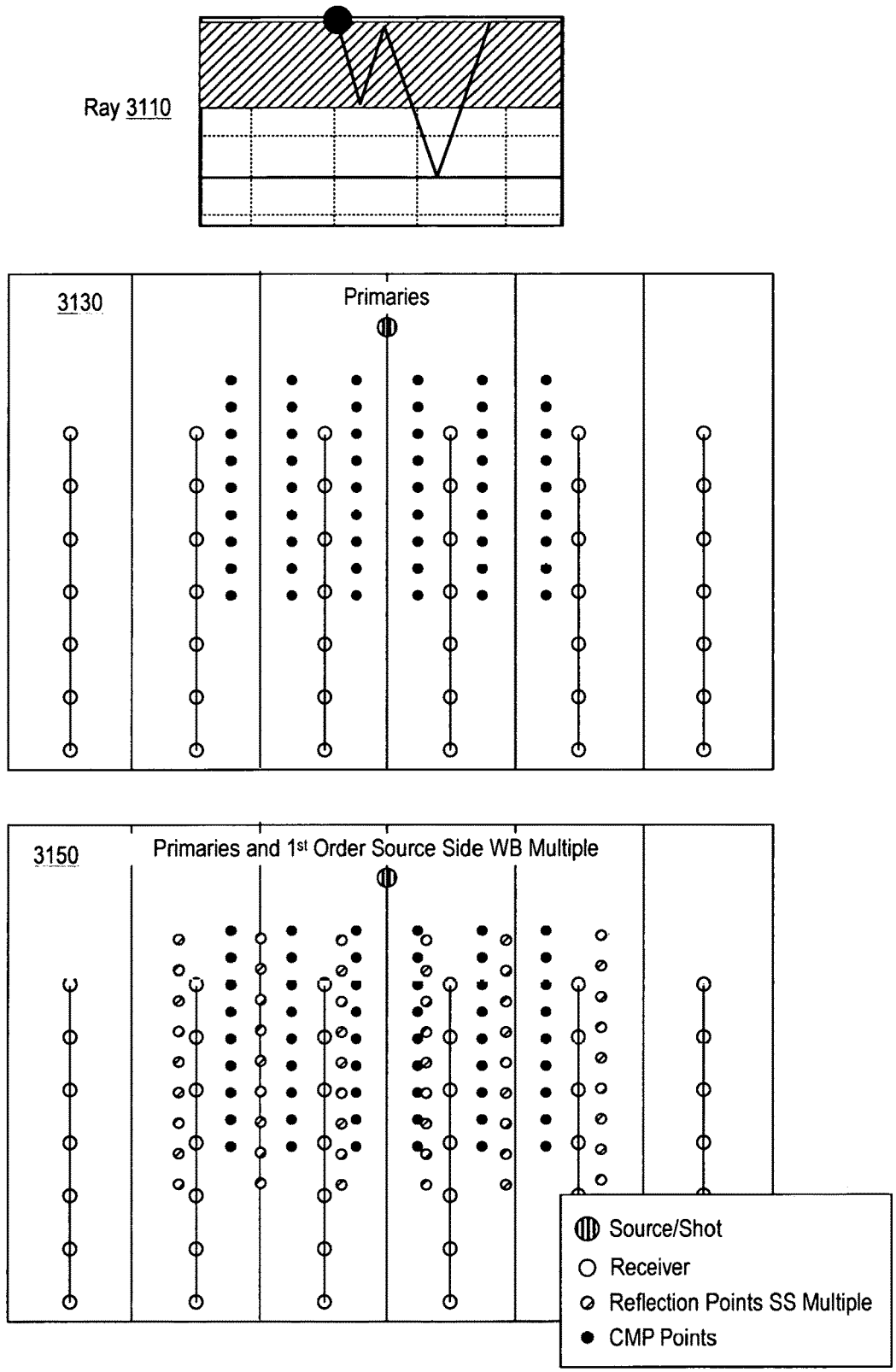
FIG. 31 illustrates examples of graphics associated with a method.

FIG. 31 shows example graphics 3110, 3130 and 3150 with respect to a source side 1st order water bottom or land free-surface multiple. As an example, the receivers can be strings of receivers, as may be utilized in a marine seismic survey and/or in a land seismic survey. As shown in FIG. 31, additional cross-line illumination can be achieved that is wider than illumination from primaries. Such an approach can improve image quality or, for example, quality of a seismic survey data set or data sets. As an example, a method can utilize improved crossline sampling for model building and/or imaging. As an example, a method can utilize wider crossline sampling and improved imaging close to obstructions or in undershoot.

Figure 32:
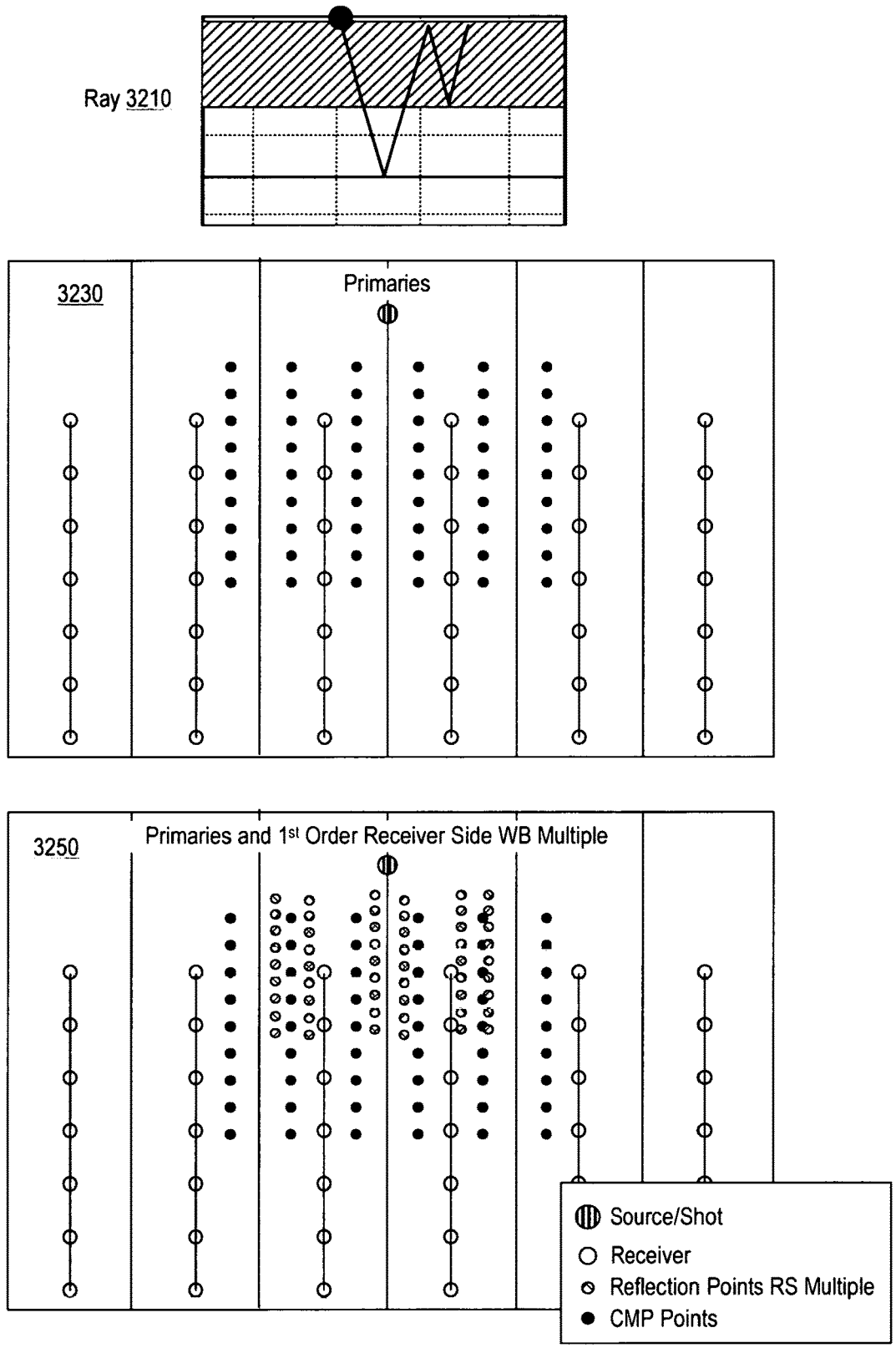
FIG. 32 illustrates examples of graphics associated with a method.

FIG. 32 shows example graphics 3210, 3230 and 3250 with respect to receiver side 1st order water bottom or land free-surface multiples. As shown, there can be additional cross-line illumination. As an example, a method can include improved crossline sampling for model building and/or imaging.

FIG. 33 shows example graphics 3310, 3320, 3330 and 3350 with respect to source and receiver side 1st order water bottom or land free-surface multiples. As shown, additional cross-line illumination wider than illumination from primaries and denser than source and receiver side multiples individually can be achieved.

As an example, a method can include complementary illumination from source and receiver side multiples. As an example, improved crossline sampling can be achieved and utilized for model building and/or imaging. As an example, wider crossline sampling and improved imaging close to obstructions can be achieved.

The plots 2300, 2400 and 2500 of FIGS. 23, 24 and 25 can be referenced to demonstrate utilization of source and/or receiver side 1st order water bottom or land free-surface multiples. For example, as shown in the plot 2300 of FIG. 23, wider range of incident angles can be achieved for the same offset as primaries. As an example, wider range of useful angles for AVO analysis in the shallow can be achieved.

As an example, with reference to the plot 2500 of FIG. 25, source side 1st order water bottom or land free-surface multiples may be utilized. For example, the plot 2500 shows comparable incident angles from longer offsets (e.g., angles in a range that is greater than approximately 40 degrees or 50 degrees as in the example of FIG. 25). As an example, a method can include using multiples in imaging, for example, where larger receiver line separation can be used and still achieve the same incident angle range as primaries.

Figure 34:
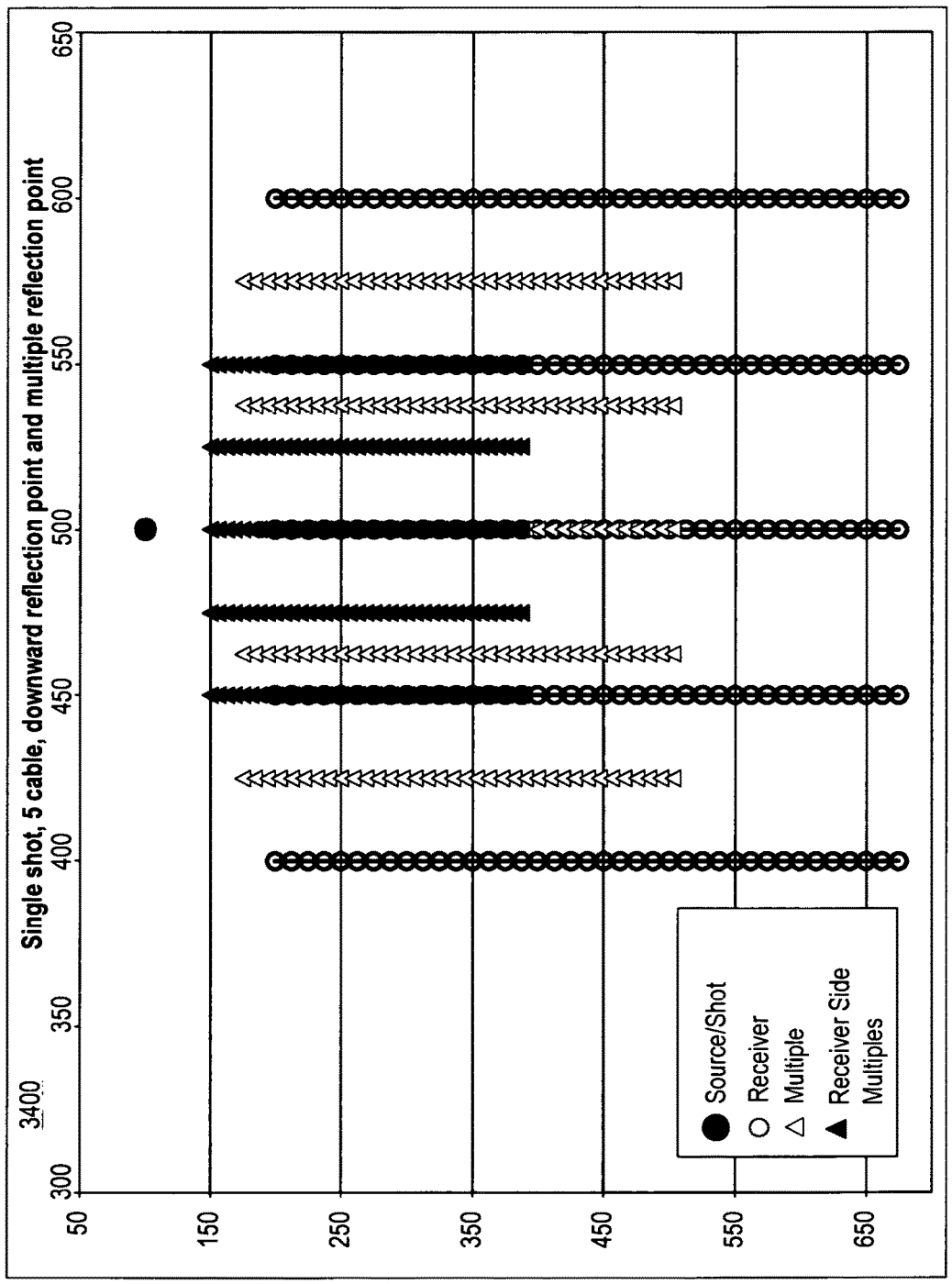
FIG. 34 illustrates examples of graphics associated with a method.
Figure 35:
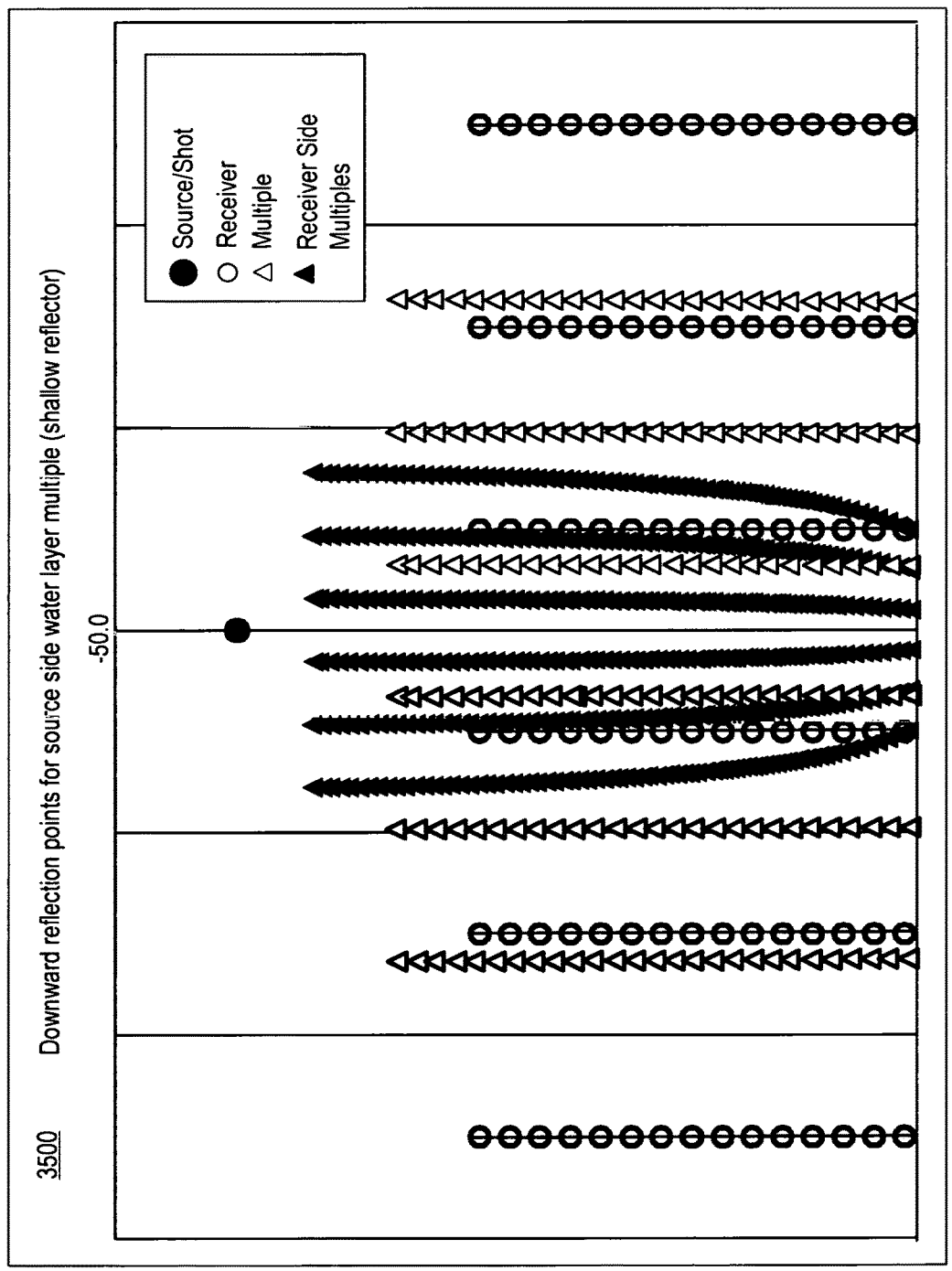
FIG. 35 illustrates examples of graphics associated with a method.

FIGS. 34 and 35 show graphics 3400 and 3500 as to source and receiver side 1st order water bottom or land free-surface multiples. As an example, a method can include a Kirchhoff approach with ray signature used for actual source and receiver positions for imaging; whereas, wavefield injection methods demand injection of a recorded wavefield. In practice, a recorded wavefield may seldom match well with the ideal downward reflection points (iDRPs) for wavefield injection, which limits the quality of the image; whereas, a Kirchhoff approach can use actual positions. Thus, a Kirchhoff approach with multiples can help to alleviate uncertainty that is inherently built-in to various wavefield injection approaches. Alleviation of positional uncertainty and/or mismatch can help to improve image quality of a digitally processed image of a subsurface region of the Earth.

As an example, a method can include receiving seismic data for a geologic region of the Earth (e.g., receiving seismic data via an interface of a computing device, a computing system, etc.); building a velocity model of the geologic region of the Earth; selecting at least one mode of multiple and corresponding travel time data from a data storage where the travel time data correspond to at least one complex ray signature in the geologic region of the Earth and are based at least in part on the velocity model (e.g., where a mode of multiple can be a type, order, etc., of multiple); performing migration on the seismic data using at least the selected travel time data to generate processed seismic data; and rendering an image of the geologic region of the Earth to a display where the image includes at least a multiple image based at least in part on the processed seismic data. For example, a multiple image can be image data that is based on at least one multiple as may be present in the seismic data and processed seismic data.

As an example, a method can be a digital image process that receives image data (e.g., seismic data), processes the image data (e.g., via use of travel time data for one or more multiples) to generate processed image data, and that renders at least a portion of the processed image data as an image to a display. In such a method, the rendered image can be an improved image as to structure(s) that exist in a geologic region of the Earth. Such an improved image can be due at least in part to information about the geologic region as present in seismic data for one or more modes of multiples. As mentioned, an image may show "edges" as seismic energy may be reflected from reflectors that can appear as edges. As an example, a multiple can be modeled as a complex ray that interacts with a layer of material multiple times by passing through that layer multiple times such that it includes information about that layer. As an example, a multiple may be modeled as a complex ray that interacts with a reflector multiple times where the reflector is a boundary of a layer. As mentioned, a multiple may pass through a layer at an angle or at different angles. Information in seismic data about a layer, particularly an anisotropic layer, may differ depending on angle. As such, a single multiple may provide more information about anisotropy than a single primary. As an example, a method can include selecting one or more modes of multiples to improve imaging of an anisotropic layer of material and/or characterizing an anisotropic layer of material.

As an example, a method can include selecting at least one mode of multiple and corresponding travel time data at least in part by identifying a portion of a geologic region of the Earth includes a primary coverage gap.

As an example, a method can include selecting at least one mode of multiple and corresponding travel time data at least in part by identifying a portion of a geologic region of the Earth that includes an obstruction.

As an example, a method can include selecting at least one mode of multiple and corresponding travel time data at least in part by selecting based at least in part on a reflection angle of at least one mode of multiple.

As an example, a method can include selecting at least one mode of multiple and corresponding travel time data at least in part by selecting based at least in part on illumination of a portion of a geological region of the Earth.

As an example, a method can include generating the travel time data and storing the travel time data to the data storage. As an example, a method can include generating travel time data for a plurality of different modes of multiples and storing the travel time data to a data storage, for example, as one or more data structures.

As an example, travel time data in a data storage can include at least one of receiver side multiple travel time data, source side multiple travel time data, and receiver side multiple and source side multiple travel time data.

As an example, a method can include performing migration at least in part by performing Kirchhoff depth migration travel time calculations.

As an example, performing migration can migrates at least a portion of seismic data, for example, as part of a seismic image data processing process.

As an example, a method can include pre-processing seismic data prior to performing migration such that performing migration migrates pre-processed seismic data, where the pre-processing attenuates one or more primaries, attenuates one or more modes of multiples or attenuates one or more primaries and attenuates one or more modes of multiples where the one or more modes of multiples do not correspond to the selected at least one mode of multiple. Such an approach can provide pre-processed seismic data that aims to preserve the at least one mode of multiple.

As an example, seismic data can include seismic survey data of a land survey and/or seismic survey data of a marine survey. As an example, survey data can include temporal data such as of multiple individual surveys performed at different times.

As an example, a method can include rendering an image that is at least in part a multiple-based image and rendering another image based on primaries in seismic data and not on multiples in the seismic data. In such an example, the method can include comparing the images.

As an example, a geologic environment can include at least one salt formation, which may cause seismic energy to be illuminated over a region in a particular manner. For example, a salt formation may cause a portion of a region to be illuminated less than another region. As an example, multiples may be selected that may include information as to a region that is of lesser illumination by primaries. For example, where a shadow region exists in primaries, one or more modes of multiples may be selected that can "fill-in" at least a portion of the shadow region.

As an example, a geologic environment can include a shallow region. As an example, a shallow region can include a reservoir.

As an example, at least one complex ray signature can include complex ray signatures for different orders of multiples.

As an example, a method can include generating at least one complex ray signature via rendering a graphical user interface to a display and receiving input via the graphical user interface as to one or more parameters of the geologic environment. For example, consider one or more of the GUIs 1110 and 1130 of FIG. 11.

As an example, a system can include a processor; memory accessible by the processor; and processor-executable instructions stored in the memory that are executable to instruct the system to: receive seismic data for a geologic region of the Earth; build a velocity model of the geologic region of the Earth; select at least one mode of multiple and corresponding travel time data from a data storage where the travel time data correspond to at least one complex ray signature in the geologic region of the Earth and are based at least in part on the velocity model; perform migration on the seismic data using at least the selected travel time data to generate processed seismic data; and render an image of the geologic region of the Earth to a display where the image includes at least a multiple image based at least in part on the processed seismic data.

As an example, one or more computer-readable media can include computer-executable instructions executable to instruct a computer to: receive seismic data for a geologic region of the Earth; build a velocity model of the geologic region of the Earth; select at least one mode of multiple and corresponding travel time data from a data storage where the travel time data correspond to at least one complex ray signature in the geologic region of the Earth and are based at least in part on the velocity model; perform migration on the seismic data using at least the selected travel time data to generate processed seismic data; and render an image of the geologic region of the Earth to a display where the image includes at least a multiple image based at least in part on the processed seismic data.

As explained, primaries and multiples can include data for a common image of a subsurface region of a geologic environment. Such an image may be generated based on primaries, multiples or primaries and multiples (e.g., as together or as to some combination). As explained, multiples can be regarded as signal rather than just noise.

As an example, different types and orders of multiples can be characterized by their particular corresponding ray paths and illumination which can deviate from ray paths of primaries. As an example, one or more multiple ray paths can be used in a method that can choose which multiples to image to address a certain problem (e.g., illumination, lack of near angles, etc.). As an example, illumination and angle range for different types and orders of multiples may be taken into account.

As an example, a method can include separating different orders and types of multiples from seismic data. In such an example, various multiples may be utilized in image generation, optionally via one or more migration processes.

As an example, a complex ray signature approach may be utilized pre- and/or post-stack.

As an example, a method may include utilizing one or more wavefield injection methods.

As an example, a method can include accessing complex ray signatures for multiples; receiving seismic data for a geologic environment; building a velocity model for the geologic environment; identifying multiples associated with the complex ray signatures; and, based at least in part on the identifying, generating an image. In such an example, the method can include performing a Kirchhoff depth migration that migrates at least a portion of the seismic data. In such an example, the performing can be based at least in part on at least a portion of the complex ray signatures.

As an example, seismic data can correspond to a seismic survey where, for example, the seismic survey is a land survey, a marine survey (e.g., water-based) or a combination of land and marine (e.g., optionally sea bottom, streamer, etc.).

As an example, a method can include generating an image based on primaries in the seismic data by, for example, accessing ray signatures for primaries (e.g., as data in a data structure stored in memory). As an example, a method can include comparing images, which may be, for example, images from one or more types and/or orders of multiples and/or one or more types of primaries.

As an example, a geologic environment can include at least one salt formation (e.g., a geobody such as a salt body). As an example, a geologic environment can include a shallow region that is to be imaged. In such an example, the shallow region can include one or more reservoirs. As an example, a geologic environment can include an anisotropic layer of material where an angle of a multiple or multiples can provide for improving characterization of the anisotropic layer of material.

As an example, a method can include generating complex ray signatures. In such an example, the complex ray signatures can include complex ray signatures for different types of multiples and/or complex ray signatures for different orders of multiples. As an example, generating can include rendering a graphical user interface to a display and receiving input via the graphical user interface as to one or more parameters of the geologic environment. For example, one or more parameters can include a surface parameter for defining a reflecting surface and/or one or more parameters can include a wave parameter for defining an acoustic wave (e.g., P-wave).

As an example, a system can include a processor; memory operatively coupled to the processor and processor-executable instructions stored in the memory and executable by the processor to instruct the system to: access complex ray signatures for multiples; receive seismic data for a geologic environment; build a velocity model for the geologic environment; identify multiples associated with the complex ray signatures; and, based at least in part on the identification, generate an image.

As an example, one or more computer-readable storage media can include computer-executable instructions to instruct a system to: access complex ray signatures for multiples; receive seismic data for a geologic environment; build a velocity model for the geologic environment; identify multiples associated with the complex ray signatures; and, based at least in part on the identification, generate an image.

A computer-readable storage medium (or computer-readable storage media) is non-transitory, not a signal and not a carrier wave. Rather, a computer-readable storage medium is a physical device that can be considered to be circuitry or hardware.

Figure 36:
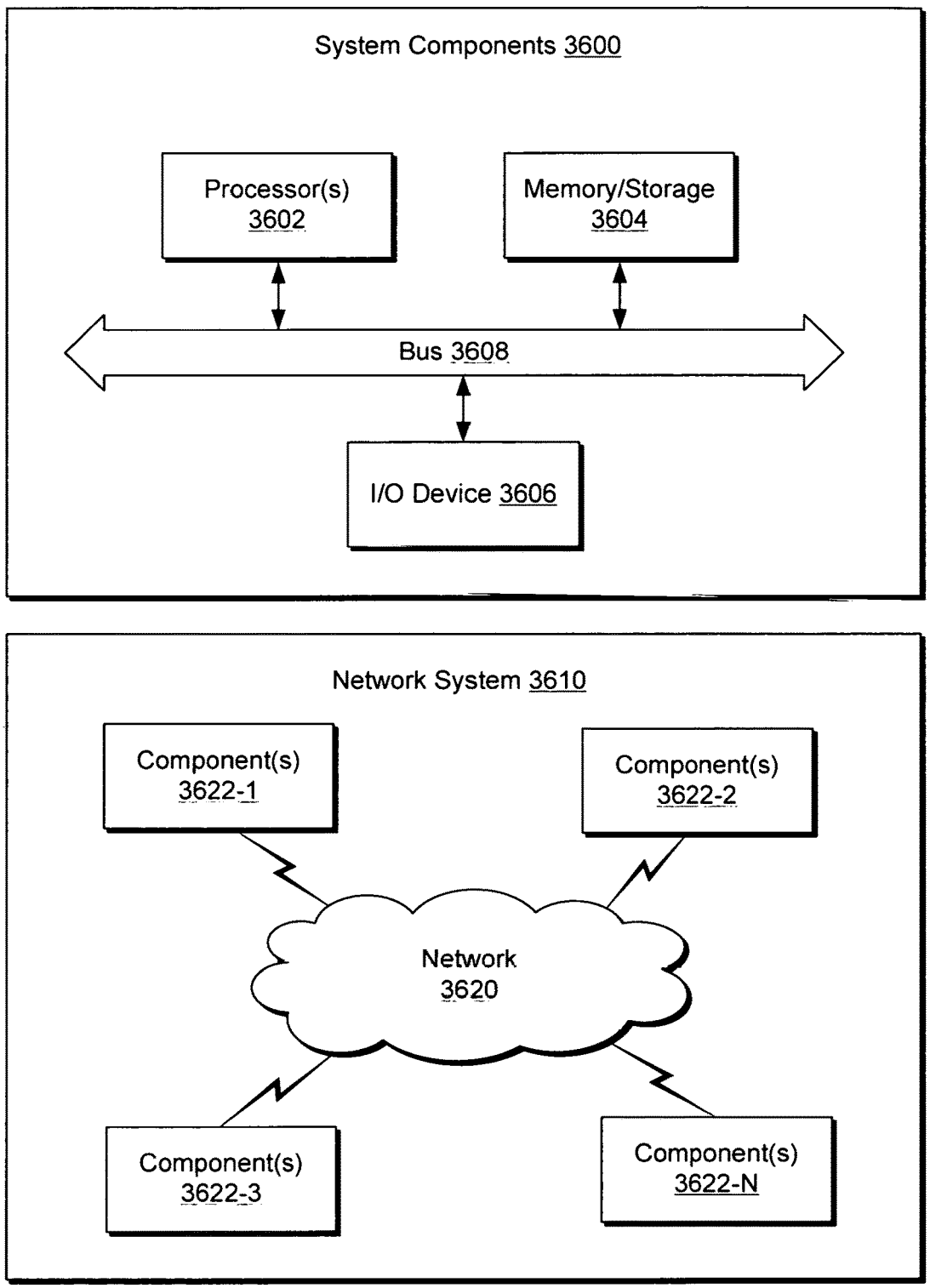
FIG. 36 illustrates example components of a system and a networked system.

FIG. 36 shows components of an example of a computing system 3600 and an example of a networked system 3610. The system 3600 includes one or more processors 3602, memory and/or storage components 3604, one or more input and/or output devices 3606 and a bus 3608. In an example embodiment, instructions may be stored in one or more computer-readable media (e.g., memory/storage components 3604). Such instructions may be read by one or more processors (e.g., the processor(s) 3602) via a communication bus (e.g., the bus 3608), which may be wired or wireless. The one or more processors may execute such instructions to implement (wholly or in part) one or more attributes (e.g., as part of a method). A user may view output from and interact with a process via an I/O device (e.g., the device 3606). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 3610. The network system 3610 includes components 3622-1, 3622-2, 3622-3, . . . 3622-N. For example, the components 3622-1 may include the processor(s) 3602 while the component(s) 3622-3 may include memory accessible by the processor(s) 3602. Further, the component(s) 3622-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
receiving seismic data for a geologic region of the Earth, wherein the seismic data comprise primaries and multiples acquired using a seismic survey geometry that comprises a two-dimensional array;
building a velocity model that physically characterizes the geologic region of the Earth, wherein the velocity model comprises at least three reflecting interfaces at different subsurface depths in a range from shallow to deep;
generating a primary image using the seismic data;
identifying a portion of the geologic region of the Earth in the primary image that comprises a deficiency in coverage at shallower subsurface depths that comprise structural geological variations, wherein the deficiency in coverage corresponds to one or more gaps in the two-dimensional array of the seismic survey geometry;
selecting at least one mode of multiple from the multiples and corresponding travel time data from a data storage wherein the travel time data correspond to at least one complex ray signature in the geologic region of the Earth and are based at least in part on the velocity model, and wherein the travel time data comprise entries for source to image point travel time data and entries for image point to receiver travel time data;

based on the selected at least one mode of multiple, pre-processing the seismic data to generate attenuated seismic data;

performing Kirchhoff migration on the attenuated seismic data using at least the selected travel time data to generate migrated seismic data, wherein the selected travel time data comprise one or more of the entries for source to image point travel time data and one or more of the entries for image point to receiver travel time data; and rendering an image of the geologic region of the Earth to a display to determine a location of hydrocarbons wherein the image comprises at least a multiple image based at least in part on the migrated seismic data that improves the coverage at the shallower subsurface depths to highlight the structural geological variations.

2. The method of claim 1 wherein the deficiency in coverage comprises a primary coverage gap.

3. The method of claim 1 wherein the deficiency in coverage is due at least in part to an obstruction.

4. The method of claim 1 wherein selecting at least one mode of multiple from the multiples and corresponding travel time data comprises selecting based at least in part on a reflection angle of at least one mode of multiple.

5. The method of claim 1 wherein selecting at least one mode of multiple from the multiples and corresponding travel time data comprises selecting based at least in part on illumination of a portion of the geological region of the Earth.

6. The method of claim 1 comprising generating the travel time data and storing the travel time data to the data storage.

7. The method of claim 1 wherein the performing the Kirchhoff migration comprises performing Kirchhoff depth migration travel time calculations.

8. The method of claim 1 wherein the pre-processing attenuates one or more of the primaries, attenuates one or more modes of the multiples or attenuates one or more of the primaries and attenuates one or more modes of the multiples wherein the one or more modes of the multiples do not correspond to the selected at least one mode of multiple.

9. The method of claim 1 wherein the seismic data comprise seismic survey data of a land survey.

10. The method of claim 1 wherein the seismic data comprise seismic survey data of a marine survey.

11. The method of claim 1 wherein the geologic environment comprises at least one salt formation.

12. The method of claim 1 wherein the geologic environment comprises a shallow region.

13. The method of claim 1 wherein the geologic region comprises an anisotropic layer of material.

14. The method of claim 1 wherein the at least one complex ray signature comprises complex ray signatures for different orders of multiples.

15. The method of claim 1 comprising generating the at least one complex ray signature via rendering a graphical user interface to a display and receiving input via the graphical user interface as to one or more parameters of the geologic environment.

16. A system comprising:
a processor;
memory accessible by the processor; and
processor-executable instructions stored in the memory that are executable to instruct the system to:
receive seismic data for a geologic region of the Earth, wherein the seismic data comprise primaries and multiples acquired using a seismic survey geometry that comprises a two-dimensional array;
build a velocity model that physically characterizes the geologic region of the Earth, wherein the velocity model comprises at least three reflecting interfaces at different subsurface depths in a range from shallow to deep;
generate a primary image using the seismic data;
identify a portion of the geologic region of the Earth, using the primary image, that comprises a coverage deficiency at shallower subsurface depths that comprise structural geological variations, wherein the deficiency in coverage corresponds to one or more gaps in the two-dimensional array of the seismic survey geometry;
select at least one mode of multiple and corresponding travel time data from a data storage wherein the travel time data correspond to at least one complex ray signature in the geologic region of the Earth and are based at least in part on the velocity model, and wherein the travel time data comprise entries for source to image point travel time data and entries for image point to receiver travel time data;
based on the selected at least one mode of multiple, pre-process the seismic data to generate attenuated seismic data;
perform Kirchhoff migration on the attenuated seismic data using at least the selected travel time data to generate migrated seismic data, wherein the selected travel time data comprise one or more of the entries for source to image point travel time data and one or more of the entries for image point to receiver travel time data; and
render an image of the geologic region of the Earth to a display to determine a location of hydrocarbons wherein the image comprises at least a multiple image based at least in part on the migrated seismic data that improves the coverage at the shallower subsurface depths to highlight the structural geological variations.

17. One or more non-transitory computer-readable storage media comprising computer-executable instructions executable to instruct a computer to:
receive seismic data for a geologic region of the Earth, wherein the seismic data comprise primaries and multiples acquired using a seismic survey geometry that comprises a two-dimensional array;
build a velocity model that physically characterizes the geologic region of the Earth, wherein the velocity model comprises at least three reflecting interfaces at different subsurface depths in a range from shallow to deep;
generate a primary image using the seismic data;
identify a portion of the geologic region of the Earth, using the primary image, that comprises a coverage deficiency at shallower subsurface depths that comprise structural geological variations, wherein the deficiency in coverage corresponds to one or more gaps in the two-dimensional array of the seismic survey geometry;

select at least one mode of multiple and corresponding travel time data from a data storage wherein the travel time data correspond to at least one complex ray signature in the geologic region of the Earth and are based at least in part on the velocity model, and wherein the travel time data comprise entries for source to image point travel time data and entries for image point to receiver travel time data;

based on the selected at least one mode of multiple, pre-process the seismic data to generate attenuated seismic data;

perform Kirchhoff migration on the attenuated seismic data using at least the selected travel time data to generate migrated seismic data, wherein the selected travel time data comprise one or more of the entries for source to image point travel time data and one or more of the entries for image point to receiver travel time data; and render an image of the geologic region of the Earth to a display to determine a location of hydrocarbons wherein the image comprises at least a multiple image based at least in part on the migrated seismic data that improves the coverage at the shallower subsurface depths to highlight the structural geological variations.

* * * * *